United States Patent
Liu et al.

(10) Patent No.: US 11,368,223 B2
(45) Date of Patent: Jun. 21, 2022

(54) OLT, ONU, PON SYSTEM, AND MESSAGE TRANSMISSION METHOD IN PON SYSTEM

(71) Applicant: HUAWEI TECHNOLOGIES CO., LTD., Guangdong (CN)

(72) Inventors: Dekun Liu, Wuhan (CN); Wei Ling, Dongguan (CN); Zhicheng Ye, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/936,212

(22) Filed: Jul. 22, 2020

(65) Prior Publication Data

US 2020/0350992 A1 Nov. 5, 2020

Related U.S. Application Data

(63) Continuation of application No. PCT/CN2018/109898, filed on Oct. 11, 2018.

(30) Foreign Application Priority Data

Jan. 26, 2018 (CN) .......................... 201810078953.8

(51) Int. Cl.
*H04B 10/27* (2013.01)
*H04B 10/25* (2013.01)
*H04Q 11/00* (2006.01)

(52) U.S. Cl.
CPC ............ *H04B 10/27* (2013.01); *H04B 10/25* (2013.01); *H04Q 11/0067* (2013.01); *H04Q 2011/0088* (2013.01)

(58) Field of Classification Search
None
See application file for complete search history.

(56) References Cited

U.S. PATENT DOCUMENTS

2005/0158048 A1* 7/2005 Sung ..................... H04J 3/1694
398/66
2009/0208227 A1 8/2009 Yoshida et al.
(Continued)

FOREIGN PATENT DOCUMENTS

CN 101247182 A 8/2008
CN 101854208 A 10/2010
(Continued)

OTHER PUBLICATIONS

IEEE P802.3ca/D0.3, Draft Standard for Ethernet Amendment,Physical Layer Specifications and Management Parameters for 25 GB/s,50 GB/s, and 100 GB/s Passive Optical Networks, Mar. 16, 2017, 76 pages.
(Continued)

*Primary Examiner* — David W Lambert
(74) *Attorney, Agent, or Firm* — Fish & Richardson P.C.

(57) ABSTRACT

The present disclosure relates to message transmission methods in a PON system. One example method includes sending, by an optical line terminal (OLT), a first message to an unregistered optical network unit (ONU), where the first message includes at least one piece of indication message, and one piece of indication message of the at least one piece of indication message indicates a first power range and a first time range associated with the first power range, and receiving, by the OLT in the first time range, a registration message sent by the ONU, where a downstream receive power of the ONU falls within the first power range.

21 Claims, 21 Drawing Sheets

(56) References Cited

U.S. PATENT DOCUMENTS

| | | | | |
|---|---|---|---|---|
| 2009/0304385 | A1* | 12/2009 | Khermosh | H04Q 11/0067 |
| | | | | 398/58 |
| 2015/0365172 | A1 | 12/2015 | Luo et al. | |
| 2016/0359555 | A1 | 12/2016 | Prause | |
| 2018/0198552 | A1* | 7/2018 | Cress | H04J 14/0221 |

FOREIGN PATENT DOCUMENTS

| | | |
|---|---|---|
| CN | 101944949 A | 1/2011 |
| CN | 102130720 A | 7/2011 |
| CN | 102523539 A | 6/2012 |
| CN | 102883234 A | 1/2013 |
| CN | 104426610 A | 3/2015 |
| CN | 104954898 A | 9/2015 |
| CN | 105359441 A | 2/2016 |
| CN | 106489245 A | 3/2017 |
| CN | 106550290 A | 3/2017 |
| CN | 108574532 A | 9/2018 |
| EP | 2418871 A2 | 2/2012 |
| JP | 2012060503 A | 3/2012 |
| JP | 2014517554 A | 7/2014 |
| KR | 101446909 B1 | 10/2014 |
| KR | 101688445 B1 | 12/2016 |
| KR | 20170042256 A | 4/2017 |
| WO | 2010144251 A1 | 12/2010 |
| WO | 2015192735 A1 | 12/2015 |
| WO | 2016015216 A1 | 2/2016 |

OTHER PUBLICATIONS

Office Action issued in Chinese Application No. 201810078953.8 dated Apr. 17, 2020, 43 pages (With English Translation).
Office Action issued in Taiwan Application No. 10821155450 dated Dec. 5, 2019, 12 pages (With Partial English Translation).
PCT International Search Report and Written Opinion in International Application No. PCT/CN2018/109,898, dated Jan. 4, 2019, 19 pages (With English Translation).
Office Action issued in Chinese Application No. 201810078953.8 dated Apr. 8, 2021, 7 pages (with English translation).
Office Action issued in Korean Application No. 2020-7023998 dated Sep. 30, 2021, 10 pages (with English translation).
Office Action issued in Japanese Application No. 2020-560525 dated Oct. 5, 2021, 11 pages (with English translation).

* cited by examiner

| LLID registration status | MPC Packet | Packet LLID | Packet DA | Packet Flag/Data |
|---|---|---|---|---|
| Discovery process | Gate | 0xFFFF | MAC Control | Include a discovery Grant and Sync Time information |
| 0 | Req | 0x7FFF | | Reg: Request registration<br>Dereg: Request deregistration |
| Registration process | Reg | 0xFFFF | ONU/LLID unicast MAC address | Ack: Registration consent<br>Nack: Registration rejection |
| 1 | Gate | | | Initial Gate, for sending upstream Ack frame by ONU |
| | Ack | | | Ack: Registration success<br>Nack: Registration cancellation |
| After registration | Downstream Gate Upstream Rpt | Unicast LLID | MAC Control | ONU requests upstream bandwidth by using Rpt<br>OLT delivers bandwidth grant by using Gate |
| Deregistration process | Req | | | Reg: Request registration<br>Dereg: Request deregistration |
| 0 | Reg | | | Dereg: Deregister the ONU<br>Rereg: Command the ONU to reregister |

Figure 144-10—DISCOVERY GATE MPCPDU

OLT, ONU, PON SYSTEM, AND MESSAGE TRANSMISSION METHOD IN PON SYSTEM

CROSS-REFERENCE TO RELATED APPLICATION

This application is a continuation of International Application No. PCT/CN2018/109898, filed on Oct. 11, 2018, which claims priority to Chinese Patent Application No. 201810078953.8, filed on Jan. 26, 2018. The disclosures of the aforementioned applications are hereby incorporated by reference in their entireties.

TECHNICAL FIELD

This application relates to the field of mobile communications technologies, and in particular, to an OLT, an ONU, a PON system, and an information transmission method in a PON system.

BACKGROUND

In a passive optical network (Passive Optical Network, PON) system, an optical network unit (optical network unit. ONU) sends data to an optical line terminal (optical line terminal, OLT) by sending a burst signal. To effectively avoid a conflict that a plurality of ONUs simultaneously communicate with the OLT, the OLT needs to coordinate data sending of the ONUs in a time slice grant manner, to ensure that only one ONU is allowed to send data in a particular time period.

When ONUs send registration signals to the OLT, because distances from different ONUs to the OLT are different, links between the different ONUs and the OLT usually attenuate differently. When the different ONUs send registration signals to a receiver of the OLT in close time periods, the registration signals from the different ONUs differ greatly in signal strength when reaching the OLT. The receiver has different speeds of responding to registration signals whose signal strengths are different, and a corresponding response time needs to be reserved for each registration signal. Therefore, in the close time periods, when the registration signals from the different ONUs differ greatly in signal strength when reaching the OLT, an overall response time of the receiver for the registration signals is relatively long. Consequently, a long time is required for the receiver of the OLT to implement burst signal synchronization, and a probability of burst signal misjudgment is prone to increase, resulting in an increase in a packet loss rate.

SUMMARY

Embodiments of this application provide an OLT, an ONU, a PON system, and an information transmission method in a PON system, to increase a burst signal synchronization rate of an OLT receiver. To achieve the foregoing objective, this application provides the following technical solutions:

According to a first aspect, to achieve the foregoing invention objective, this application provides an information transmission method in a PON system, including: sending, by an optical line terminal OLT, first information to an optical network unit ONU, where the first information includes at least one piece of indication information, and one piece of indication information indicates a first power range and a first time range associated with the first power range; and receiving, by the OLT in the first time range, a registration message sent by the ONU, where a downstream receive power of the ONU falls within the first power range.

The OLT sends one or more pairs of mutually associated time ranges and power ranges to the unregistered ONU. Different time ranges correspond to different power ranges. Therefore, when the downstream receive power of the unregistered ONU falls within one of the power ranges, the ONU registers in a time range corresponding to the power range. Based on different power ranges, ONUs whose downstream receive powers differ much may be classified into a plurality of ONU groups, and ONUs whose downstream receive powers fall within a same power range belong to a same ONU group. Registration signals of ONUs in a same ONU group are similar or differ little in signal strength when reaching the OLT, so that the OLT can quickly respond to the registration signals of the ONUs in the same ONU group, and an overall response time of the OLT for registration signals of ONUs in different ONU groups can be shortened, thereby resolving the foregoing technical problem.

In a possible design, the indication information includes power range information or includes identification information associated with the power range information.

In a possible design, the first power range is further associated with a first receive parameter; and the receiving, by the OLT in the first time range, a registration message sent by the ONU includes: receiving, by the OLT, the registration message in the first time range by using the first receive parameter. Remaining pieces of indication information in the at least one piece of indication information may indicate second power ranges and time ranges in one-to-one association with the second power ranges. Receive parameters associated with the first power range and the second power ranges are different, and receive parameters associated with any two of the second power ranges are different. Receive parameters are associated with power ranges, so that the OLT classifies ONUs into groups based on the power ranges, and receives registration signals of different ONU groups by using different receive parameters. Through a dynamic adjustment to the receive parameter, a sensitivity of an OLT receiver and an overload power of the OLT receiver can be balanced, thereby expanding a dynamic range of a receive power of the receiver. For example, when a received signal is relatively weak, to enhance the sensitivity of the entire OLT receiver as much as possible, a bias current of an amplifier may be set to a relatively high level, to ensure that the amplifier provides a sufficiently high gain. However, when a signal input to the amplifier is strong, the amplifier does not need to provide a high gain, and the bias current of the amplifier may be reduced, so that a power of a signal output from the amplifier to a photodetector is not excessively large, thereby preventing overload of the receiver.

In a possible design, the sending, by an OLT, first information to an unregistered ONU includes: sending, by the OLT, an MPCP frame to the unregistered ONU, where the MPCP frame includes a Discovery GATE message field, and the Discovery GATE message field includes the indication information. An indication field is added in the Discovery GATE message field of the MPCP frame to indicate a power range. Compared with an existing EPON system, the MPCP frame is modified less, which facilitates standard maintenance. More importantly, by modifying a message structure of the MPCP frame, different grant timeslots can be configured for registration for ONUs whose link insertion loss differences are different. Then a registration signal received by the OLT in any grant timeslot is sent by an ONU whose insertion loss difference is small, which facilitates a decrease in a response time of the OLT for the registration signal.

In a possible design, the sending, by an OLT, first information to an unregistered ONU includes: sending, by the OLT, a GTC frame to the unregistered ONU, where the GTC frame includes a BWmap message field, and the BWmap message field includes the indication information. An indication field is added in the BWmap message field of the GTC frame to indicate a power range. Compared with an existing GPON system, a message structure of the GTC frame is modified less, which facilitates standard maintenance. More importantly, by modifying the message structure of the GTC frame, different grant timeslots can be configured for registration for ONUs whose link insertion loss differences are different. Then a registration signal received by the OLT in any grant timeslot is sent by an ONU whose insertion loss difference is small, which facilitates a decrease in a response time of the OLT for the registration signal.

In a possible design, the method further includes: assigning, by the OLT, an ONU identifier to the unregistered ONU, and establishing an association relationship between the receive parameter associated with the first time range and the assigned ONU identifier. The association relationship between the receive parameter and the assigned ONU identifier is used by the OLT to obtain an association relationship between a receive parameter and a second time range based on an association relationship between an ONU identifier and the second time range and the association relationship between the ONU identifier and the receive parameter when the OLT receives an upstream optical signal, so that the OLT receives, in the second time range based on the association relationship between the receive parameter and the second time range, an upstream optical signal sent by a registered ONU, which facilitates a decrease in an overall response time of the OLT for different upstream optical signals.

In a possible design, a receiver of the OLT includes an amplifier and a photodetector, and the first receive parameter is at least one of a bias current of the amplifier, a bias voltage of the photodetector, and light attenuation between the amplifier and the photodetector. When ONUs are classified into groups based on power ranges, the receive parameter is set to the bias current of the amplifier, the bias voltage of the photodetector, or the light attenuation between the amplifier and the photodetector. Compared with the prior art, no additional device is added, which facilitates expansion of the dynamic range of the receive power of the OLT receiver at low costs.

In a possible design, the first information includes N pieces of indication information, power ranges indicated in any two pieces of indication information are different, time ranges indicated in any two pieces of indication information are different, and N is an integer greater than 1. Another implementation of sending the first information is provided, where an association relationship between a plurality of power ranges and a plurality of time ranges may be sent by using the first information. Compared with separate indications in a plurality of times, time overheads of a registration notification can be reduced.

In a possible design, the method further includes: sending, by the OLT, second information to a registered ONU, where the second information includes at least one piece of indication information, and one piece of indication information in the second information indicates an ONU identifier, and a second time range associated with the ONU identifier; and receiving, by the OLT in the second time range by using a receive parameter associated with the second time range, an upstream optical signal sent by the registered ONU, where the upstream optical signal includes information indicating an ONU identifier of the registered ONU, the second time range is associated with the ONU identifier indicated in the upstream optical signal, and the receive parameter associated with the second time range is specifically the receive parameter associated with the ONU identifier. Compared with the prior art, the OLT may receive, in the second time range based on the association relationship between the receive parameter and the second time range, the upstream optical signal sent by the registered ONU, which facilitates a decrease in an overall response time of the OLT for different upstream optical signals.

In a possible design, the method further includes: when at least two of ONU identifiers indicated in the indication information are associated with a same receive parameter, second time ranges associated with the at least two ONU identifiers are adjacent. Time for sending upstream optical signals by ONUs in a same ONU group may be concentrated in one time period. The OLT receiver receives, in this time period based on a same receive parameter, the upstream optical signals sent by the ONUs in the same ONU group, which facilitates a decrease in a response time of the OLT receiver for the upstream optical signals sent by the ONUs in the same ONU group.

In a possible design, the method further includes: determining, by the OLT, an optical power of the received upstream optical signal, and determining the power range within which the optical power of the upstream optical signal falls; and when a receive parameter associated with the determined power range does not match the receive parameter associated with the ONU identifier indicated in the upstream optical signal, changing the receive parameter associated with the ONU identifier to the receive parameter associated with the determined power range. In a special case, when a power at which the upstream optical signal sent by the ONU actually reaches the OLT does not match the power range corresponding to the ONU identifier, the foregoing method may be used to update, based on the power at which the upstream optical signal sent by the ONU actually reaches the OLT, the power range and the receive parameter that correspond to the ONU identifier, thereby avoiding problems such as power overload of the OLT receiver.

In a possible design, the indication information is specifically used to indicate an ONU whose downstream receive power falls within a power range corresponding to the power range information to register, or is specifically used to indicate an ONU whose downstream receive power falls within a power range corresponding to the identification information to register. When the indication information includes the power range information or information associated with the power range, a specific meaning of the indication information is allowing an ONU that meets a related power condition to register, for example, allowing the ONU whose downstream receive power falls within the power range corresponding to the power range information to register, or allowing the ONU whose downstream receive power falls within the power range corresponding to the identification information to register, ensuring that the ONU can identify a physical meaning of the identification information in the indication information.

According to a second aspect, to achieve the foregoing invention objective, this application provides an information transmission method in a PON system, including: receiving, by an unregistered optical network unit ONU, first information sent by an optical line terminal OLT, where the first information includes at least one piece of indication information, and one piece of indication information indicates a first power range and a first time range associated with the first power range; and sending, by the ONU, a registration message to the OLT in the first time range based on the first information after determining that a downstream receive power falls within the first power range indicated in the indication information. The OLT sends one or more pieces of indication information of mutually associated time ranges and power ranges to the unregistered ONU. Different time ranges correspond to different power ranges. Therefore, when the downstream receive power of the unregistered ONU falls within one of the power ranges, the ONU registers in a time range corresponding to the power range. Based on different power ranges, ONUs whose downstream receive powers differ much may be classified into a plurality of ONU groups, and ONUs whose downstream receive powers fall within a same power range belong to a same ONU group. Registration signals of ONUs in a same ONU group are similar or differ little in signal strength when reaching the OLT, so that the OLT can quickly respond to the registration signals of the ONUs in the same ONU group, and an overall response time of the OLT for registration signals of ONUs in different ONU groups can be shortened, thereby resolving the foregoing technical problem.

In a possible design, the indication information includes power range information or includes identification information associated with the power range.

In a possible design, the indication information is specifically used to indicate an ONU whose downstream receive power falls within a power range corresponding to the power range information to register, or is specifically used to indicate an ONU whose downstream receive power falls within a power range corresponding to the identification information to register. When the indication information includes the power range information or information associated with the power range, a specific meaning of the indication information is allowing an ONU that meets a related power condition to register, for example, allowing the ONU whose downstream receive power falls within the power range corresponding to the power range information to register, or allowing the ONU whose downstream receive power falls within the power range corresponding to the identification information to register, ensuring that the ONU can identify a physical meaning of the power range information.

In a possible design, the receiving, by an unregistered ONU, first information sent by an OLT includes: receiving, by the unregistered ONU, an MPCP frame sent by the OLT, where the MPCP frame includes a Discovery GATE message field, and the Discovery GATE message field includes the indication information. An indication field is added in the Discovery GATE message field of the MPCP frame to indicate a power range. Compared with an existing EPON system, the MPCP frame is modified less, which facilitates standard maintenance. More importantly, by modifying a message structure of the MPCP frame, different grant timeslots can be configured for registration for ONUs whose link insertion loss differences are different. Then a registration signal received by the OLT in any grant timeslot is sent by an ONU whose insertion loss difference is small, which facilitates a decrease in a response time of the OLT for the registration signal.

In a possible design, the receiving, by an unregistered ONU, first information sent by an OLT includes: receiving, by the unregistered ONU, a GTC frame sent by the OLT, where the GTC frame includes a BWmap message field, and the BWmap message field includes the indication information. An indication field is added in the BWmap message field of the GTC frame to indicate a power range. Compared with an existing GPON system, a message structure of the GTC frame is modified less, which facilitates standard maintenance. More importantly, by modifying the message structure of the GTC frame, different grant timeslots can be configured for registration for ONUs whose link insertion loss differences are different. Then a registration signal received by the OLT in any grant timeslot is sent by an ONU whose insertion loss difference is small, which facilitates a decrease in a response time of the OLT for the registration signal.

In a possible design, the method further includes: skipping sending, by the ONU, the registration message to the OLT when determining that the downstream receive power does not match any power range indicated in the first information. The ONU does not register when the ONU does not meet a power condition indicated by the OLT, thereby ensuring that ONU groups obtained through classification based on a registration process are accurate.

In a possible design, the first information includes N pieces of indication information, power ranges indicated in any two of the N pieces of indication information are different, time ranges indicated in any two of the N pieces of indication information are different, and N is an integer greater than 1. Another implementation of sending the first information is provided, where an association relationship between a plurality of power ranges and a plurality of time ranges may be sent by using the first information. Compared with separate indications in a plurality of times, time overheads of a registration notification can be reduced.

According to a third aspect, this application provides a PON system, including an OLT and an ONU that perform the foregoing information transmission method in a PON system or an OLT and an ONU that are described in the following aspects. Specifically, the OLT sends first information to the ONU, where the first information includes at least one piece of indication information, and one piece of indication information indicates a first power range and a first time range associated with the first power range. The ONU receives the first information sent by the optical line terminal OLT, and sends a registration message to the OLT in the first time range based on the first information after determining that the ONU is unregistered and a downstream receive power falls within the first power range indicated in the indication information. The OLT receives, in the first time range, the registration message sent by the ONU. The OLT sends one or more pairs of mutually associated time ranges and power ranges to the unregistered ONU. Different time ranges correspond to different power ranges. Therefore, when the downstream receive power of the unregistered ONU falls within one of the power ranges, the ONU registers in a time range corresponding to the power range. Based on different power ranges, ONUs whose downstream receive powers differ much may be classified into a plurality of ONU groups, and ONUs whose downstream receive powers fall within a same power range belong to a same ONU group. Registration signals of ONUs in a same ONU group are similar or differ little in signal strength when reaching the OLT, so that the OLT can quickly respond to the registration signals of the ONUs in the same ONU group, and an overall response time of the OLT for registration signals of ONUs in different ONU groups can be shortened, thereby resolving the foregoing technical problem.

According to a fourth aspect, to achieve the foregoing invention objective, this application provides an OLT, including: a transceiver unit, configured to send first information to an ONU, where the first information includes at least one piece of indication information, and one piece of indication information indicates a first power range and a first time range associated with the first power range; and the processing unit, configured to indicate the transceiver unit to receive, in the first time range, a registration message sent by the ONU, where a downstream receive power of the ONU falls within the first power range.

In a possible design, the indication information includes power range information or includes identification information associated with the power range.

In a possible design, the first power range is further associated with a first receive parameter. Remaining pieces of indication information in the at least one piece of indication information indicate second power ranges. Receive parameters associated with the first power range and the second power ranges are different, and receive parameters associated with any two of the second power ranges are different. The processing unit is configured to indicate the transceiver unit to receive the registration message in the first time range by using the first receive parameter.

In a possible design, the transceiver unit is specifically configured to send an MPCP frame to the unregistered ONU, where the MPCP frame includes a Discovery GATE message field, and the Discovery GATE message field includes the indication information.

In a possible design, the transceiver unit is specifically configured to send a GTC frame to the unregistered ONU, where the GTC frame includes a BWmap message field, and the BWmap message field includes the indication information.

In a possible design, the processing unit is further configured to assign an ONU identifier to the unregistered ONU, and establish an association relationship between the receive parameter associated with the first time range and the assigned ONU identifier.

In a possible design, a receiver of the OLT includes an amplifier and a photodetector, and the first receive parameter is at least one of a bias current of the amplifier, a bias voltage of the photodetector, and light attenuation between the amplifier and the photodetector.

In a possible design, the first information includes N pieces of indication information, power ranges indicated in any two of the N pieces of indication information are different, first time ranges indicated in any two of the N pieces of indication information are different, and N is an integer greater than 1.

In a possible design, the processing unit is further configured to indicate the transceiver unit to send second information to a registered ONU, where the second information includes at least one piece of indication information, and one piece of indication information in the second information indicates an ONU identifier, and a second time range associated with the ONU identifier; and the processing unit is further configured to indicate the transceiver unit to receive, in the second time range by using a receive parameter associated with the second time range, an upstream optical signal sent by the registered ONU, where the upstream optical signal includes information indicating an ONU identifier of the registered ONU, the second time range is associated with the ONU identifier indicated in the upstream optical signal, and the receive parameter associated with the second time range is specifically the receive parameter associated with the ONU identifier.

In a possible design, when at least two of ONU identifiers indicated in the second information are associated with a same receive parameter, second time ranges associated with the at least two ONU identifiers are adjacent.

In a possible design, the processing unit is further configured to: after the transceiver unit receives the upstream optical signal sent by the registered ONU, determine an optical power of the received upstream optical signal, and determine the power range within which the optical power of the upstream optical signal falls; and when a receive parameter associated with the determined power range does not match the receive parameter associated with the ONU identifier indicated in the upstream optical signal, change the receive parameter associated with the ONU identifier to the receive parameter associated with the determined power range.

In a possible design, the indication information is specifically used to indicate an ONU whose downstream receive power falls within a power range corresponding to the power range information to register, or is specifically used to indicate an ONU whose downstream receive power falls within a power range corresponding to the identification information to register.

According to a fifth aspect, to achieve the foregoing invention objective, this application provides an ONU, including: a transceiver unit, configured to receive first information sent by an OLT, where the first information includes at least one piece of indication information, and one piece of indication information indicates a first power range and a first time range associated with the first power range; and a processing unit, configured to send a registration message to the OLT in the first time range based on the first information after determining that the ONU is unregistered and a downstream receive power falls within the first power range indicated in the indication information.

In a possible design, the indication information includes power range information or includes identification information associated with the power range.

In a possible design, the indication information is specifically used to indicate an ONU whose downstream receive power falls within a power range corresponding to the power range information to register, or is specifically used to indicate an ONU whose downstream receive power falls within a power range corresponding to the identification information to register.

In a possible design, the transceiver unit is configured to receive an MPCP frame sent by the OLT, where the MPCP frame includes a Discovery GATE message field, and the Discovery GATE message field includes the indication information.

In a possible design, the transceiver unit is configured to receive a GTC frame sent by the OLT, where the GTC frame includes a BWmap message field, and the BWmap message field includes the indication information.

In a possible design, the processing unit is configured to skip sending the registration message to the OLT when determining that the downstream receive power does not match any power range indicated in the first information.

In a possible design, the first information includes N pieces of indication information, power ranges indicated in any two of the N pieces of indication information are different, first time ranges indicated in any two of the N pieces of indication information are different, and N is an integer greater than 1.

According to a sixth aspect, this application provides a communications apparatus, including a memory, a transceiver, and a processor. The memory is configured to store an instruction. The processor is configured to execute the instruction stored in the memory and control the transceiver to receive and send signals. When the processor executes the instruction stored in the memory, the processor is configured to perform an action performed by an OLT in the first aspect or any possible design in the first aspect.

Specifically, the transceiver is configured to send first information to an ONU, where the first information includes at least one piece of indication information, and one piece of indication information indicates a first power range and a first time range associated with the first power range; and the processor is configured to instruct the transceiver to receive, in the first time range, a registration message sent by the ONU, where a downstream receive power of the ONU falls within the first power range.

In a possible design, the indication information includes power range information or includes identification information associated with the power range.

In a possible design, the first power range is further associated with a first receive parameter. Remaining pieces of indication information in the at least one piece of indication information indicate second power ranges. Receive parameters associated with the first power range and the second power ranges are different, and receive parameters associated with any two of the second power ranges are different. The processor is configured to instruct the transceiver to receive the registration message in the first time range by using the first receive parameter.

In a possible design, the transceiver is specifically configured to send an MPCP frame to the unregistered ONU, where the MPCP frame includes a Discovery GATE message field, and the Discovery GATE message field includes the indication information.

In a possible design, the transceiver is specifically configured to send a GTC frame to the unregistered ONU, where the GTC frame includes a BWmap message field, and the BWmap message field includes the indication information.

In a possible design, the processor is further configured to assign an ONU identifier to the unregistered ONU, and establish an association relationship between the receive parameter associated with the first time range and the assigned ONU identifier.

In a possible design, a receiver of the OLT includes an amplifier and a photodetector, and the first receive parameter is at least one of a bias current of the amplifier, a bias voltage of the photodetector, and light attenuation between the amplifier and the photodetector.

In a possible design, the first information includes N pieces of indication information, power ranges indicated in any two of the N pieces of indication information are different, first time ranges indicated in any two of the N pieces of indication information are different, and N is an integer greater than 1.

In a possible design, the processor is further configured to instruct the transceiver to send second information to a registered ONU, where the second information includes at least one piece of indication information, and one piece of indication information in the second information indicates an ONU identifier, and a second time range associated with the ONU identifier; and the processor is further configured to instruct the transceiver to receive, in the second time range by using a receive parameter associated with the second time range, an upstream optical signal sent by the registered ONU, where the upstream optical signal includes information indicating an ONU identifier of the registered ONU, the second time range is associated with the ONU identifier indicated in the upstream optical signal, and the receive parameter associated with the second time range is specifically the receive parameter associated with the ONU identifier.

In a possible design, when at least two of ONU identifiers indicated in the second information are associated with a same receive parameter, second time ranges associated with the at least two ONU identifiers are adjacent.

In a possible design, the processor is further configured to: after the transceiver receives the upstream optical signal sent by the registered ONU, determine an optical power of the received upstream optical signal, and determine the power range within which the optical power of the upstream optical signal falls; and when a receive parameter associated with the determined power range does not match the receive parameter associated with the ONU identifier indicated in the upstream optical signal, change the receive parameter associated with the ONU identifier to the receive parameter associated with the determined power range.

In a possible design, the indication information is specifically used to indicate an ONU whose downstream receive power falls within a power range corresponding to the power range information to register, or is specifically used to indicate an ONU whose downstream receive power falls within a power range corresponding to the identification information to register.

According to a seventh aspect, this application provides a communications apparatus, including a memory, a transceiver, and a processor. The memory is configured to store an instruction. The processor is configured to execute the instruction stored in the memory and control the transceiver to receive and send signals. When the processor executes the instruction stored in the memory, the processor is configured to perform an action performed by an ONU in the second aspect or any possible design in the second aspect.

Specifically, the transceiver is configured to receive first information sent by an OLT, where the first information includes at least one piece of indication information, and one piece of indication information indicates a first power range and a first time range associated with the first power range; and the processor is configured to send a registration message to the OLT in the first time range after determining that the ONU is unregistered and a downstream receive power falls within the first power range indicated in the indication information.

In a possible design, the indication information includes power range information or includes identification information associated with the power range.

In a possible design, the indication information is specifically used to indicate an ONU whose downstream receive power falls within a power range corresponding to the power range information to register, or is specifically used to indicate an ONU whose downstream receive power falls within a power range corresponding to the identification information to register.

In a possible design, the transceiver is configured to receive an MPCP frame sent by the OLT, where the MPCP frame includes a Discovery GATE message field, and the Discovery GATE message field includes the indication information.

In a possible design, the transceiver is configured to receive a GTC frame sent by the OLT, where the GTC frame includes a BWmap message field, and the BWmap message field includes the indication information.

In a possible design, the processor is configured to skip sending the registration message to the OLT when determining that the downstream receive power does not match any power range indicated in the first information.

In a possible design, the first information includes N pieces of indication information, power ranges indicated in any two of the N pieces of indication information are different, first time ranges indicated in any two of the N pieces of indication information are different, and N is an integer greater than 1.

According to an eighth aspect, this application provides an EPON message structure. The EPON message structure is an MPCP frame, the MPCP frame includes a Discovery GATE message field, and the Discovery GATE message field includes the indication information in the first aspect or the second aspect.

According to a ninth aspect, this application provides a GPON message structure. The GPON message structure is a GTC frame, the GTC frame includes a BWmap message field, and the BWmap message field includes the indication information in the first aspect or the second aspect.

According to a tenth aspect, to achieve the foregoing invention objective, this application provides a computer-readable storage medium. An instruction is stored in the computer-readable storage medium. When the instruction runs on a computer, the computer performs the method in the first aspect or any possible design in the first aspect.

According to an eleventh aspect, to achieve the foregoing invention objective, this application provides a computer-readable storage medium. An instruction is stored in the computer-readable storage medium. When the instruction runs on a computer, the computer performs the method in the second aspect or any possible design in the second aspect.

According to a twelfth aspect, to achieve the foregoing invention objective, this application provides a computer program product including an instruction. When the instruction runs on a computer, the computer performs the method in the first aspect or any possible design in the first aspect.

According to a thirteenth aspect, to achieve the foregoing invention objective, this application provides a computer program product including an instruction. When the instruction runs on a computer, the computer performs the method in the second aspect or any possible design in the second aspect.

According to a fourteenth aspect, to achieve the foregoing invention objective, this application provides a circuit system. The circuit system is configured to implement the method in the first aspect or the second aspect or any possible design in the first aspect or the second aspect.

According to a fifteenth aspect, to achieve the foregoing invention objective, this application provides a chip. The chip is connected to a memory, and is configured to read and execute a software program stored in the memory, to implement the method in the first aspect or the second aspect or any possible design in the first aspect or the second aspect.

These aspects or other aspects in this application may be clearer and easier to understand in description of the following embodiments.

BRIEF DESCRIPTION OF DRAWINGS

FIG. 2 is a schematic structural diagram of an OLT receiver according to an embodiment of this application;

DESCRIPTION OF EMBODIMENTS

The following describes the technical solutions in embodiments of this application with reference to the accompanying drawings in the embodiments of this application. A specific operation method in a method embodiment may also be applied to an apparatus embodiment or a system embodiment. In description of this application, "a/the plurality of" means two or more unless otherwise stated.

Figure 1A:
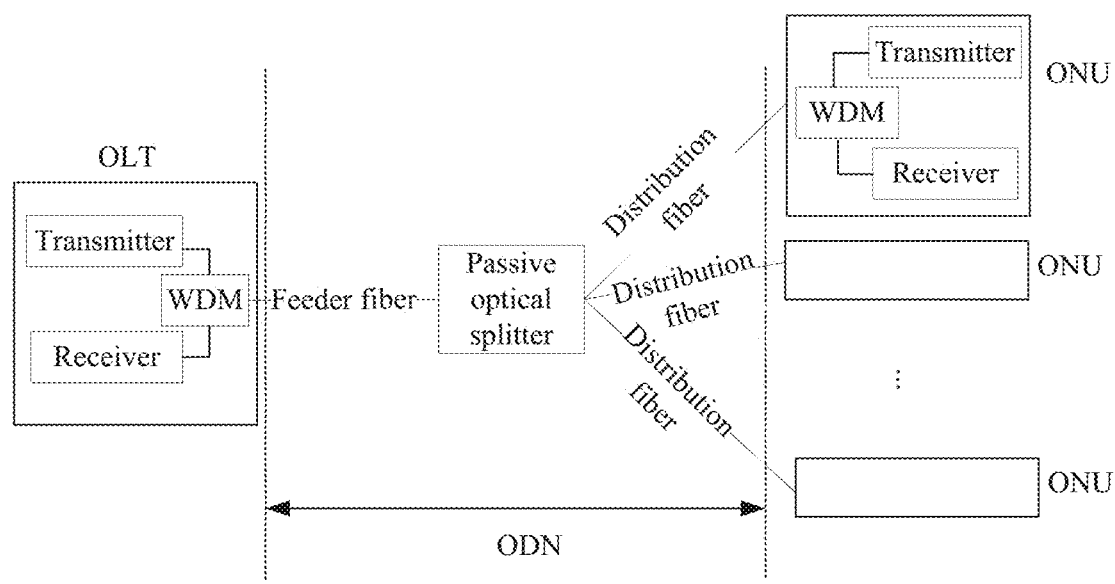
FIG. 1a is a schematic diagram of a PON system according to an embodiment of this application.

FIG. 1a is a schematic structural diagram of a PON system according to an embodiment of this application. As shown in FIG. 1a, the PON system includes an OLT, an optical distribution network (optical distribution network, ODN), and an ONU. In the PON system, transmission in a direction from the OLT to the ONU/ONT is referred to as downstream transmission, and transmission in an opposite direction is referred to as upstream transmission. In the downstream transmission, the OLT broadcasts downstream data to each ONU. In the upstream transmission, time division multiplexing is used, and each ONU sends upstream data to the OLT based on a transmit timeslot assigned by the OLT. The ONU provides a user-side interface for the PON system, and is connected to the ODN in an upstream direction. The ODN is a passive optical splitting device, and generally includes a passive optical splitter (also referred to as a splitter), a feeder fiber, and a distribution fiber. The ODN may summarize upstream data of a plurality of ONUs and transmit the upstream data to the OLT, and transmit downstream data of the OLT to each ONU.

The PON system includes an EPON system and a gigabit-capable passive optical network GPON system.

A related technology and standard of the EPON system both are developed on the basis of IEEE 802.3. The EPON system is compatible with a common ETH technology and device, can reuse a large quantity of existing mature devices and circuits, has low risks in design and implementation, and has a relatively mature technology and industry chain at low costs. Therefore, the EPON system is favored by national telecom operators. Based on a point-to-multipoint network structure of the EPON, one OLT simultaneously communicates with a plurality of ONUs. To distinguish between different ONUs, a unique LLID needs to be set for each ONU as an identifier of the ONU. When the plurality of ONUs simultaneously send data to the OLT, a signal conflict may be caused and affects normal sending of the OLT. Therefore, the OLT needs to coordinate the sending of the ONUs in a time slice grant manner, to ensure that only one ONU is allowed to send data in a particular time period. In this way, the conflict can be effectively avoided. The Multi-Point Control Protocol (Multi-Point Control Protocol, MPCP) is defined in an EPON standard, to implement ONU registration, and control and coordinate different ONUs to share a PON network in a TDMA manner, to send upstream data. In the EPON system, the ONU needs to register first before normal communication with the OLT, and a registration process is mainly completed through exchange of MPCP frames. A registration process in the prior art is specifically shown in FIG. 1b-1 and FIG. 1b-2. The OLT broadcasts a registration notification message, namely, a Discovery GATE message, to the ONU. The Discovery GATE message includes a grant serial number (discovery Grant) and grant timeslot information (Sync Time). All ONUs register by using a timeslot corresponding to the grant timeslot information. After the ONU receives the Discovery GATE message, the ONU sends a registration request message (Req) in specified Sync Time to request to register. After the OLT receives Req of the ONU, the OLT sends a feedback message (Register) to the ONU. Register includes acknowledgment information of registration consent or registration rejection. Then the ONU sends an acknowledgment message (ACK) to the OLT, and feeds back a registration success or a registration cancellation to the OLT. After registration is completed, the ONU may also send another request message (Req) to request bandwidth, or send a deregistration request to deregister. For an MPCP frame format in FIG. 1b-1 and FIG. 1b-2, refer to Table 8-2. For a message structure of a grant frame GATE, refer to Table 9. For a message structure of a report frame REPORT, refer to Table 10. For a message structure of Register_Req, refer to Table 11. For a message structure of Register, refer to Table 12. For a message structure of Register_ACK, refer to Table 13.

For the GPON system, the GPON has relatively high bandwidth efficiency, a synchronous timer mechanism of the GPON follows a conventional SDH, and a GEM is used for encapsulation to adapt to services at different rates. Therefore, the GPON system currently has become a most popular access system among global operators. Based on a point-to-multipoint network structure of the GPON, a communication principle of the GPON is the same as that of the EPON. To distinguish between different ONUs, a unique ONU-ID needs to be set for each ONU as an identifier of the ONU. A difference is that, to ensure QoS of different services on the ONU, a plurality of distribution units need to be disposed, and each distribution unit corresponds to traffic flows having a same traffic characteristic. Therefore, a time slice grant object of the OLT is a distribution unit on the ONU, and a used identifier is an allocation identifier (Allocation Identifier, Alloc-ID). A plurality of different types of user services may be carried on each ONU. To distinguish between different services, when the service is encapsulated by using a GPON encapsulation method (GPON encapsulation method, GEM), a GEM port-ID is used for identification. In the GPON system, the ONU needs to register first before normal communication with the OLT, and a registration process is mainly completed through exchange of PLOAM messages of a GTC frame.

Figures 1, 1B:
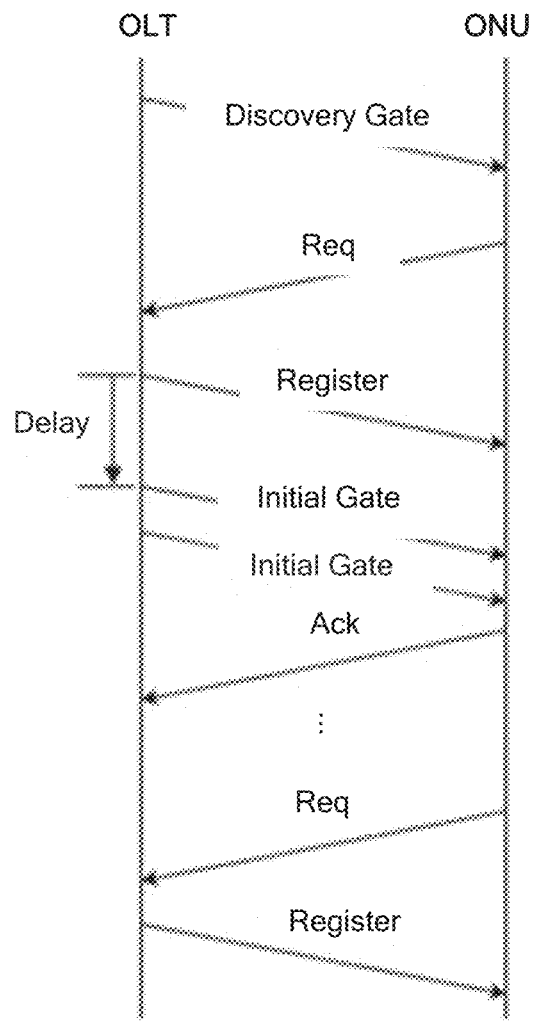
FIG. 1b-1 and FIG. 1b-2 are a flowchart of registration in an EPON system according to an embodiment of this application.
Figure 1C:
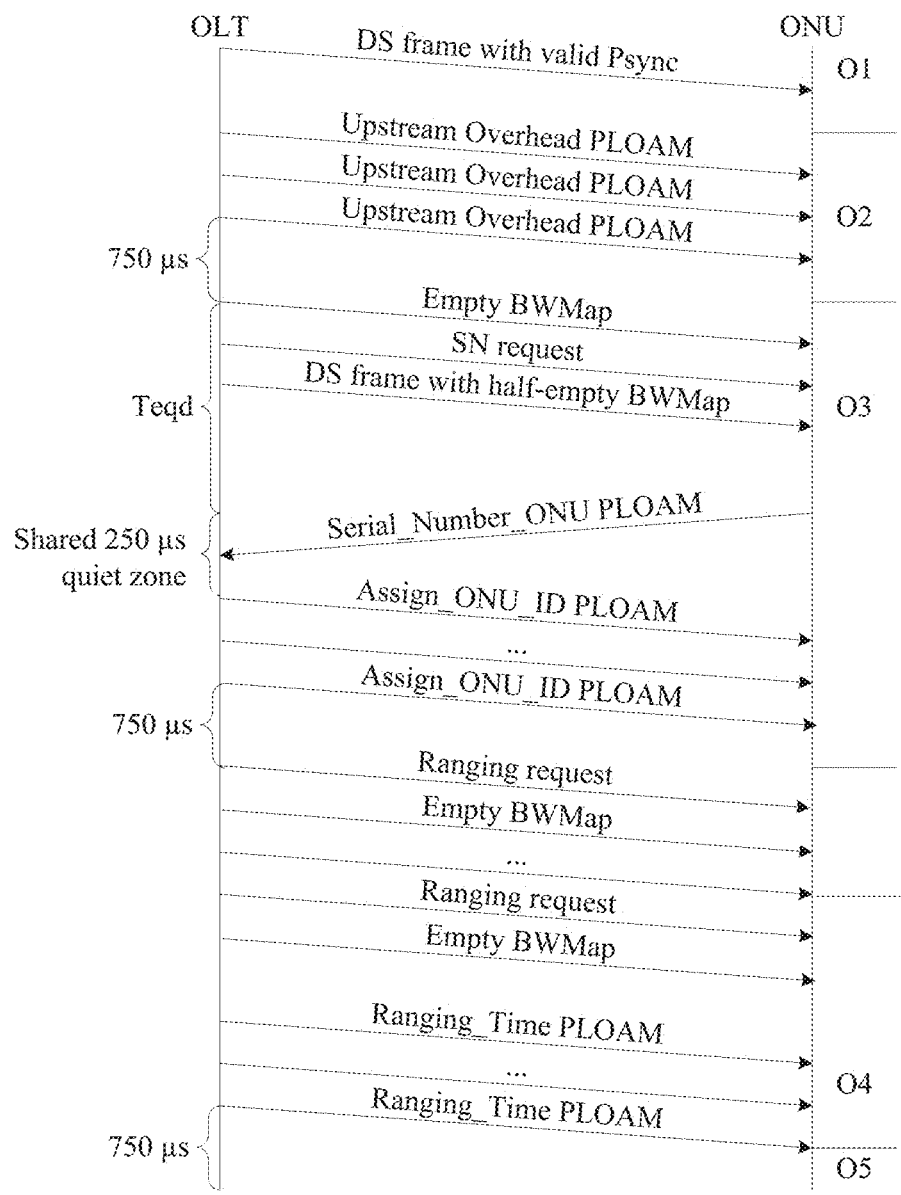
FIG. 1c is a flowchart of registration in a GPON system according to an embodiment of this application.

Specifically, as shown in FIG. 1c, the OLT first delivers a series of special grants, such as Empty BWmap, SN request, and half-empty BWmap, to ensure that all normal ONUs stop sending, to obtain an idle time period (briefly referred to as a quiet window below). SN request is a downstream GTC frame including only grants for all unregistered ONUs. A newly registered ONU sends, in the quiet window, a Serial_number_ONU PLOAM message carrying an SN. After receiving the message, the OLT delivers assigned ONU_ID to the ONU by delivering an Assign_ONU_ID PLOAM message. ONU_ID is used to identify the ONU. Then, ranging is initiated by delivering Ranging_request. Ranging_request is similar to SN request, and a difference is that the grant is only for a single just discovered ONU that is to be ranged. The ONU sends a Serial_number_ONU PLOAM message in a ranging quiet window. The OLT performs ranging after receiving the message, and then delivers a ranging result to the ONU by using a Ranging_Time PLOAM message. At this point, the entire registration process ends and the ONU can communicate normally with the OLT.

In conclusion, in both the GPON system and the EPON system, the OLT specifies a timeslot or a timeslot segment for registration, and each unregistered ONU sends a registration signal based on a timeslot or a timeslot segment that is specified by the OLT for the ONU. In the prior art, all ONUs register in one grant timeslot segment.

Figure 2:
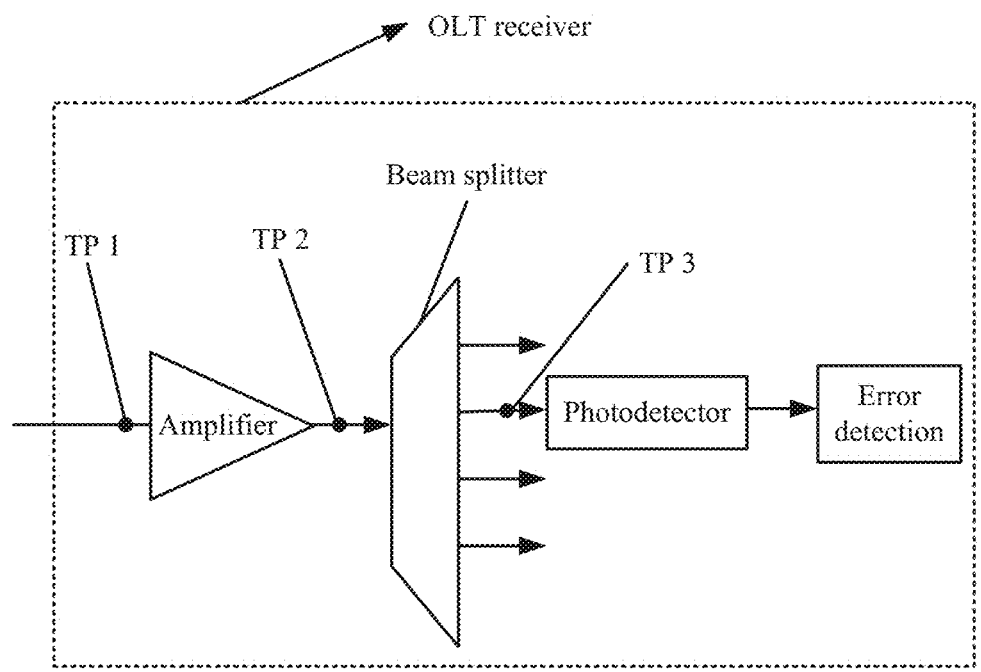

In addition, a decrease in a transmit power of the ONU facilitates implementation of low-cost ONUs. However, with an increase in a line rate of the PON system, an OLT receiver has a lower receiver sensitivity in an upstream direction of the PON. By disposing a shared semiconductor optical amplifier (semiconductor optical amplifier, SOA) in the front of the receiver of the optical line terminal OLT, the receiver sensitivity of the OLT may be enhanced, and the transmit power of the ONU is reduced, which facilitates implementation of low-cost ONUs. FIG. 2 is a schematic structural diagram of a receiver on an OLT side in a PON system according to an embodiment of this application. As shown in FIG. 2, the receiver mainly includes a head amplifier, a beam splitter electrically connected to the head amplifier, and a photodetector electrically connected to the beam splitter. Specifically, the amplifier may be SOA, and the photodetector may be a 25G avalanche photodiode (avalanche photodiode, APD). After the receiver of the OLT receives a burst signal sent by an ONU, the burst signal is sequentially input to the amplifier, the beam splitter, and the photodetector. The burst signal is input to the amplifier for optical power amplification, an amplified optical signal is input to the beam splitter for beam splitting, and an optical signal obtained after the beam splitting is input to the photodetector for optical signal detection. The receiver shown in FIG. 2 also has a technical problem that an overall response time for burst signals sent by different ONUs is relatively long, which may cause an increase in a packet loss rate.

The embodiments of the present invention provide an information transmission method in a PON system, to reduce an overall response time of an OLT for burst signals of different ONUs, to avoid an increase in a packet loss rate.

In the following embodiments, step numbers are merely for ease of description, and steps are not necessarily performed in a strict order.

Figure 3:
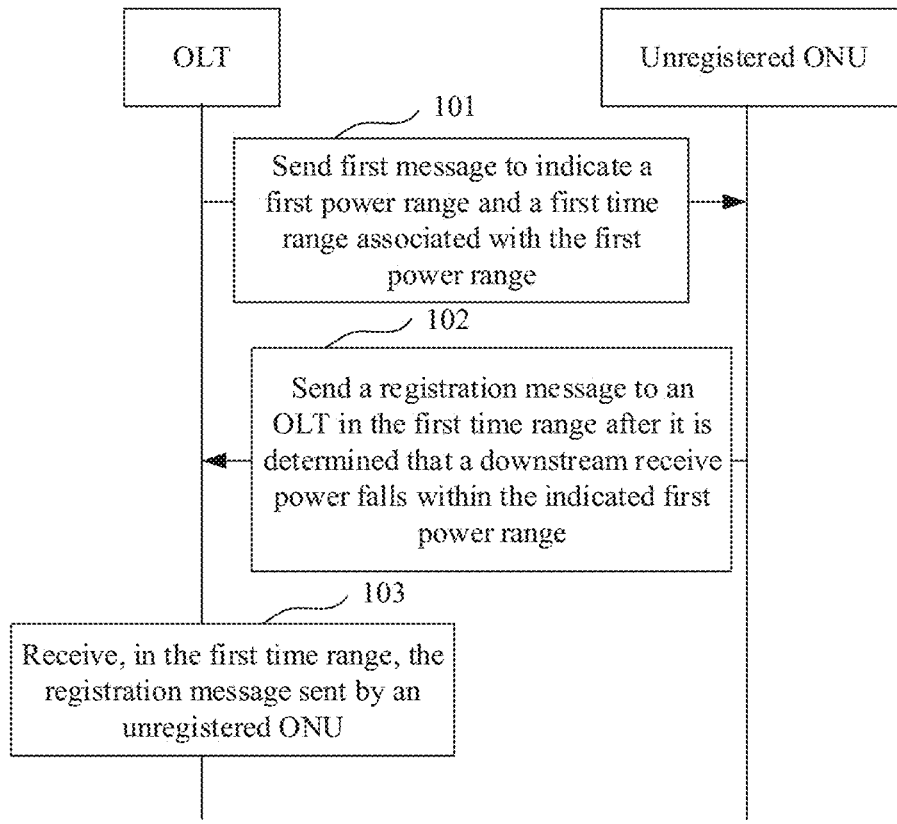
FIG. 3 is a schematic flowchart of an information transmission method in a PON system according to an embodiment of this application.

An embodiment of the present invention provides an information transmission method in a PON system. As shown in FIG. 3, the method mainly includes the following steps:

Step 101: An OLT sends first information to an unregistered ONU, where the first information includes at least one piece of indication information, and one piece of indication information indicates a first power range and a first time range associated with the first power range.

Step 102: The unregistered ONU receives the first information sent by the OLT, and sends a registration message to the OLT in the first time range based on the first information after determining that a downstream receive power falls within the first power range indicated in the indication information.

Step 103: The OLT receives, in the first time range, the registration message sent by the ONU, where the downstream receive power of the ONU falls within the first power range.

In the foregoing embodiment, the OLT sends one or more pieces of indication information indicating mutually associated time ranges and power ranges (a time range and a power range that are indicated in one piece of indication information and that are associated with each other may be specifically referred to as the first power range and the first time range) to the unregistered ONU. Different time ranges correspond to different power ranges. Therefore, when the downstream receive power of the unregistered ONU falls within one of the power ranges, the ONU registers in a time range corresponding to the power range. Based on different power ranges, ONUs whose downstream receive powers differ much may be classified into a plurality of ONU groups, and ONUs whose downstream receive powers fall within a same power range belong to a same ONU group. Registration signals of ONUs in a same ONU group are similar or differ little in signal strength when reaching the OLT, so that the OLT can quickly respond to the registration signals of the ONUs in the same ONU group, and an overall response time of the OLT for registration signals of ONUs in different ONU groups can be shortened, thereby resolving the foregoing technical problem.

It should be noted that a time range in this embodiment of the present invention is a grant timeslot segment associated with a power range (for example, the first time range is a grant timeslot segment associated with the first power range). rangeGrant timeslot segments associated with a plurality of power ranges are different. Time ranges corresponding to grant timeslot segments associated with different power ranges are different from each other in time domain, and the grant timeslot segments associated with the different power ranges may occupy one or more timeslots, or may occupy a time resource element less than one timeslot, for example, a time range less than 14 symbols. The time ranges corresponding to the grant timeslot segments associated with the different power ranges may be adjacent, may be partially adjacent, or may not be adjacent to each other.

It should be noted that each first time range for registration is an idle time period, and a registered ONU does not perform service communication with the OLT in the idle time period.

In step 101, the sending, by an OLT, first information to an unregistered ONU may be: broadcasting, by the OLT, the first information to all ONUs, where both a registered ONU and an unregistered ONU can receive the first information. The registered ONU does not respond after receiving the first information, and ignores the first information. The unregistered ONU responds to the first information after receiving the first information.

In step 101, one piece of first information may include a plurality of pieces of indication information, or may include only one piece of indication information. Each piece of indication information indicates a power range and a time range that are associated with each other.

Optionally, in step 101, the first information includes N pieces of indication information, power ranges indicated in any two of the N pieces of indication information are different, time ranges indicated in any two of the N pieces of indication information are different, and N is an integer greater than 1. An association relationship between a plurality of power ranges and a plurality of time ranges is sent by using the first information. Compared with separate indications in a plurality of times, time overheads of a registration notification can be reduced.

For example, the OLT preconfigures two power ranges, a first power range is associated with a first time range, a second power range is associated with a second time range, the first power range and the second power range are different, and the first time range and the second time range are different. Based on the two power ranges, ONUs whose downstream receive powers differ much may be classified into two ONU groups, and the first information may include two pieces of indication information. Specifically, a first piece of indication information indicates the first power range and the first time range associated with the first power range, and a second piece of indication information indicates the second power range and the second time range associated with the second power range.

For another example, the OLT preconfigures four power ranges, each power range is associated with one time range, the four power ranges are different from each other, and the four time ranges are different from each other. Based on the four power ranges, ONUs whose downstream receive powers differ much may be classified into four ONU groups, and the first information may include four pieces of indication information. Specifically, a first piece of indication information indicates a first power range and a first time range associated with the first power range, a second piece of indication information indicates a second power range and a second time range associated with the second power range, a third piece of indication information indicates a third power range and a third time range associated with the third power range, and a fourth piece of indication information indicates a fourth power range and a fourth time range associated with the fourth power range.

Optionally, in step 101, the first information sent by the OLT includes only one piece of indication information. After step 103, by performing step 101 to step 103 again, registration of an ONU in another power range may be completed.

For example, the OLT preconfigures two power ranges, a first power range is associated with a first time range, a second power range is associated with a second time range, the first power range and the second power range are different, and the first time range and the second time range are different. In this case, in step 101, the OLT may send a first piece of first information in a first time period and send a second piece of first information in a second time period, where the first piece of first information includes one piece of indication information used to indicate the first power range and the first time range associated with the first power range, and the second piece of first information includes one piece of indication information used to indicate the second power range and the second time range associated with the second power range. The first time period and the second time period may be consecutive or may be spaced by a period of time.

For another example, the OLT preconfigures N power ranges, each power range is associated with one time range, the N power ranges are different from each other, the N time ranges are different from each other, and N is a positive integer greater than 2. The OLT may sequentially send different first information in N different time periods, to separately indicate the N power ranges and the time ranges associated with the N power ranges.

In step 102, the downstream receive power is a power that is monitored by the ONU and that is of a downstream signal received by the ONU, and may be monitored in real time, or may be an average optical power that is monitored in a period of time and that is of received downstream signals or broadcast signals.

In a possible implementation scenario, the indication information in the first information includes power range information.

For example, two power ranges: $P<P1$ and $P \geq P1$ are prestored on an OLT side. When the indication information includes power range information, the power range information may directly be one power range, for example, power range information $P<P1$, or power range information $P \geq P1$.

Optionally, when the indication information includes the power range information, a physical meaning of the power range information is indicating an ONU whose downstream receive power falls within a power range corresponding to the power range information to register. When the indication information indicates the power range information, a specific meaning of the indication information is allowing an ONU that meets a related power condition to register, for example, allowing an ONU whose downstream receive power falls within the power range corresponding to the power range information to register, ensuring that the ONU can identify the physical meaning of the power range information.

For example, when the indicated power range information is $P<P1$, an ONU whose downstream receive power P is less than P1 is indicated to register; when the indicated power range information is $P \geq P1$, an ONU whose downstream receive power P is greater than or equal to P1 is indicated to register. In this case, after receiving the first information, the ONU can directly obtain a correspondence between a power range corresponding to the power range information and a time range in which registration is allowed. Based on this, the time range in which registration is allowed can be determined based on the power range within which the downstream receive power falls.

For another example, four power ranges: $P<P0$, $P0 \leq P<P1$, $P1 \leq P<P2$, and $P \geq P2$ are prestored on the OLT side. The indication information in the first information may be one of the power ranges. Specifically, when the power range information is $P<P1$, an ONU whose downstream receive power is less than P1 is instructed to register; when the power range information is $P0 \leq P<P1$, an ONU whose downstream receive power is greater than or equal to P0 but less than P is instructed to register; when the power range information is $P1 \leq P<P2$, an ONU whose downstream receive power is greater than or equal to P1 but less than P2 is instructed to register; when the power range information is $P \geq P2$, an ONU whose downstream receive power is greater than or equal to P2 is instructed to register. In this case, after receiving the indication information in the first information, the ONU can directly obtain a correspondence between a power range corresponding to the power range information and a time range in which registration is allowed. Based on this, the time range in which registration is allowed can be determined based on the power range within which the downstream receive power falls.

In another possible implementation scenario, the indication information in the first information may include identification information associated with the power range. For example, a correspondence between two flag values and two power ranges is prestored on each of an ONU side and the OLT side, and the indication information occupies 3 bits to indicate the power range.

Optionally, the indication information in the first information is specifically used to indicate an ONU whose downstream receive power falls within a power range corresponding to the identification information to register. When the indication information in the first information includes the identification information, a specific meaning of the indication information is allowing an ONU that meets a related power condition to register, for example, allowing an ONU whose downstream receive power falls within the power range corresponding to the identification information to register, ensuring that the ONU can identify a physical meaning of the identification information associated with the power range.

For example, a flag value 001 indicates an ONU whose downstream receive power P is less than P1 to register, and a flag value 010 indicates an ONU whose downstream receive power P is greater than or equal to P to register. In this case, after receiving the indication information, the ONU can determine, based on the flag value and the locally prestored correspondence between the flag values and the two power ranges, a correspondence between a power range and a time range in which registration is allowed, and determine, based on the power range within which the downstream receive power falls, the time range in which registration is allowed.

For another example, a correspondence between four flag values and four power ranges is prestored on each of the ONU side and the OLT side, and the first information still occupies 3 bits to fill in a flag value. A flag value 100 indicates an ONU whose downstream receive power P is less than P0 to register, a flag value 101 indicates an ONU whose downstream receive power P is greater than or equal to P0 but less than P1 to register, a flag value 110 indicates an ONU whose downstream receive power P is greater than or equal to P1 but less than P2 to register, and a flag value 111 indicates an ONU whose downstream receive power P is greater than P2 to register. In this case, after receiving any one piece of indication information, the ONU can determine, based on the flag value and the locally prestored correspondence between the flag values and the four power ranges, a correspondence between a power range and a time range in which registration is allowed. Based on this, the ONU can determine, based on the power range within which the downstream receive power falls, the time range in which registration is allowed.

It should be noted that a quantity of power ranges that are obtained through division can be flexibly designed based on a dynamic range of a receive power of a receiver of the OLT. Optionally, a larger dynamic range of the receive power of the receiver indicates a smaller quantity of power ranges obtained through division, and a smaller dynamic range of the receive power indicates a larger quantity of power ranges obtained through division, to facilitate, through division of power ranges, a proper balance between the dynamic range of the receive power of the receiver and an overall response rate for burst signals.

In step 101, the first information may be carried in a registration notification message or another notification message. For example, in an EPON, the first information may be carried in a registration message broadcast by the OLT. In a GPON, the first information may be carried in a registration grant message broadcast by the OLT.

In the EPON system, the OLT sends the first information by using an MPCP frame.

Figure 4A:
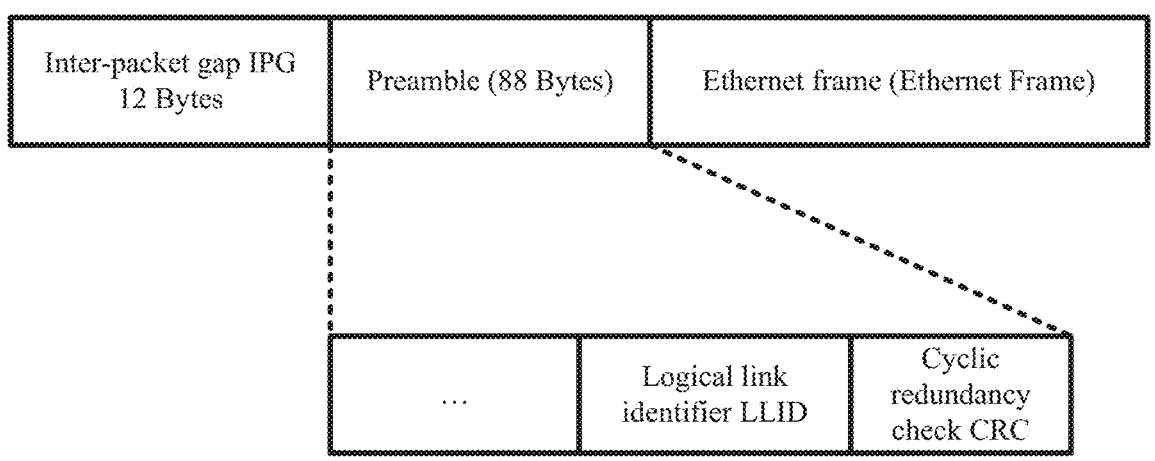
FIG. 4a is a schematic diagram of a message structure of an MPCP frame in an EPON system according to an embodiment of this application.
Figure 4B:
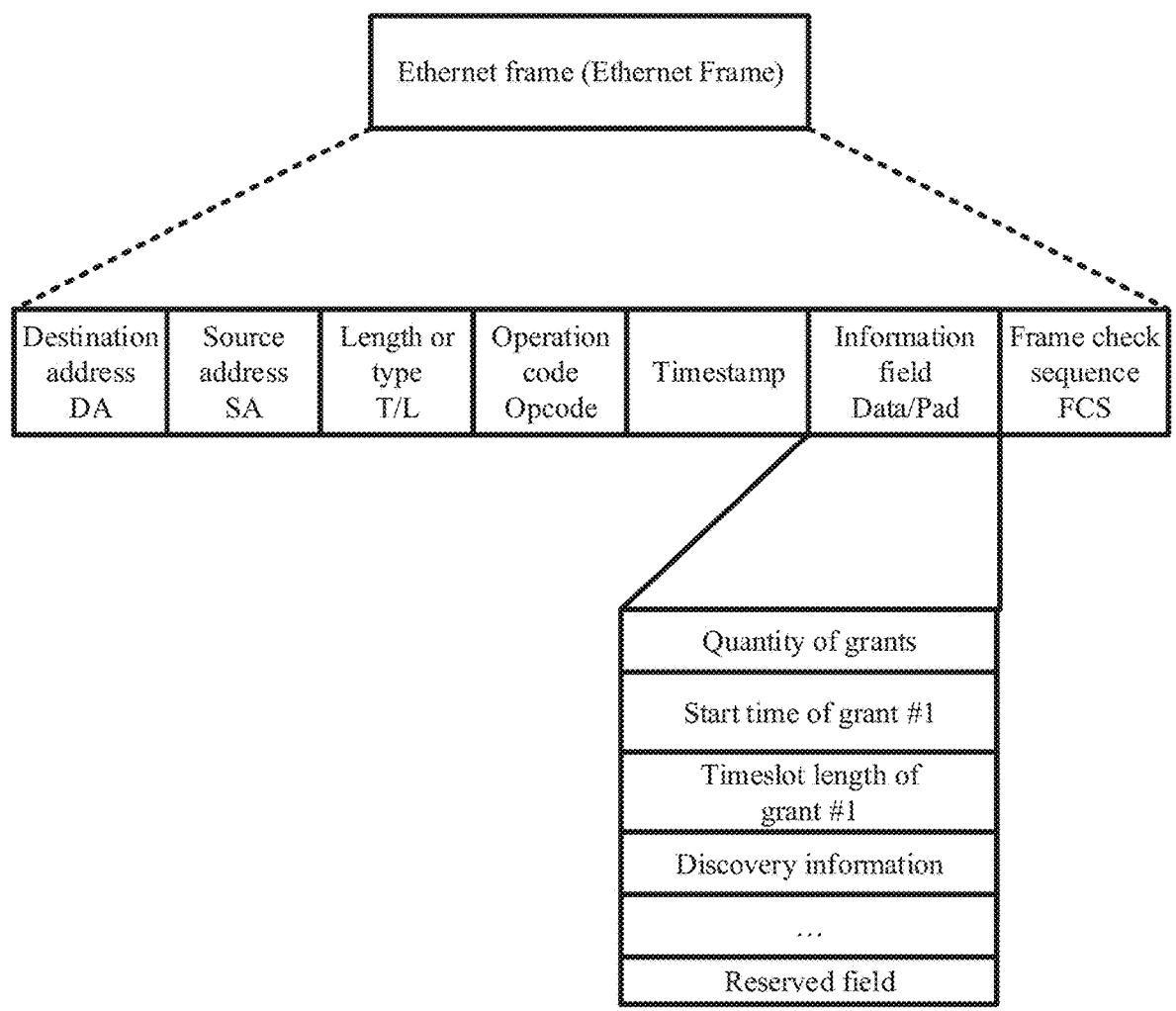
FIG. 4b is a schematic structural diagram of an Ethernet frame in an MPCP frame according to an embodiment of this application.
Figure 9:
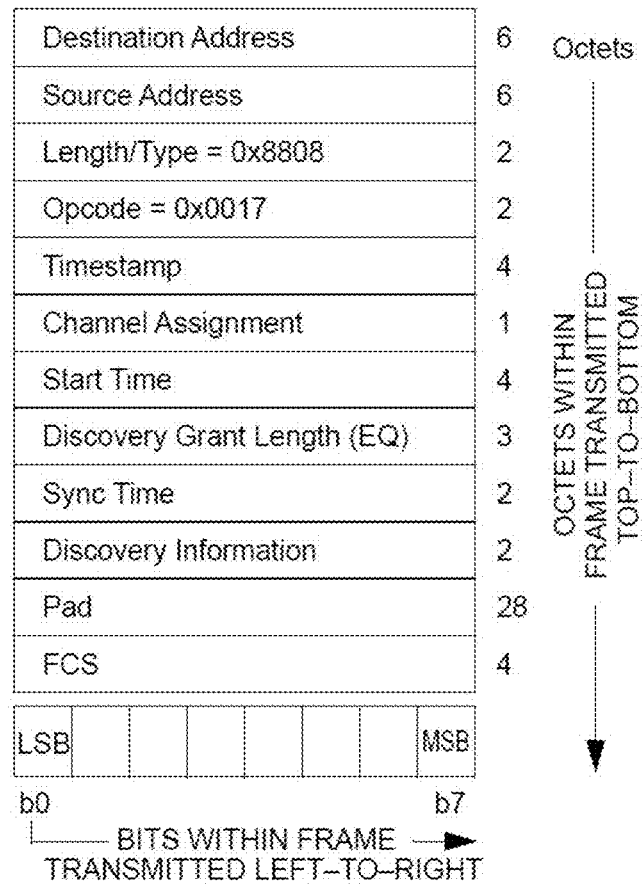
FIG. 9 is a schematic structural diagram of a Discovery GATE discovery message field according to an embodiment of this application.

The MPCP frame is an Ethernet packet. A message structure of the MPCP frame is shown in FIG. 4a and FIG. 4b, and includes an inter-packet gap (IPG), a preamble, and an Ethernet frame (Ethernet Frame). The Ethernet frame includes seven fields: a destination address DA, a source address SA, a length or type T/L, an operation code (Op-code), a timestamp (Timestamp), an information field data-pad, and a frame check sequence FCS. An entire discovery grant Discovery GATE field is in the data/pad field, and the data/pad field includes a quantity of grant timeslots (a current quantity is 1 by default when a registration notification is sent), a start time, a timeslot length, Discovery information, a reserved field, and the like. In the prior art, all ONUs register in one grant timeslot segment. A start time of the data/pad field of the Discovery GATE message field and the timeslot length are used to indicate a grant timeslot segment. For specific content of the data/pad field, refer to FIG. 9.

In this application, an improvement to the message structure of the MPCP frame is as follows: An indication field of the foregoing power range is added in the Discovery GATE message field, and is associated with an indication field of indication information indicating a grant timeslot segment. This indication field of the power range is used to indicate a power range, and the indication field of the power range may be a Discovery information (discovery information) field in the data/pad of the Discovery GATE message field. Optionally, for specific content of a message structure of the Discovery GATE message field, refer to Table 8-1.

In a possible design, the sending, by an OLT, first information to an unregistered ONU includes: sending, by the OLT, an MPCP frame to the unregistered ONU, where the MPCP frame includes a Discovery GATE (discovery grant) message field, and the Discovery GATE message field includes the indication information. An indication field is added in the Discovery GATE message field of the MPCP frame to indicate a power range. Compared with an existing EPON system, the MPCP frame is modified less, which facilitates standard maintenance. More importantly, by modifying a message structure of the MPCP frame, different grant timeslots can be configured for registration for ONUs whose link insertion loss differences are different. Then a registration signal received by the OLT in any grant timeslot is sent by an ONU whose insertion loss difference is small, which facilitates a decrease in a response time of the OLT for the registration signal.

Specifically, a power range is included in the discovery information (Discovery information) field, and Discovery information may be extended by at least 3 bits on the basis of original 2 bytes, namely, 16 bits, to indicate the power range, where second indication information is indicated by a start time and a timeslot length.

Optionally, in the field extended in the Discovery information field, different indicator values represent different power ranges, and an indicator value may be power range information or may be a flag value of a power range.

For example, a correspondence between four indicator values and four power ranges is prestored on each of the ONU side and the OLT side. As shown in Table 1, when the indication field extended in the Discovery information field is set to 100, it indicates that when receiving this Discovery GATE grant, all ONUs whose downstream receive powers are less than or equal to P0 can send, in a time range of this grant, a registration message to the OLT to register. When the indication field is set to 101, when receiving this Discovery GATE grant, all ONUs whose downstream receive powers are greater than P0 but less than or equal to P1 can send, in a time range of this grant, a registration message to the OLT to register. When the indication field is set to 110, when receiving this Discovery GATE grant, all ONUs whose downstream receive powers are greater than P1 but less than or equal to P2 can send, in a time range of this grant, a registration message to the OLT to register. When the indication field is set to 111, when receiving this Discovery GATE grant, all ONUs whose downstream receive powers are greater than P2 can send a registration message to the OLT in a timeslot corresponding to this grant.

Optionally, as shown in Table 1, when the indication field extended in the Discovery information field is set to 000, when receiving this Discovery GATE grant, ONUs at all power levels can send, in a time range of this grant, a registration message to the OLT to register.

TABLE 1

| Discovery information | ONU granted for registration |
| --- | --- |
| 100 | ONU whose downstream receive power is less than or equal to P0 |
| 101 | ONU whose downstream receive power is greater than P0 but less than or equal to P1 |
| 110 | ONU whose downstream receive power is greater than P1 but less than or equal to P2 |
| 111 | ONU whose downstream receive power is greater than P2 |
| 000 | ONUs at all power levels |

Optionally, in this application, the message structure of the MPCP frame may be further improved as follows: An ONU logical identifier of an ONU group is added in a logical link identifier LLID field of the preamble.

Specifically, the OLT may preconfigure ONU logical identifiers of a plurality of ONU groups based on a quantity of power ranges obtained through division. One ONU logical identifier represents one ONU group, an ONU logical identifier of one ONU group is associated with one piece of indication information of the Discovery GATE message field, and the OLT may instruct, by using different broadcast ONU logical identifiers, ONUs of different groups to separately register in different time periods.

Addition of the ONU logical identifier of the ONU group in the LLID field of the preamble is applicable to a case in which the first information includes one piece of indication information, and is also applicable to a case in which the first information includes a plurality of pieces of indication information.

In the GPON system, the OLT sends the first information by using a GTC frame.

Figure 5A:
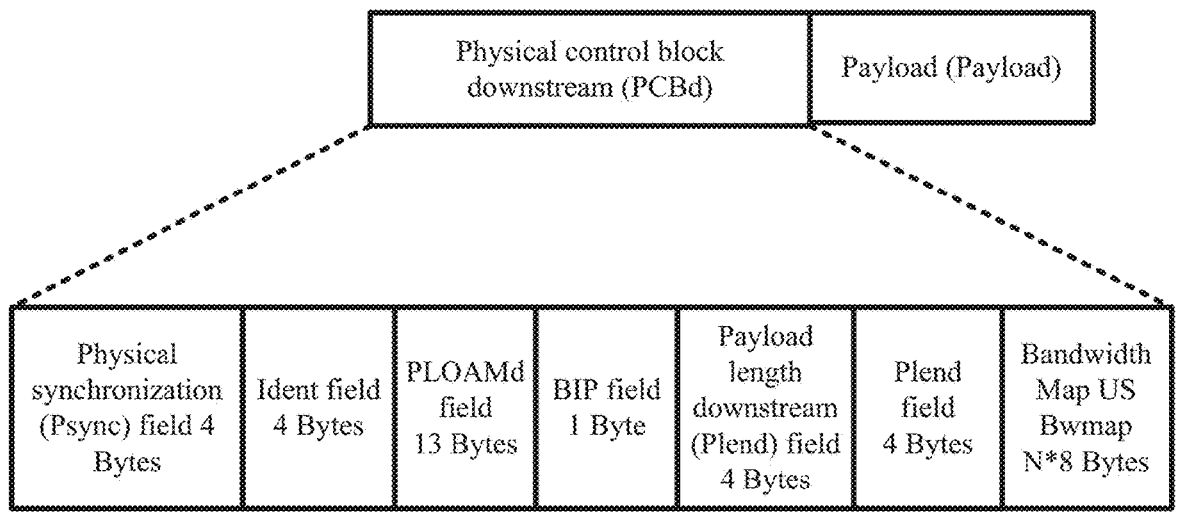
FIG. 5a is a schematic diagram of a message structure of a downstream GTC frame in a GPON system according to an embodiment of this application.
Figure 5B:
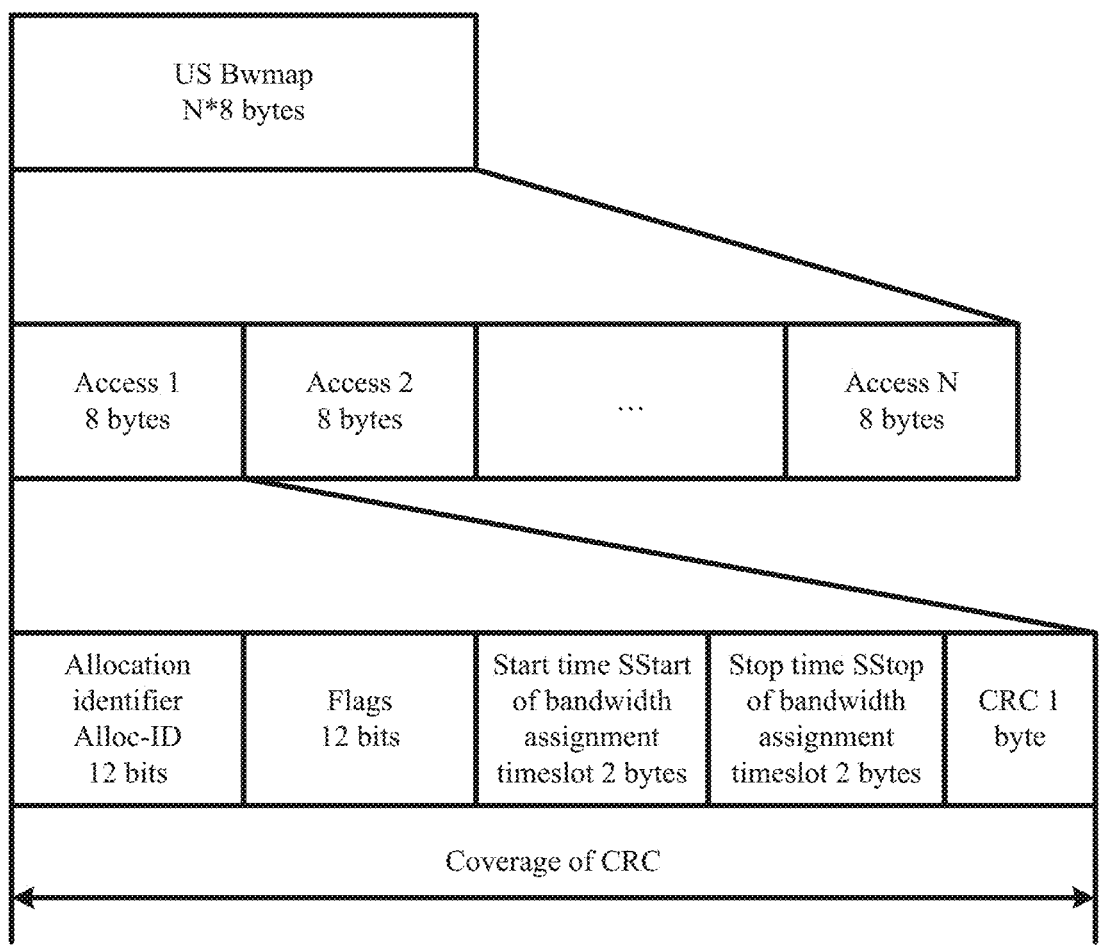
FIG. 5b is a schematic structural diagram of a BWmap message field in a downstream GTC frame according to an embodiment of this application.
Figure 6A:
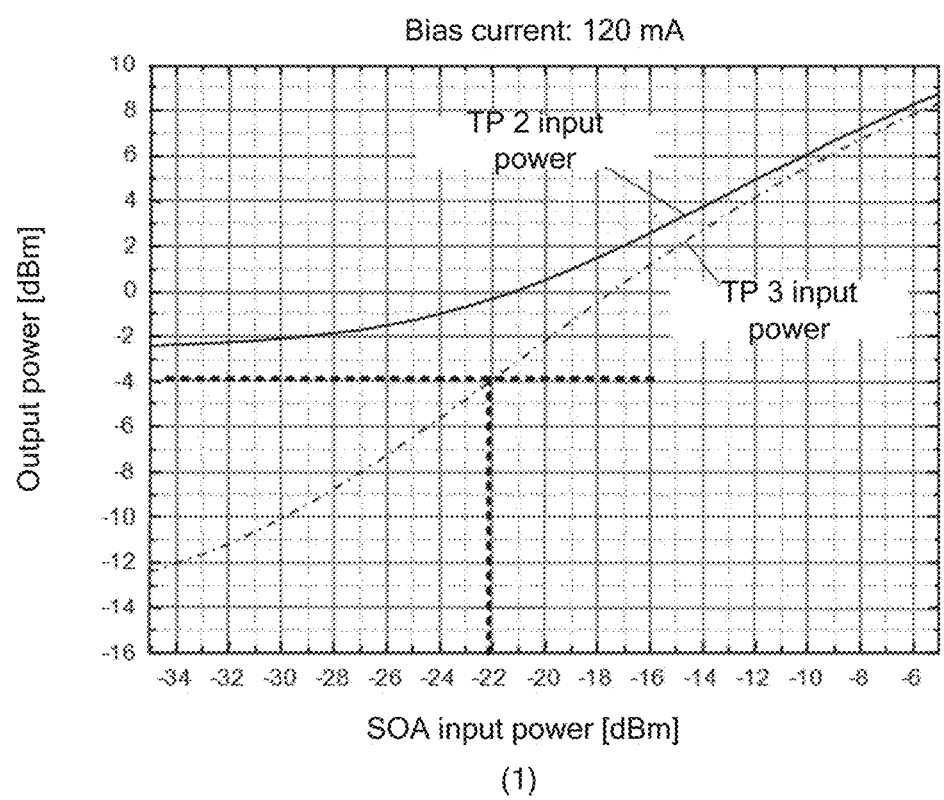
FIG. 6a, FIG. 6b, FIG. 6c, and FIG. 6d show a curve of impact of different values of a bias current of an amplifier of an OLT receiver on a dynamic range of the receiver according to an embodiment of this application.
Figure 6B:
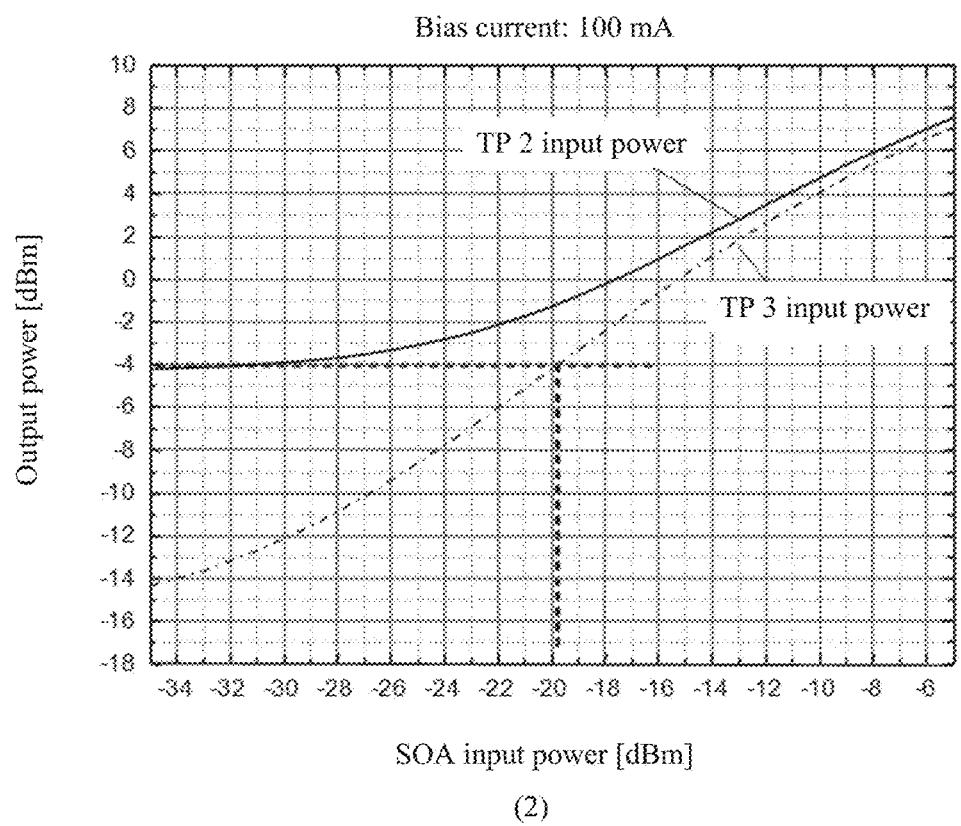
Figure 6C:
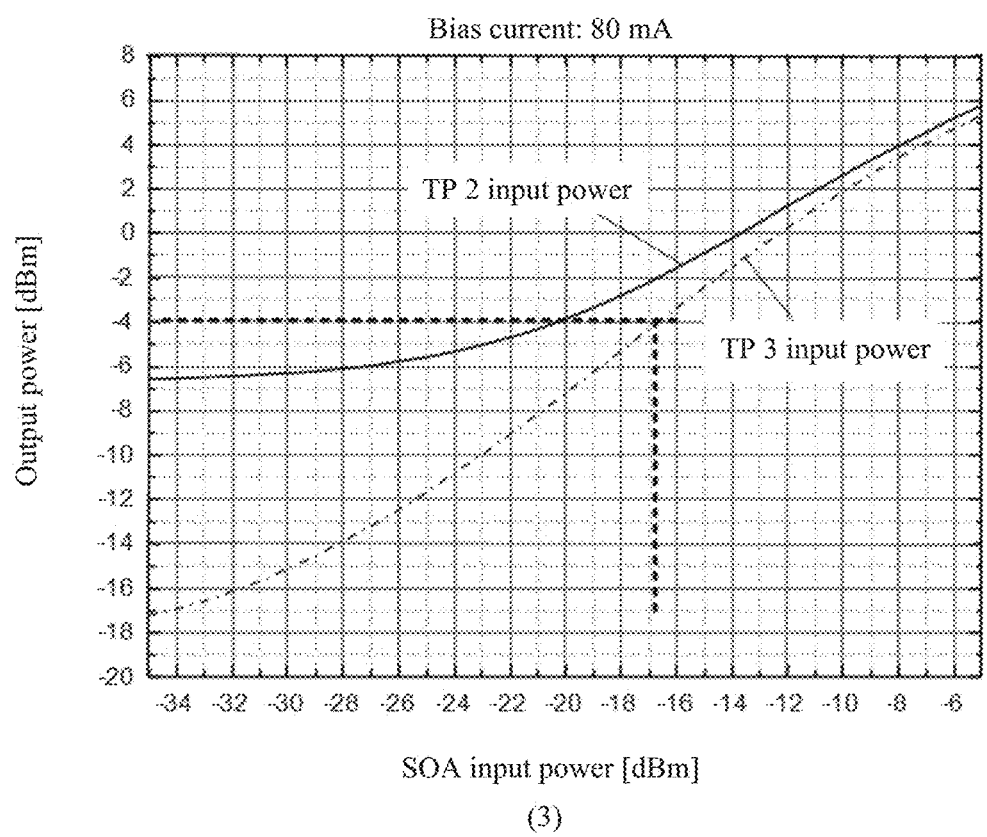
Figure 6D:
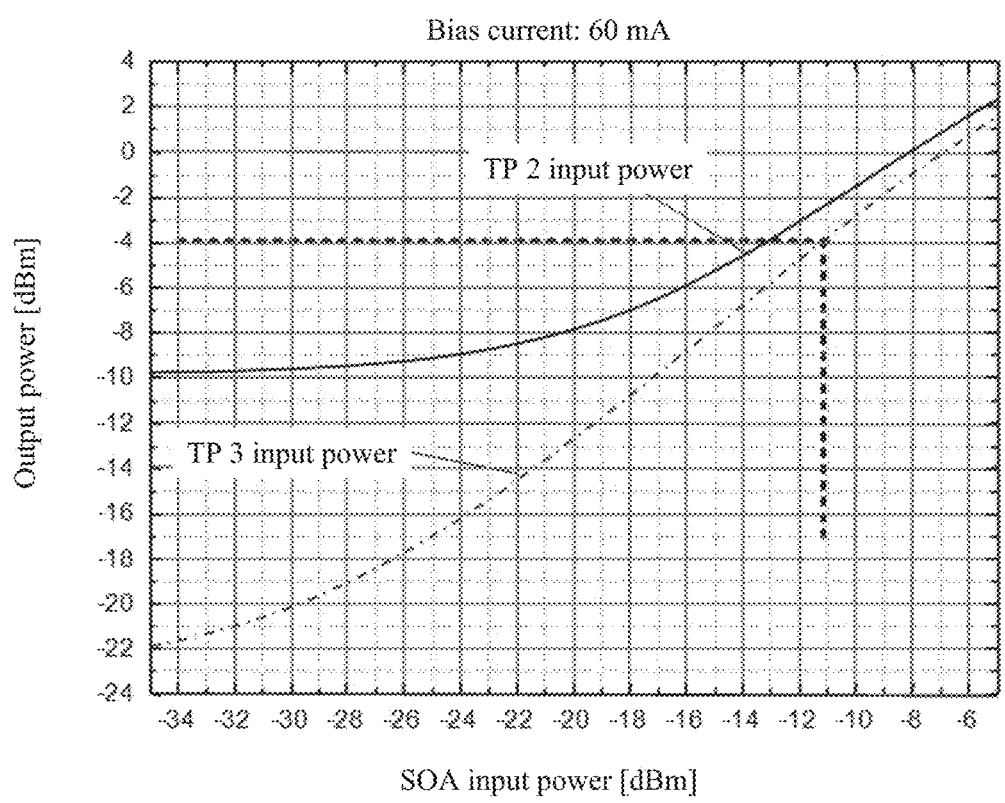
Figure 10:
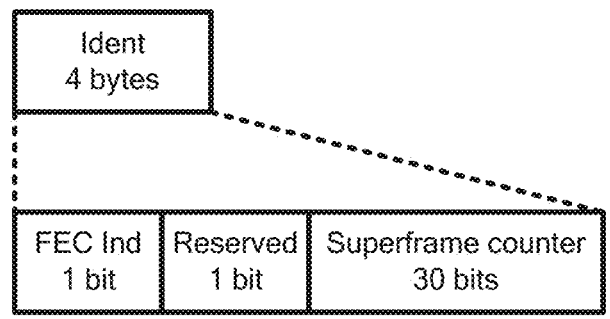
FIG. 10 is a schematic structural diagram of an Ident field in a downstream GTC frame format according to an embodiment of this application.
Figure 11:
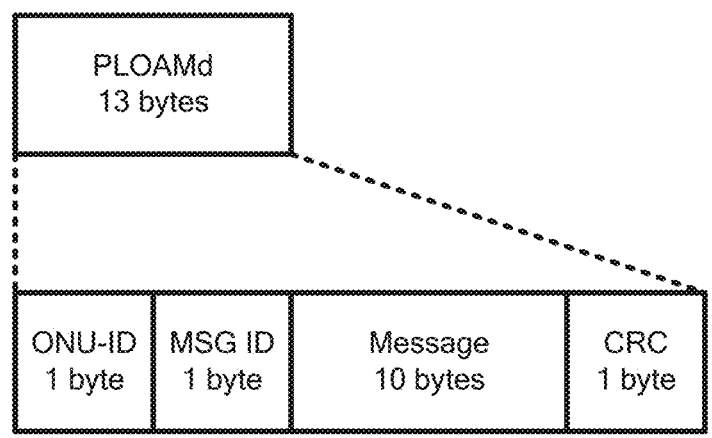
FIG. 11 is a schematic structural diagram of a PLOAMd field in a downstream GTC frame format according to an embodiment of this application.
Figure 12:
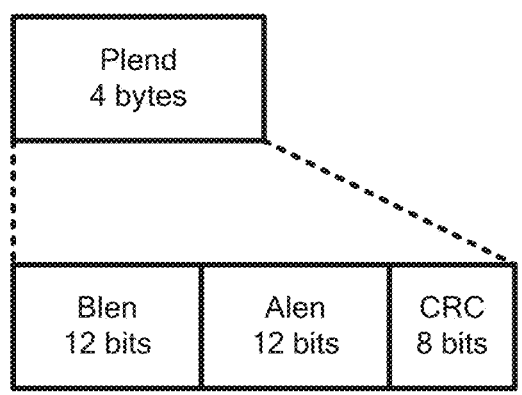
FIG. 12 is a schematic structural diagram of a Plend field in a downstream GTC frame format according to an embodiment of this application.

A message structure of the GTC frame is shown in FIG. 5a and FIG. 5b. The message structure of the GTC frame includes: a physical control block downstream (PCBd) and a payload (Payload). The PCBd includes a physical synchronization (Psync) field, an Ident field (the Ident field is used to indicate a larger frame structure, and for a structure of the Ident field, refer to FIG. 10), a PLOAMd field (the PLOAMd field carries a downstream PLOAM message and is used to carry a PLOAM message, and for a structure of the PLOAMd field, refer to FIG. 11), a BIP field (the BIP field is used to measure a quantity of errors on a link), a Plend field (the Plend field is used to indicate a length of a bandwidth map BWmap, and for a structure of the Plend field, refer to FIG. 12), and a US BWmap field (each entry in an array represents bandwidth assigned to a particular receiver). A quantity of entries in a mapping table is specified by the Plend field. In this application, the US BWmap is used for ONU logical identifier assignment, and the like. For a structure of the US BWmap, refer to FIG. 5b. For a meaning of each part of the field, refer to Table 15. The US BWmap field includes N concatenated 8-byte fields: Access 1, Access 2, . . . , and Access N. Using the Access 1 field as an example, the Access 1 field includes an Alloc-ID field, a reserved field, an SStart field, an SStop field, and the like. An Access field indicates an address segment of an ONU. In the prior art, the Alloc-ID field may be used to indicate a unique identifier of the ONU (indicating a transmit timeslot of an upstream signal), or may be used to indicate a special flag value to represent all unregistered ONUs. The payload includes a plurality of GEM frames having different lengths.

In the prior art, all ONUs register in one grant timeslot segment. An SStart field and an SStop field in one Alloc-ID of the US BWmap field are used to indicate one grant timeslot segment.

In this application, an improvement to the message structure of the GTC frame is as follows: A plurality of Access indicator fields are further extended on the basis of original Access indicator fields of the US BWmap field. In the extended Access indicator fields, an Alloc-ID field includes a power range to indicate the power range, and an SStart field and an SStop field include a time range associated with the power range, to indicate a grant timeslot segment associated with the power range. The SStart field indicates a start moment of a time range associated with an Alloc-ID value, and the SStop field indicates a stop moment of the time range associated with the Alloc-ID value.

In a possible design, the sending, by an OLT, first information to an unregistered ONU includes: sending, by the OLT, a GTC frame to the unregistered ONU, where the GTC frame includes a BWmap message field, and the BWmap message field includes the indication information. An indication field is added in the BWmap message field of the GTC frame to indicate a power range. Compared with an existing GPON system, a message structure of the GTC frame is modified less, which facilitates standard maintenance. More importantly, by modifying the message structure of the GTC frame, different grant timeslots can be configured for registration for ONUs whose link insertion loss differences are different. Then a registration signal received by the OLT in any grant timeslot is sent by an ONU whose insertion loss difference is small, which facilitates a decrease in a response time of the OLT for the registration signal.

Optionally, in the fields extended in the US BWmap field different indicator values of the Alloc-ID field represent different power ranges, and an indicator value of the Alloc-ID field may be power range information or may be a flag value of a power range.

For example, a correspondence between four Alloc-ID values and four power ranges is prestored on each of the ONU side and the OLT side. Table 2 shows the correspondence between the Alloc-ID values and the power ranges. When the Alloc-ID in the BWmap is set to 1019, it indicates that when receiving this BWmap grant, all ONUs whose downstream receive powers are less than or equal to P0 can send, in a time range of this grant, a registration message (for example, a Serial_Number_ONU message) to the OLT to register. When the Alloc-ID in the BWmap is set to 1020, when receiving this BWmap grant, all ONUs whose downstream receive powers are greater than P0 but less than or equal to P1 can send, in a time range of this grant, a registration message to the OLT to register. When the Alloc-ID in the BWmap is set to 1021, when receiving this BWmap grant, all ONUs whose downstream receive powers are greater than P but less than or equal to P2 can send, in a time range of this grant, a registration message to the OLT to register. When the Alloc-ID in the BWmap is set to 1022, when receiving this BWmap grant, all ONUs whose downstream receive powers are greater than P2 can send a registration message to the OLT in a timeslot corresponding to this grant.

Optionally, one Alloc-ID and a time range associated with the Alloc-ID may be additionally added to indicate an ONU whose power range does not fall within a range of these power ranges or an ONU whose power range cannot be identified to register. For example, in Table 2, when the Alloc-ID in the BWmap is set to 1023, when receiving this BWmap grant, all ONUs can send, in a time range of this grant, a registration message to the OLT to register. Optionally, for a specific structure of the Alloc-ID, refer to Table 14.

TABLE 2

| Alloc-ID | ONU granted for registration |
| --- | --- |
| 1019 | ONU whose downstream receive power is less than or equal to P0 |
| 1020 | ONU whose downstream receive power is greater than P0 but less than or equal to P1 |
| 1021 | ONU whose downstream receive power is greater than P1 but less than or equal to P2 |
| 1022 | ONU whose downstream receive power is greater than P2 |
| 1023 | ONUs at all power levels |

Based on the registration manners of the foregoing EPON series and GPON series, timeslot discovery grants are separately performed for ONUs with different downstream receive powers in groups obtained through classification based on power ranges, and then the ONUs register. After registration is completed, the ONU can be marked and grouped based on a power range within which the downstream receive power of the ONU falls. In this way, a response time for burst signals of ONUs in a same group differs less, which facilitates a decrease in an overall response time for all ONU groups.

In addition to the technical problem that a response time for a burst signal of an ONU is long, an existing OLT receiver also has another problem. Due to an overload power limitation of the receiver, a dynamic range of a receive power of the OLT receiver is limited and hardly meets a requirement that the dynamic range of the receive power of the OLT receiver reaches up to 20 dB in the PON system. Specific reasons are as follows:

Still using the receiver shown in FIG. 2 as an example, optical powers of the burst signal are different at different nodes of the receiver. Referring to Table 3, when an optical power of a TP 1 node is −32.3 dBm, the receiver can just implement an error rate of 1E-3. When an input power of the TP 1 node increases to −22 dBm, an input power of the APD has reached −4 dBm. If an overload power (a maximum input power allowed by the APD) of the APD is −4 dBm, the dynamic range of the receive power of the receiver is 10.3 dB, namely, a difference between −22 dBm and −32.3 dBm. The APD needs to be sacrificed to expand the dynamic range of the receive power of the receiver. For example, after the APD is overloaded, the optical power of the TP 1 node still increases. When the optical power of the TP 1 node increases to −17.4 dBm, the input power of the APD may reach +0 dBm. In this case, the input power of the APD has reached a damage power of the APD. However, the dynamic range of the receive power is only 15 dB (a difference between −17.4 dBm and −32.3 dBm), the requirement that the dynamic range of the receive power of the OLT receiver is at least 20 dBm in the PON system is still hardly met.

The optical power of the TP 1 node is an optical power input to the amplifier, and is also referred to as an input power of the amplifier. An optical power of a TP 2 node is an optical power input to the beam splitter, and is also referred to as an input power of the beam splitter. An optical power of a TP 3 node is an optical power input to the photodetector, and is also referred to as an input power of the photodetector. The dynamic range of the receive power of the receiver of the OLT is a power range formed by a minimum input optical power and a maximum input optical power that are allowed by the receiver, namely, a difference between a maximum optical power allowed by the TP 1 node and a minimum optical power allowed by the TP 1 node. The minimum optical power allowed by the TP 1 node is limited by a receiver sensitivity of the receiver. The minimum optical power allowed by the TP 1 node needs to ensure that an error rate of a burst signal received by the receiver is less than at least 1E-3. The maximum optical power allowed by the TP 1 node is limited by a maximum optical power allowed by the TP 3 node, and the maximum optical power allowed by the TP 3 node should be less than an overload optical power of the photodetector.

TABLE 3

| Minimum input power (dBm) of SOA | Maximum input power (dBm) of SOA | Maximum output power (dBm) of SOA | Maximum input power (dBm) of APD | Dynamic range (dB) of receive power of receiver |
|---|---|---|---|---|
| −32.3 | −13.3 | 4 | 3 | 19 |
| −32.3 | −17.4 | 1.8 | 0 | 15 |
| −32.3 | −22 | −0.3 | −4 | 10.3 |

Figure 1D:
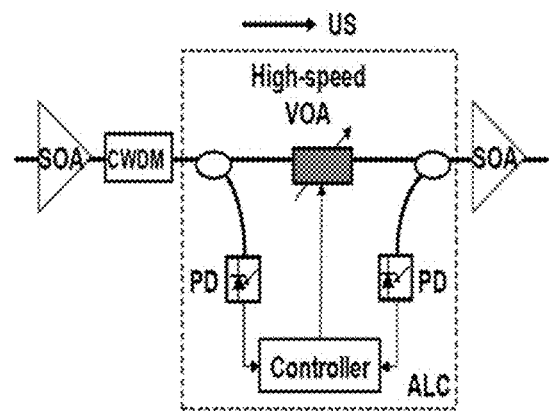
FIG. 1d is a schematic structural diagram of an OLT receiver in the prior art.

A solution for expanding an overall dynamic range of a receive power of receiving a burst signal by a receiver is provided. As shown in FIG. 1d, an OLT receiver includes an SOA, an optical splitter, a variable optical attenuator VOA, a plurality of monitor PDs, and a photodetector. An optical signal output from the SOA first passes through the optical splitter, and then a part of optical signal split out of the optical splitter enters a monitor PD, and the other part enters the variable optical attenuator VOA, and is input to the photodetector after an optical attenuation adjustment by the variable optical attenuator VOA. Specifically, a process of the optical attenuation adjustment to the optical signal by the variable optical attenuator VOA is as follows: The monitor PD is connected to the variable optical attenuator VOA by using an automatic attenuation controller. The controller dynamically adjusts an optical attenuation value of the variable optical attenuator VOA for the optical signal by using an output power of the SOA that is read by the monitor PD, to adjust an optical power of the optical signal that enters the photodetector. When the received optical signal is strong, the variable optical attenuator VOA can be controlled by the controller to adjust the optical attenuation value for the optical signal to a large value, to reduce the optical power that enters the photodetector and avoid causing overload of the photodetector. Therefore, a maximum input power of the receiver is not limited by the overload power of the photodetector, which facilitates expansion of the dynamic range of the receive power of the entire OLT receiver. However, a disadvantage is that a plurality of components, such as the optical splitter, the variable optical attenuator VOA, the monitor PD, and the automatic attenuation controller, need to be additionally added in the OLT. Packaging of the optical splitter and the variable optical attenuator VOA is relatively complex, and costs of the OLT are significantly increased.

On the basis of performing registration at different time based on power ranges in the foregoing embodiment, in this application, different receive parameters are set for different power ranges while no component is additionally added in the OLT, and a registration signal sent by an ONU in a power range is received based on a receive parameter. Therefore, the maximum input power of the receiver is not limited by the overload power of the photodetector, which facilitates expansion of the dynamic range of the receive power of the entire OLT receiver.

Specifically, in step 101, the power range associated with the first time range is further associated with a receive parameter. Receive parameters associated with any two different power ranges are different. In other words, any power range is not only associated with a time range but also associated with a receive parameter, and different power ranges correspond to different receive parameters.

Receive parameters are associated with power ranges, so that the OLT classifies ONUs into groups based on the power ranges, and receives registration signals of different ONU groups by using different receive parameters. Through a dynamic adjustment to the receive parameter, a sensitivity of an OLT receiver and an overload power of the OLT receiver can be balanced, thereby expanding the dynamic range of the receive power of the receiver. For example, when a received signal is relatively weak, to enhance the sensitivity of the entire OLT receiver as much as possible, a bias current of an amplifier may be set to a relatively high level, to ensure that the amplifier provides a sufficiently high gain. However, when a signal input to the amplifier is strong, the amplifier does not need to provide a high gain, and the bias current of the amplifier may be reduced, so that a power of a signal output from the amplifier to the photodetector is not excessively large, thereby preventing overload of the receiver.

Further, in step 103, the receiving, by the OLT, a registration message in the first time range includes: receiving, by the OLT, the registration message by using the first receive parameter associated with the first time range.

Optionally, the receive parameter may be at least one of a bias current of the amplifier, a reverse bias voltage of the photodetector, and light attenuation between the amplifier and the photodetector. The light attenuation between the amplifier and the photodetector may be adjusted by disposing a variable attenuator between the amplifier and the photodetector.

If the receive parameter is the bias current of the amplifier, on the basis of separately performing timeslot discovery grants and registration in groups obtained through classification based on power ranges in the foregoing embodiment, receiving a registration message based on a corresponding receive parameter means that for an ONU whose downstream receive power is relatively high, the bias current of the amplifier is set to be relatively small in a timeslot in which a signal reaches the OLT, and then a response starts to be made to the registration signal from the ONU, and for an ONU whose downstream receive power is relatively low, the bias current of the amplifier is set to be relatively large in a timeslot in which a signal reaches the OLT, which facilitates expansion of the dynamic range of the receive power of the entire OLT receiver.

If the receive parameter is the reverse bias voltage of the detector, on the basis of separately performing timeslot discovery grants and registration in groups obtained through classification based on power ranges in the foregoing embodiment, receiving a registration message based on a corresponding receive parameter means that for an ONU whose downstream receive power is relatively high, the reverse bias voltage of the detector is set to be relatively small in a timeslot in which a signal reaches the OLT, and then a response starts to be made to the registration signal from the ONU, and for an ONU whose downstream receive power is relatively low, the reverse bias voltage of the detector is set to be relatively large in a timeslot in which a signal reaches the OLT, and then a response is made to the registration signal from the ONU, which facilitates expansion of the dynamic range of the receive power of the entire OLT receiver.

If the receive parameter is the optical attenuation value adjusted by the variable attenuator, on the basis of separately performing timeslot discovery grants and registration in groups obtained through classification based on power ranges in the foregoing embodiment, receiving a registration message based on a corresponding receive parameter means that for an ONU whose downstream receive power is relatively high, the optical attenuation of the variable attenuator is set to be relatively large in a timeslot in which a signal reaches the OLT, and then a response starts to be made to the registration signal from the ONU, and for an ONU whose downstream receive power is relatively low, the optical attenuation of the variable attenuator of the detector is set to be relatively small in a timeslot in which a signal reaches the OLT, and then a response is made to the registration signal from the ONU, which facilitates expansion of the dynamic range of the receive power of the entire OLT receiver.

Specifically, for example, a time range corresponding to a power range a1 is a grant timeslot b1, and a receive parameter corresponding to the grant timeslot b1 is a bias current c1 of the amplifier. An adjustment process of the receive parameter includes: The receive parameter is totally controlled by a MAC instruction in the grant timeslot b1, and the bias current c1 is implemented by corresponding circuit control in an OLT optical module. The OLT sends, in the grant timeslot b1, an adjustment command to the OLT optical module through MAC by using an inter-integrated circuit (Inter-Integrated Circuit, IIC) bus interface. After the OLT optical module receives the adjustment command, a corresponding circuit in the OLT optical module adjusts the bias current of the amplifier to c1. Likewise, when the receive parameter is the reverse bias voltage of the photodetector or the optical attenuation value of the variable attenuator disposed between the amplifier and the photodetector, the receive parameter is implemented by corresponding circuit control in the OLT optical module.

In a possible design, after the receiving, by the OLT, a registration message in the first time range, the method further includes: assigning, by the OLT, an ONU identifier to the unregistered ONU, and establishing an association relationship between the first receive parameter associated with the first time range and the assigned ONU identifier. In this application, the first time range corresponds to the first receive parameter, and a second time range corresponds to a second receive parameter. The "first" and "second" herein are intended to distinguish between different values of receive parameters.

A process of establishing an association relationship between a receive parameter and an assigned ONU identifier in a registration process is equivalent to a process of classifying all ONUs into groups based on power ranges obtained through division and a correspondence between power ranges and time ranges. After classification, one ONU group corresponds to one power range, and one power range corresponds to one time range and one receive parameter. Different ONU groups correspond to different time ranges and different receive parameters, which can not only implement a quick response to a burst signal, but also effectively expand the dynamic range of the receive power of the OLT receiver.

After the assigning, by the OLT, an ONU identifier to the unregistered ONU, the registration process further includes: sending, by the OLT to an ONU registered in a current time range, an ONU identifier assigned to the ONU.

After registration is completed, the OLT indicates grant timeslot information of an upstream optical signal to different registered ONUs. Specifically, a configuration and sending process of grant timeslot information of an upstream optical signal for a registered ONU may be consistent with that in the prior art, but a process of receiving the upstream optical signal is improved compared with that in the prior art, to be specific, the upstream optical signal is received based on a receive parameter corresponding to an ONU identifier.

In a possible design, after registration is completed, the method further includes: sending, by the OLT, second information to a registered ONU, where the second information includes at least one piece of indication information, and one piece of indication information indicates an ONU identifier, and a second time range associated with the ONU identifier. The second time range is a transmit timeslot occupied by the ONU corresponding to the ONU identifier when the ONU sends an upstream optical signal.

Optionally, the second information may include one piece of indication information or may include a plurality of pieces of indication information.

In a possible design, after the sending, by the OLT, second information to a registered ONU, the method further includes:

receiving, by the OLT in the second time range by using a receive parameter associated with the second time range, an upstream optical signal sent by the registered ONU, where the upstream optical signal includes information indicating an ONU identifier of the registered ONU, the second time range is associated with the ONU identifier indicated in the upstream optical signal, and the receive parameter associated with the second time range is specifically the receive parameter associated with the ONU identifier. The second time range is associated with the ONU identifier, and the ONU identifier is also associated with the receive parameter. Therefore, the second time range and the receive parameter that are associated with the same ONU identifier are also associated with each other.

If that an ONU identifier LLID 1 is associated with a time range 1 and a receive parameter 1 and that an ONU identifier LLID 2 is associated with a time range 2 and a receive parameter 2 are prestored in the OLT, the OLT receives, in the time range 1 by using the receive parameter 1, an upstream optical signal sent by a registered ONU whose ONU identifier is the LLID 1, and the OLT receives, in the time range 2 by using the receive parameter 2, an upstream optical signal sent by a registered ONU whose ONU identifier is the LLID 2. When the OLT sends the second information to the registered ONU, the LLID 1 and the time range 1 associated with each other, and the LLID 2 and the time range 2 associated with each other may be sent by using one message or may be sent by using two messages.

Optionally, when the second information includes the plurality of pieces of indication information, the second information indicates a plurality of ONU identifiers. Based on an association relationship between the ONU identifiers and receive parameters, when at least two of the ONU identifiers indicated in the second information are associated with a same receive parameter, second time ranges associated with the at least two ONU identifiers are adjacent.

For example, there are two ONU identifiers: an LLID 1 and an LLID 2 in the second information, the LLID 1 and the LLID 2 are associated with a same receive parameter, the LLID 1 is associated with a time range 1, the LLID 2 is associated with a time range 2, and the time range 1 and the time range 2 are consecutive in time domain. For another example, three ONU identifiers: an LLID 1, an LLID 2, and an LLID 3 in the second information are associated with a same receive parameter, the LLID 1 is associated with a time range 1, the LLID 2 is associated with a time range 2, the LLID 3 is associated with a time range 3, and the time range 1 and the time range 2 as well as the time range 2 and time range 3 are consecutive in time domain.

In this way, time for sending upstream optical signals by ONUs in a same ONU group can be concentrated in one time period. The OLT receiver receives, in this time period based on a same receive parameter, the upstream optical signals sent by the ONUs in the same ONU group, which facilitates a decrease in a response time of the OLT receiver for the upstream optical signals sent by the ONUs in the same ONU group.

In a possible design, after the receiving, by the OLT, an upstream optical signal sent by the registered ONU, the method further includes: determining, by the OLT, an optical power of the received upstream optical signal, and determining the power range within which the optical power of the upstream optical signal falls; and when a receive parameter associated with the determined power range does not match the receive parameter associated with the ONU identifier indicated in the upstream optical signal, changing the receive parameter associated with the ONU identifier to the receive parameter associated with the determined power range.

The foregoing manner is used to update the stored association relationship between the ONU identifier and the receive parameter. For some special ONUs, for example, a downstream receive power of the ONU may be low, but a transmitted upstream optical signal is relatively strong, and a power at which the upstream optical signal reaches the OLT is relatively high. As a result, a power range corresponding to an ONU identifier does not match the power at which the upstream optical signal sent by the ONU actually reaches the OLT. If the upstream optical signal is still received based on a receive parameter associated with the ONU identifier, overload of the OLT receiver is prone to occur. If the overload of the receiver needs to be avoided, the correspondence between the ONU identifier and the corresponding receive parameter needs to be updated. To be specific, when the receive parameter associated with the power range within which the upstream optical signal falls does not match the receive parameter associated with the ONU identifier indicated in the upstream optical signal, the receive parameter associated with the ONU identifier is changed to the receive parameter associated with the determined power range.

In a possible design, after the receiving, by the unregistered ONU, the first information sent by the OLT, the method further includes: skipping sending, by the ONU, the registration message to the OLT when determining that the downstream receive power does not match any power range indicated in the first information. The ONU does not register when the ONU does not meet a power condition indicated by the OLT, thereby ensuring that ONU groups obtained through classification based on a registration process are accurate.

For any ONU, after receiving one piece of first information, a downstream receive power of the ONU may not fall within a power range indicated in indication information. In this case, the ONU does not need to send a registration message in a time range indicated in the first information. The registration message is sent in a corresponding time range only when a power range indicated in one piece of first information received by the ONU includes the downstream receive power of the ONU.

On the basis of separately performing timeslot discovery grants and registration in groups obtained through classification based on power ranges in the foregoing embodiment, the registration message is received based on a receive parameter corresponding to each group, which facilitates expansion of an overall dynamic range of a receive power of a burst signal whose access is allowed by the receiver. Specifically, if link attenuation from some ONUs to the OLT is relatively large, downstream receive powers of these unregistered ONUs are relatively low, and signal strengths at which registration signals sent by the unregistered ONUs reach the OLT are correspondingly relatively weak; if link attenuation from some ONUs to the OLT is relatively small, downstream receive powers of these unregistered ONUs are relatively high, and signal strengths at which registration signals sent by the unregistered ONUs reach the OLT are correspondingly relatively strong. In this case, for the unregistered ONUs whose signal strengths at which the registration signals reach the OLT are relatively weak, receive parameters corresponding to the unregistered ONUs are set to be larger; for the unregistered ONUs whose signal strengths at which the registration signals reach the OLT are relatively strong, receive parameters corresponding to the unregistered ONUs are set to be smaller. Compared with the prior art, the receiver can allow an ONU whose downstream receive power is smaller to send a weaker registration signal, and allow an ONU whose downstream receive power is larger to send a stronger registration signal. Therefore, the overall dynamic range of the receive power of the receiver is expanded. Compared with the prior art, because no additional component is added, low-cost and easy-to-implement advantages are further achieved.

This application provides a PON system. A system architecture is shown in FIG. 1. The PON system includes an OLT and an ONU. The OLT sends first information to the ONU, where the first information includes at least one piece of indication information, and one piece of indication information indicates a first power range and a first time range associated with the first power range. The ONU receives the first information sent by the optical line terminal OLT, and sends a registration message to the OLT in the first time range based on the first information after determining that the ONU is unregistered and a downstream receive power falls within the first power range indicated in the indication information. The OLT receives, in the first time range, the registration message sent by the ONU.

Actions performed by the OLT and actions performed by the ONU are the same as those in the foregoing embodiment. Details are not described herein again.

Based on the foregoing embodiments, the following describes in detail a process of configuring, by the OLT before registration, power ranges, receive parameters of the power ranges, and grant timeslot information corresponding to the power ranges.

The inventors of the present invention find that a difference between downstream receive powers of different ONUs is mainly derived from different ODN insertion losses from the different ONUs to the OLT in the PON system and different insertion losses of optical networks between the different ONUs and the OLT. For example, a dynamic range, specified in the GPON standard, of an ODN is 15 dB, and a dynamic range, specified in the EPON standard, of an ODN is 14 dB, which mean that an insertion loss of an optical network through which an ONU farthest from the OLT passes is 15 dB or 14 dB larger than an insertion loss of an optical network through which an ONU closest to the OLT passes.

Therefore, before registration, the OLT may preset a plurality of ONU groups based on a difference of downstream receive powers of all ONUs, and set a power range corresponding to each ONU group, and a receive parameter corresponding to each ONU group. In both a GPON system and an EPON system, the OLT specifies a timeslot or a timeslot segment for registration. Each unregistered ONU sends a registration signal based on a timeslot or a timeslot segment specified by the OLT for the unregistered ONU. Therefore, before registration, the OLT further needs to preset a grant timeslot segment corresponding to each ONU group. Then, by using a registration method procedure provided in this embodiment of the present invention, different ONUs are classified into ONU groups, and a correspondence between each ONU identifier and the grant timeslot segment, the power range, and the receive parameter that correspond to each group is established.

The following describes, by using a specific example, a specific process of presetting, by the OLT before registration, a plurality of ONU groups and setting a power range corresponding to each ONU group:

For example, the OLT may classify in advance ONUs into a plurality of groups (for example, four groups) based on ODN insertion losses of the ONUs. For example, a first ONU group is an ONU whose ODN insertion loss is the largest, an ODN insertion loss of a second ONU group is second only to that of the first ONU group, and by analogy, an ODN insertion loss of a fourth ONU group is the smallest. All ONUs share a same OLT downstream transmitter. Therefore, because the first ONU group has the largest ODN insertion loss, a downstream optical signal that can be received by the ONU is the weakest, in other words, a downstream receive power is the lowest. A downstream optical signal received by the second ONU group is slightly stronger, and by analogy, a downstream optical signal received by the fourth ONU group is the strongest, in other words, a downstream receive power is the highest. After the ONUs are classified into the four groups, a power range of each ONU group is set. As shown in Table 4, a power range of the first ONU group is set to <P0, a power range of the second ONU group is set to P0-P1 (which may be equal to P0 or P1), a power range of the third ONU group is set to P1-P2 (which may be equal to P2), and a power range of the fourth ONU group is set to >P2.

Optionally, an indication field value of each power range may be preset on the OLT side, to indicate each power range. As shown in Table 4, "100" is set to indicate the power range <P0, "101" is set to indicate the power range P0-P1, "110" is set to indicate the power range P1-P2, and "111" is set to indicate the power range >P2.

TABLE 4

| ONU group identifier | Indication field of power range | Power range | Grant timeslot segment | Receive parameter |
| --- | --- | --- | --- | --- |
| LLID-G1 | 100 | <P0 | T1 | I1/V1 |
| LLID-G2 | 101 | P0-P1 | T2 | I2/V2 |
| LLID-G3 | 110 | P1-P2 | T3 | I3/V3 |
| LLID-G4 | 111 | >P2 | T4 | I4/V4 |

The following describes, by using a specific example, a specific process of presetting, by the OLT before registration, the receive parameter corresponding to each ONU group:

The receive parameter is mainly set to dynamically adjust the dynamic range of the receive power of the OLT receiver. The inventors of the present invention find that a root cause of limitation on the dynamic range of the receive power of the OLT receiver is that the amplifier has a particular noise figure, to be specific, when the amplifier amplifies a signal, a particular amount of noise is inevitably introduced, and as a result, a signal-to-noise ratio of a signal output from the amplifier is degraded. For example, in an existing process, a typical noise figure of the amplifier is usually 8 dB, in other words, a signal-to-noise ratio of a signal after the signal passes through the amplifier is usually 8 dB lower than a signal-to-noise ratio of the signal before the signal is input to the amplifier. Therefore, if a receiver sensitivity of the receiver needs to be enhanced by 10 dB, the amplifier usually needs to provide a gain of at least 18 dB, in other words, the amplifier amplifies an input optical signal by at least 18 dB. In this case, when a signal that enters the amplifier is slightly stronger, a power at which the signal reaches the photodetector through the amplifier is very high, which causes overload of the photodetector, thereby limiting the dynamic range of the receive power of the entire receiver.

The inventors of the present invention further find that, to expand the dynamic range of the receive power of the OLT receiver with the amplifier, how to ensure that the photodetector located after the amplifier is not overloaded when a signal input to the amplifier is relatively strong is a main problem to be resolved. When a signal input to the amplifier is relatively weak, to enhance the sensitivity of the entire OLT receiver as much as possible, a bias current of the amplifier may be set to a relatively high level, to ensure that the amplifier provides a sufficiently high gain. However, when a signal input to the amplifier is strong, the amplifier does not need to provide a high gain, and the bias current of the amplifier may be reduced, so that a power of a signal output from the amplifier to the photodetector is not excessively large, thereby preventing overload of the receiver.

Therefore, the receive parameter may be set to the bias current of the amplifier. The inventors of the present invention have verified through experiment data that the dynamic range of the receive power of the OLT receiver can be expanded by dynamically adjusting the bias current of the amplifier. Details are as follows:

As shown in (1) in FIG. 6a, FIG. 6b, FIG. 6c, and FIG. 6d, when an upstream optical signal sent by an ONU is weak when reaching the OLT, the bias current of the amplifier may be set to 120 mA. In this case, from a curve in which a power of a TP 2 node changes with an input power of an amplifier SOA and a curve in which a power of a TP 3 node changes with the input power of the amplifier, it can be learned that when the bias current of the amplifier is set to 120 mA, the sensitivity of the receiver may be effectively enhanced to −32.3 dBm, in other words, a minimum power allowed to be input to the amplifier may be −32.3 dBm. If an overload power of the photodetector is −4 dBm, when the photodetector is not overloaded, a maximum power allowed to be input to the amplifier is −22 dB.

As shown in (2) in FIG. 6a, FIG. 6b, FIG. 6c, and FIG. 6d, when an upstream optical signal sent by an ONU is slightly stronger when reaching the OLT, the bias current of the amplifier may be set to 100 mA. In this case, from a curve in which the power of the TP 2 node changes with a power (the input power of the amplifier SOA) of a TP 1 node and a curve in which the power of the TP 3 node changes with the power of the TP 1 node, it can be learned that when the bias current of the amplifier is set to 100 mA, the sensitivity of the receiver is −31.4 dBm, in other words, a minimum power allowed to be input to the amplifier is −31.4 dBm. When the photodetector is not overloaded, a maximum power allowed to be input to the amplifier is 19.8 dBm.

As shown in (3) in FIG. 6a, FIG. 6b, FIG. 6c, and FIG. 6d, when an upstream optical signal sent by an ONU is further stronger when reaching the OLT, the bias current of the amplifier may be set to 80 mA. In this case, from the curve in which the power of the TP 2 node changes with the input power of the amplifier SOA and the curve in which the power of the TP 3 node changes with the input power of the amplifier, it can be learned that when the bias current of the amplifier is set to 80 mA, the sensitivity of the receiver may be effectively enhanced to −30.2 dBm, in other words, a minimum power allowed to be input to the amplifier is −30.2 dBm. When the photodetector is not overloaded, a maximum power allowed to be input to the amplifier is −16.8 dBm.

As shown in (4) in FIG. 6a, FIG. 6b, FIG. 6c, and FIG. 6d, when an optical signal sent by an ONU to the OLT is quite strong, the bias current of the amplifier may be set to 60 mA. In this case, from the curve in which the power of the TP 2 node changes with the input power of the amplifier SOA and the curve in which the power of the TP 3 node changes with the input power of the amplifier SOA, it can be learned that when the bias current of the amplifier is set to 60 mA, the sensitivity of the receiver may be effectively enhanced to −27.7 dBm, in other words, a minimum power allowed to be input to the amplifier is −27.7 dBm. When the photodetector is not overloaded, a maximum power allowed to be input to the amplifier is −11.2 dBm.

When the receive parameter is the bias current of the amplifier, a receive parameter of the first ONU group is set to I1, a receive parameter of the second ONU group is set to I2, a receive parameter of the third ONU group is set to I3, and a receive parameter of the fourth ONU group is set to 4, where I1>I2>I3>I4.

Optionally, when I1=120 mA, I2=100 mA, I3=80 mA, and I4=60 mA, as shown in Table 5, when the receiver is not overloaded, the minimum power (the minimum power of the TP 1 node) allowed to be input to the amplifier is −32.3 dBm, the maximum power (the minimum power of the TP 2 node) allowed to be input to the amplifier is −11.2 dBm, and the dynamic range of the receive power of the OLT receiver may be expanded to 21.1 dB.

TABLE 5

| Bias current (mA) of amplifier | Minimum power (dBm) allowed to be input to head amplifier | Maximum power (dBm) allowed to be input to head amplifier | Overload power (dBm) of photodetector | Dynamic range (dB) of receive power of receiver |
|---|---|---|---|---|
| 120 | −32.3 | −22 | −4 | 10.3 |
| 100 | −31.4 | −19.8 | −4 | 12.5 |
| 80 | −30.2 | −16.8 | −4 | 15.5 |
| 60 | −27.7 | −11.2 | −4 | 21.1 |

Certainly, values of I1, I2, I3, and I4 are not limited to the foregoing examples. Based on an inventive concept of this embodiment of the present invention, values of a plurality of groups of I1, I2, I3, and I4 may be obtained with reference to different experiment conditions, to expand the dynamic range of the receive power of the OLT receiver.

Certainly, in addition to the bias current of the amplifier, a reverse bias voltage of the photodetector may also be used as a receive parameter. For example, when an input optical signal is weak, the reverse bias voltage of the photodetector is set to be relatively high, to ensure a sufficiently high gain. Likewise, when an input optical signal is strong, the reverse bias voltage of the photodetector is set to be low, to protect the photodetector from being overloaded, thereby expanding the dynamic range of the receive power of the receiver with the head amplifier on the OLT side.

Correspondingly, when the receive parameter is the reverse bias voltage of the photodetector, as shown in Table 4, a receive parameter of the first ONU group is set to V1, a receive parameter of the second ONU group is set to V2, a receive parameter of the third ONU group is set to V3, and a receive parameter of the fourth ONU group is set to V4, where V1>V2>V3>V4.

The following describes, by using a specific example, a specific process of presetting, by the OLT before registration, the grant timeslot segment corresponding to each ONU group:

As shown in Table 4, a grant timeslot segment of the first ONU group is T1, a grant timeslot segment of the second ONU group is T2, a grant timeslot segment of the third ONU group is T3, and a grant timeslot segment of the fourth ONU group is T4. Time ranges corresponding to T1, T2, T3, and T4 are different from each other in time domain, and the time ranges corresponding to T1, T2, T3, and T4 may occupy one or more timeslots, or may occupy a time resource element less than one timeslot, for example, a time range less than 14 symbols. The time ranges corresponding to T1, T2, T3, and T4 may be adjacent, may be partially adjacent, or may not be adjacent to each other.

It should be noted that the time ranges corresponding to T1, T2, T3, and T4 belong to a quiet time window. To be specific, each time range for registration is in a time period in which a registered ONU does not communicate with the OLT.

After the OLT presets the plurality of ONU groups, and sets the power range corresponding to each ONU group, the receive parameter corresponding to each ONU group, and the grant timeslot segment corresponding to each ONU group, the OLT may send a registration notification message to an ONU by using a MAC layer.

Optionally, the OLT may send the registration notification message to the ONU based on an indication field of a power range shown in Table 6 or Table 7. A difference is that the indication field of the power range in Table 6 is identification information corresponding to the power range, and the indication field of the power range in Table 7 is power range information.

TABLE 6

| ONU group identifier | Indication field of power range | Grant timeslot segment |
| --- | --- | --- |
| LLID-G1 | 100 | T1 |
| LLID-G2 | 101 | T2 |
| LLID-G3 | 110 | T3 |
| LLID-G4 | 111 | T4 |

TABLE 7

| ONU group identifier | Indication field of power range | Grant timeslot segment |
| --- | --- | --- |
| LLID-G1 | <P0 | T1 |
| LLID-G2 | P0-P1 | T2 |
| LLID-G3 | P1-P2 | T3 |
| LLID-G4 | >P2 | T4 |

In the EPON system, a message structure of the sent registration notification message is an MPCP frame. A preamble of the MPCP frame may include an identifier of an ONU group, and a Discovery GATE message field in a data/pad field of the MPCP frame may include fields such as Discovery information, a quantity of grant timeslots, a start time, and a timeslot length. The Discovery information field specifically indicates a power range. The fields: the quantity of grant timeslots, the start time, and the timeslot length specifically indicate a grant timeslot segment associated with the power range.

In the prior art, all ONUs register in one grant timeslot segment, and a Discovery GATE message field indicates only one grant timeslot segment, and does not indicate information related to the power range. Compared with the prior art, in the present invention, the foregoing indication field of the power range is added in the Discovery GATE message field, and is associated with an indication field that indicates the grant timeslot segment, and this indication field is used to indicate the power range.

Optionally, one registration notification message may indicate a power range and a grant timeslot segment that correspond to one ONU group. The OLT may successively send four registration notification messages to separately indicate power ranges and grant timeslot segments that respectively correspond to the four ONU groups.

Using an indication manner shown in Table 6 as an example, when one registration notification message indicates the power range and the grant timeslot segment of the first ONU group, one piece of indication information of the Discovery GATE message field of the MPCP frame separately indicates the identification information "100" of the power range and the grant timeslot segment "T1" that correspond to the first ONU group. Optionally, the preamble of the MPCP frame may further indicate an identifier LLID-G1 of the first ONU group.

Correspondingly, when one registration notification message indicates the power range and the grant timeslot segment of the second ONU group, one piece of indication information of the Discovery GATE message field of the MPCP frame separately indicates the identification information "101" of the power range and the grant timeslot segment "T2" that correspond to the second ONU group. Optionally, the preamble of the MPCP frame may further indicate an identifier LLID-G2 of the second ONU group.

Correspondingly, when one registration notification message indicates the power range and the grant timeslot segment of the third ONU group, one piece of indication information of the Discovery GATE message field of the MPCP frame separately indicates the identification information "110" of the power range and the grant timeslot segment "T3" that correspond to the third ONU group. Optionally, the preamble of the MPCP frame may further indicate an identifier LLID-G3 of the third ONU group.

Correspondingly, when one registration notification message indicates the power range and the grant timeslot segment of the fourth ONU group, one piece of indication information of the Discovery GATE message field of the MPCP frame separately indicates the identification information "111" of the power range and the grant timeslot segment "T4" that correspond to the fourth ONU group. Optionally, the preamble of the MPCP frame may further indicate an identifier LLID-G4 of the fourth ONU group.

Optionally, one registration notification message may alternatively indicate the power ranges and the grant timeslot segments that respectively correspond to the four ONU groups. The OLT may send one registration notification message to indicate the power ranges and the grant timeslot segments that respectively correspond to the four ONU groups, where a power range and a grant timeslot segment that correspond to one ONU group are indicated by using one piece of indication information.

Using an indication manner shown in Table 5 as an example, when one registration notification message indicates the power ranges and the grant timeslot segments that respectively correspond to the four ONU groups, the Discovery GATE message field of the MPCP frame includes four pairs of mutually associated indication information. A first piece of indication information separately indicates the identification information "100" of the power range and the grant timeslot segment "T1" that correspond to the first ONU group; a second piece of indication information separately indicates the identification information "101" of the power range and the grant timeslot segment "T2" that correspond to the second ONU group; a third piece of indication information separately indicates the identification information "110" of the power range and the grant timeslot segment "T3" that correspond to the third ONU group; and a fourth piece of indication information separately indicates the identification information "111" of the power range and the grant timeslot segment "T4" that correspond to the fourth ONU group.

Optionally, to distinguish between indication information for different ONU groups, the four pieces of indication information may be sequentially arranged in the Discovery GATE message field through concatenation.

Optionally, to distinguish between indication information for different ONU groups, the identifiers of the four ONU groups may be separately indicated in the preamble of the MPCP frame, and then the four pieces of indication information are sequentially arranged in the Discovery GATE message field through concatenation. A concatenation index may be an identifier of an ONU group.

Figure 7A:
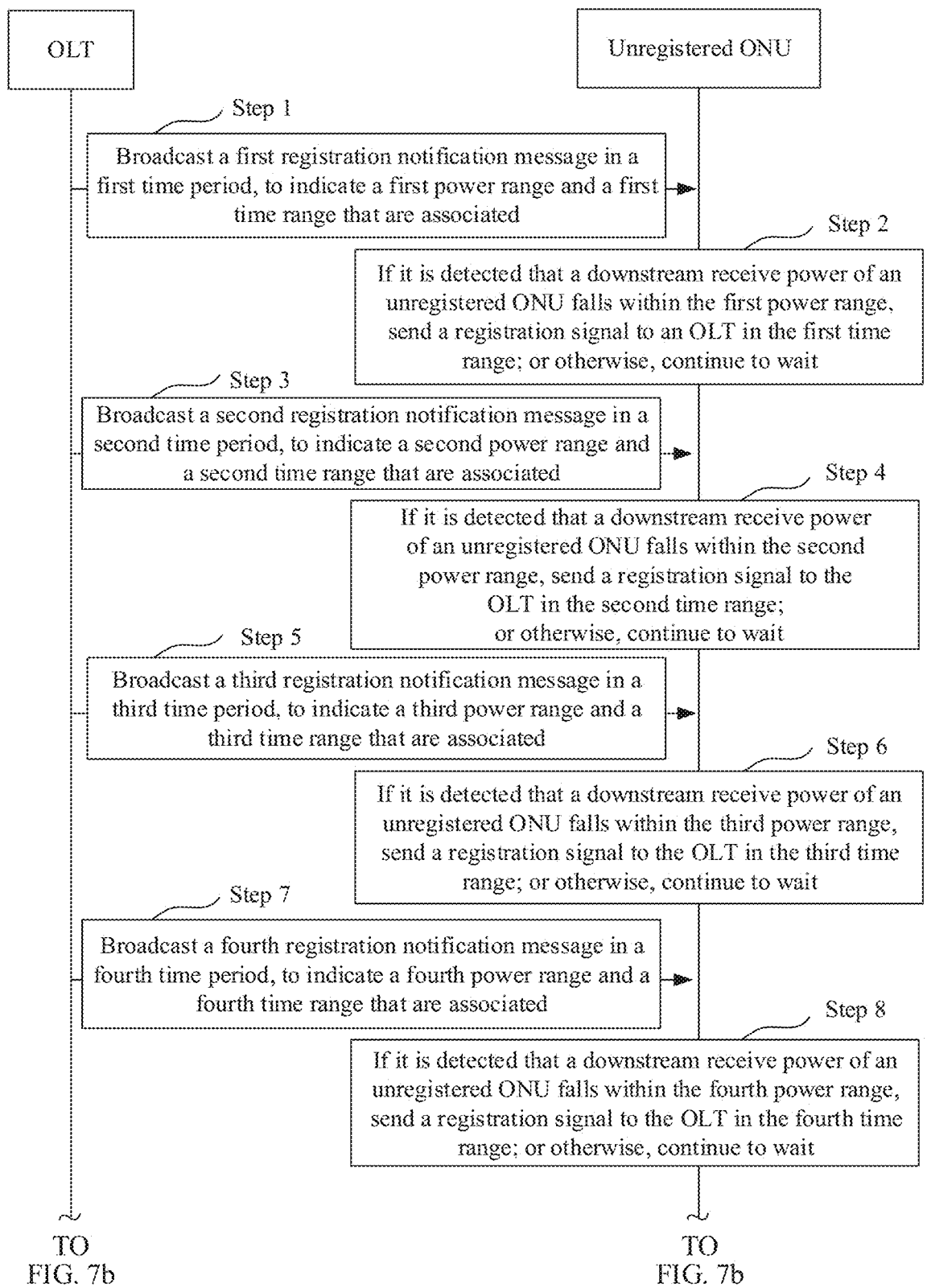
FIG. 7a and FIG. 7b are a schematic flowchart of ONU registration in a PON system according to an embodiment of this application.
Figure 7B:
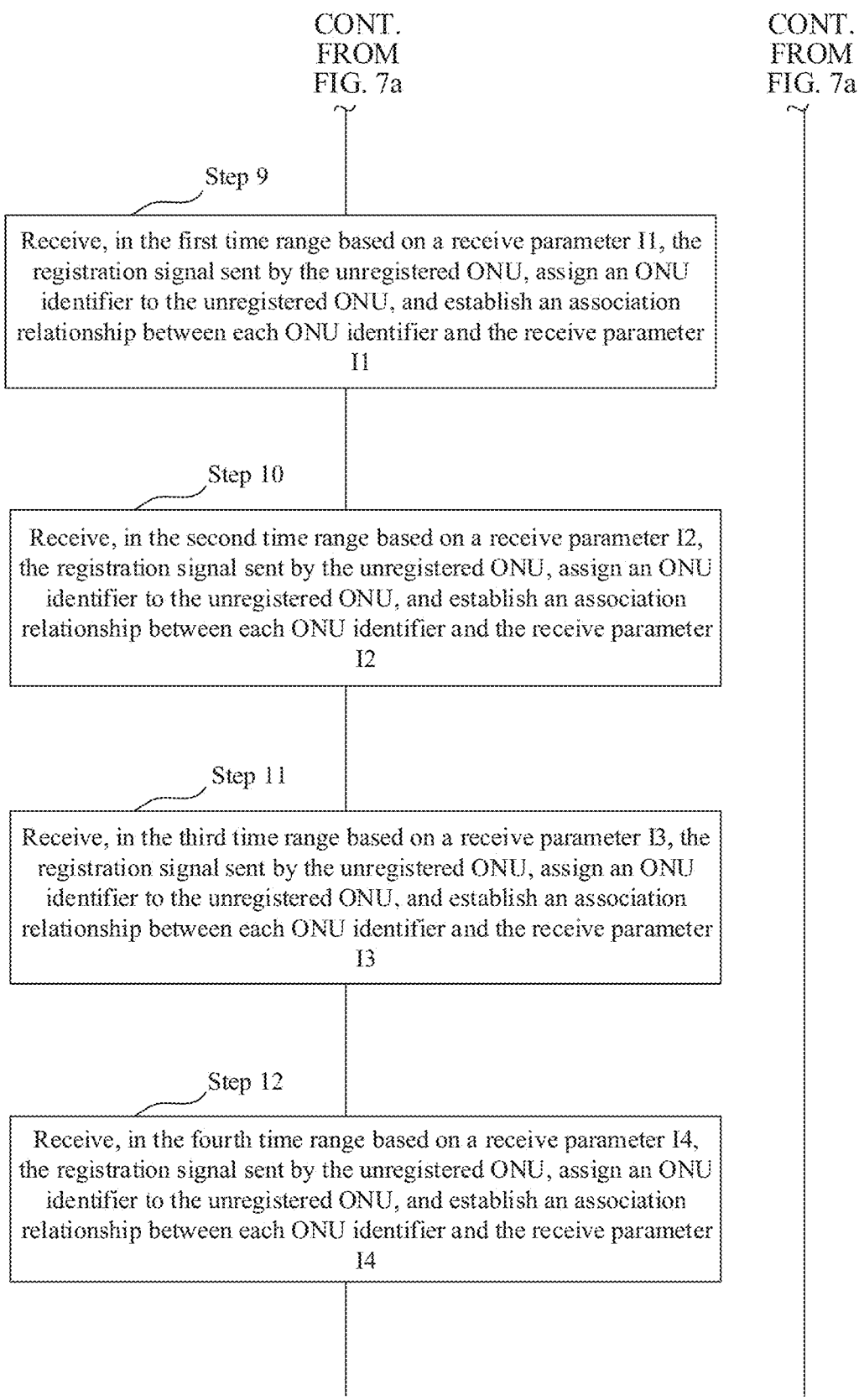

In the following, for example, one registration notification message may indicate a power range and a grant timeslot segment that correspond to one ONU group. An embodiment of the present invention provides a registration procedure in an EPON system. As shown in FIG. 7a and FIG. 7b, the registration procedure specifically includes the following steps.

Step 1: An OLT broadcasts a first registration notification message to an ONU in a first time period by using a MAC instruction. The first registration notification message includes a first piece of indication information indicating a first time range and a first power range that are associated. Specifically, the first piece of indication information indicates an unregistered ONU whose downstream receive power falls within the first power range (<P0) to send a registration signal to the OLT in the first time range (the grant timeslot segment T1).

The OLT generates the first registration notification message before sending the registration notification message. Specifically, for the first ONU group, the OLT sets an indication field of a power range of a Discovery GATE message of the first registration notification message to "100" based on an association relationship between the first power range (<P0) and the first time range (the grant timeslot segment T) in Table 4, and sets an indication field of a grant timeslot segment of the Discovery GATE message to indication information (including a quantity of grant timeslots, a start time, and a timeslot length) corresponding to T1. The OLT broadcasts the first registration notification message to the ONU by using the MAC instruction.

Step 2: An unregistered ONU detects a downstream receive power of the unregistered ONU when receiving the first registration notification message from the OLT; and sends a registration signal to the OLT in the first time range (the grant timeslot segment T1) if the detected downstream receive power falls within the first power range (<P0); or continues to wait if the detected downstream receive power does not fall within the first power range (<P0).

Specifically, the unregistered ONU detects the downstream receive power of the unregistered ONU after receiving the Discovery GATE message; and sends a registration message (or a registration request message) to the OLT in the first grant timeslot segment T1 if the downstream receive power of the unregistered ONU is relatively low (<P0); or continues to wait if the downstream receive power of the unregistered ONU does not fall within the range being less than P0, and until a power range indicated in an indication field of a power range of a Discovery GATE message of a registration notification message sent by the OLT matches the downstream receive power of the unregistered ONU, sends a registration message to the OLT in a grant timeslot segment corresponding to the unregistered ONU.

A registered ONU does not respond after receiving the Discovery GATE message.

Step 3: The OLT broadcasts a second registration notification message to an ONU in a second time period by using a MAC instruction. The second registration notification message includes a second piece of indication information indicating a second time range and a second power range that are associated. Specifically, the indication information indicates an unregistered ONU whose downstream receive power falls within the second power range (P0-P1) to send a registration signal to the OLT in the second time range (the grant timeslot segment T2).

The OLT generates the second registration notification message before sending the registration notification message. Specifically, for the second ONU group, the OLT sets an indication field of a power range of a Discovery GATE message of the second registration notification message to "101" based on a correspondence between the second power range (P0-P1) and the second time range (the grant timeslot segment T2) in Table 4, and sets an indication field of a grant timeslot segment of the Discovery GATE message to indication information (including a quantity of grant timeslots, a start time, and a timeslot length) corresponding to T2.

Step 4: An unregistered ONU detects a downstream receive power of the unregistered ONU when receiving the second registration notification message from the OLT; and sends a registration signal to the OLT in the second time range (the grant timeslot segment T2) if the detected downstream receive power falls within the second power range (P0-P1); or continues to wait if the detected downstream receive power does not fall within the second power range (P0-P1). The ONU in this step is any unregistered ONU.

Step 5: The OLT broadcasts a third registration notification message to an ONU in a third time period. The third registration notification message includes a third piece of indication information indicating a third time range and a third power range that are associated. Specifically, the indication information indicates an unregistered ONU whose downstream receive power falls within the third power range (P1-P2) to send a registration signal to the OLT in the third time range (the grant timeslot segment T3).

The OLT generates the third registration notification message before sending the third registration notification message. Specifically, for the third ONU group, the OLT sets an indication field of a power range of a Discovery GATE message of the registration notification message to "110" based on a correspondence between the third power range (P1-P2) and the third time range (the grant timeslot segment T3) in Table 4, and sets an indication field of a grant timeslot segment of the Discovery GATE message to indication information (including a quantity of grant timeslots, a start time, and a timeslot length) corresponding to T3.

Step 6: An unregistered ONU detects a downstream receive power of the unregistered ONU when receiving the third registration notification message from the OLT; and sends a registration signal to the OLT in the third time range (the grant timeslot segment T3) if the detected downstream receive power falls within the third power range (P1-P2); or continues to wait if the detected downstream receive power does not fall within the third power range (P1-P2).

Step 7: The OLT broadcasts a fourth registration notification message to an ONU in a fourth time period. The fourth registration notification message includes a fourth piece of indication information indicating a fourth time range and a fourth power range that are associated. Specifically, the indication information indicates an unregistered ONU whose downstream receive power falls within the fourth power range (>P2) to send a registration signal to the OLT in the fourth time range (the grant timeslot segment T4).

The OLT generates the fourth registration notification message before sending the fourth registration notification message. Specifically, for the fourth ONU group, the OLT sets an indication field of a power range of a Discovery GATE message of the registration notification message to "111" based on a correspondence between the fourth power range (>P2) and the fourth time range (the grant timeslot segment T4), and sets an indication field of a grant timeslot segment of the Discovery GATE message to indication information (including a quantity of grant timeslots, a start time, and a timeslot length) corresponding to T4.

Step 8: An unregistered ONU detects a downstream receive power of the unregistered ONU when receiving the fourth registration notification message from the OLT; and sends a registration signal to the OLT in the fourth time range (the grant timeslot segment T4) if the detected downstream receive power falls within the fourth power range (>P2); or continues to wait if the detected downstream receive power does not fall within the fourth power range (>P2).

Step 9: The OLT receives the registration signal from the unregistered ONU in the first time range (the grant timeslot segment T1) based on a receive parameter I1, assigns an ONU identifier to each ONU registered in the grant timeslot segment T1, sends the ONU identifier assigned to each ONU to each ONU registered in the grant timeslot segment T1, and if ONU identifiers of ONUs registered in the first time range are sequentially an LLID 01, an LLID 02, . . . , and an LLID 0N, establishes an association relationship between the ONU identifiers LLID 01 to LLID 0N and the receive parameter I1. Optionally, the ONUs respectively identified by the LLID 01 to the LLID 0N are in the first ONU group, and one ONU logical identifier may be further assigned to the first ONU group.

In step 9, the OLT first adjusts the receive parameter, which is specifically as follows: In the grant timeslot segment T1, through circuit control of an OLT optical module, a bias current of an amplifier is set to be the largest (I1), or a reverse bias voltage of a photodetector is set to be the highest (V1).

Step 10: The OLT receives the registration signal from the unregistered ONU in the second time range (the grant timeslot segment T2) based on a receive parameter I2, assigns an ONU identifier to each ONU registered in the second time range, sends the ONU identifier assigned to each ONU to each ONU registered in the second time range, and if ONU identifiers of ONUs registered in the second time range are sequentially an LLID 11, an LLID 12, . . . , and an LLID 1N, establishes an association relationship between the ONU identifiers LLID 11 to LLID 1N and the receive parameter I2.

Optionally, the ONUs respectively identified by the LLID 11 to the LLID 1N are in the second ONU group, and one ONU logical identifier may be further assigned to the second ONU group.

In step 10, the OLT first adjusts the receive parameter, which is specifically as follows: In the grant timeslot segment T2, through circuit control of the OLT optical module, the bias current of the amplifier is set to 12, or the reverse bias voltage of the photodetector is set to V2.

Step 11: The OLT receives the registration signal from the unregistered ONU in the third time range based on a receive parameter I3, assigns an ONU identifier to each ONU registered in the third time range, sends the ONU identifier assigned to each ONU to each ONU registered in the third time range, and if ONU identifiers of ONUs registered in the third time range are sequentially an LLID 21, an LLID 22, . . . , and an LLID 2N, establishes an association relationship between the ONU identifiers LLID 21 to LLID 2N and the receive parameter I3.

Optionally, the ONUs respectively identified by the LLID 21 to the LLID 2N are in the third ONU group, and one ONU logical identifier may be further assigned to the third ONU group.

In step 11, the OLT first adjusts the receive parameter, which is specifically as follows: In the grant timeslot segment T3, through circuit control of the OLT optical module, the bias current of the amplifier is set to 13, or the reverse bias voltage of the photodetector is set to V3.

Step 12: The OLT receives the registration signal from the unregistered ONU in the fourth time range based on a receive parameter I4, assigns an ONU identifier to each ONU registered in the fourth time range, sends the ONU identifier assigned to each ONU to each ONU registered in the fourth time range, and if ONU identifiers of ONUs registered in the fourth time range are sequentially an LLID 31, an LLID 32, . . . , and an LLID 3N, establishes an association relationship between the ONU identifiers LLID 31 to LLID 3N and the receive parameter I4.

Optionally, the ONUs respectively identified by the LLID 31 to the LLID 3N are in the fourth ONU group, and one ONU logical identifier may also be assigned to the fourth ONU group.

In step 12, the OLT first adjusts the receive parameter, which is specifically as follows: In the grant timeslot segment T4, through circuit control of the OLT optical module, the bias current of the amplifier is set to 14, or the reverse bias voltage of the photodetector is set to V4.

In the foregoing steps, after all ONUs are registered, the OLT marks and classifies ONUs whose downstream receive powers are different, where the registered ONUs are classified into different groups.

Optionally, in addition to the foregoing group classification manner provided in the foregoing embodiment, the OLT may measure a strength of an optical signal (preferably a registration signal or an upstream optical signal) from each ONU to the OLT, to classify the ONUs into different ONU groups. For example, based on power intensities of received optical signals from different ONUs, the ONUs are classified into three groups g1, g2, and g3, where a power of the g1 group is the lowest, a power of the g2 group is the second, and a power of the g3 group is the highest. Then, in a timeslot in which data sent by an ONU in the g1 group reaches the OLT, the bias current of the amplifier is set to be the largest (for example, 11), or the reverse bias voltage of the photodetector is set to be the highest (for example, V). In a timeslot in which data sent by an ONU in the g3 group reaches the OLT, the bias current of the amplifier is set to be the smallest (for example, I3), or the reverse bias voltage of the photodetector is set to be the lowest (for example, V3). (Likewise, it is still assumed that I1>I2>I3 and V1>V2>V3).

After registration is completed, for upstream transmission of a registered ONU, in both a GPON system and an EPON system, the registered ONU sends an upstream optical signal based on a timeslot or a timeslot segment that is specified by an OLT. In the prior art, the OLT receives, based on a fixed receive parameter, upstream optical signals sent by different ONUs. Compared with the prior art, in this embodiment of the present invention, the OLT receives, based on a receive parameter corresponding to an ONU group, an upstream optical signal sent by a registered ONU belonging to each ONU group.

Figure 8:
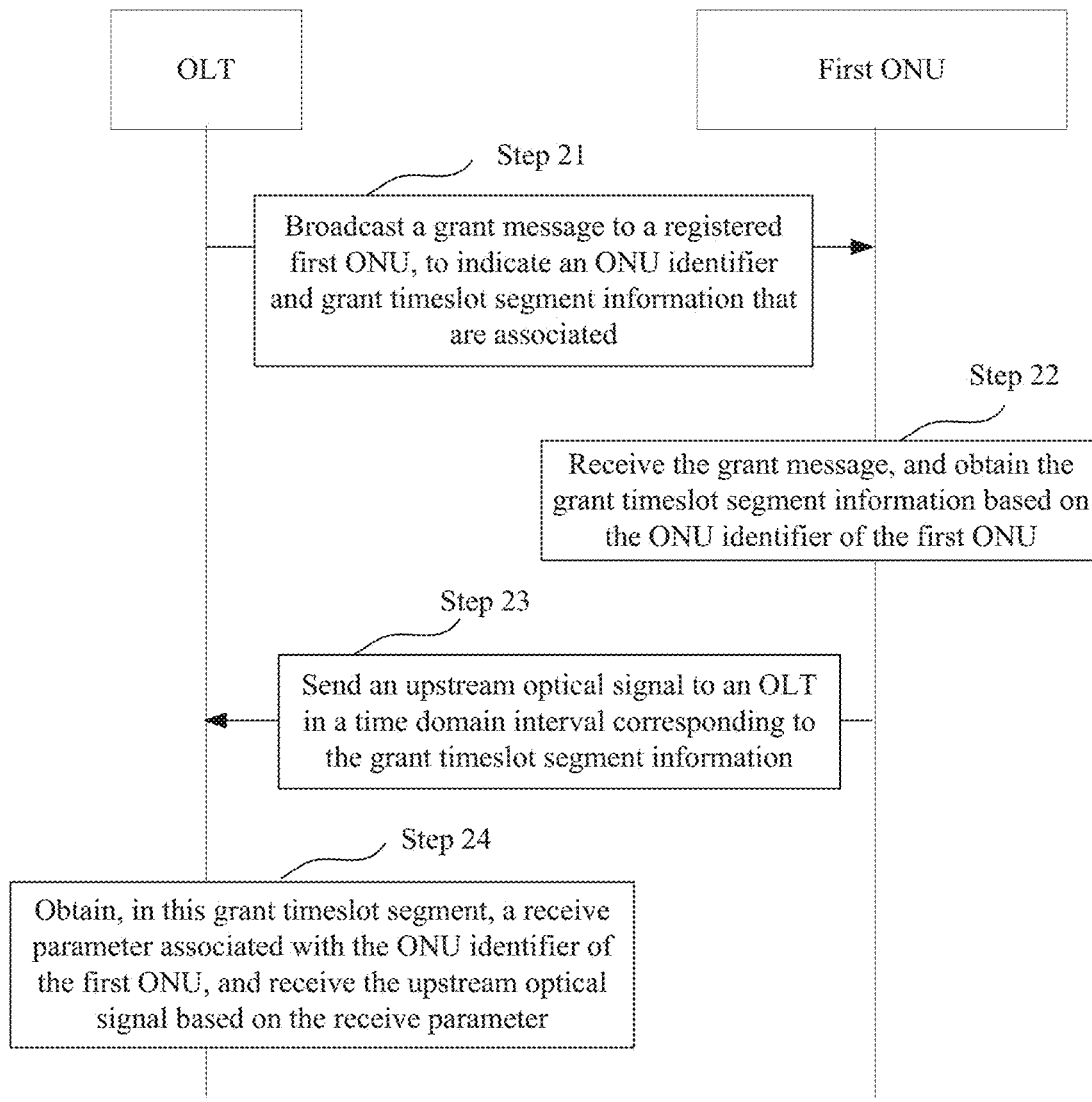
FIG. 8 is a schematic flowchart of an upstream information transmission method in a PON system according to an embodiment of this application.

For the registered ONU, this embodiment of the present invention further provides a method procedure for sending an upstream optical signal. As shown in FIG. 8, the method procedure mainly includes the following steps.

Step 21: The OLT broadcasts a grant message to a registered first ONU. The grant message includes one piece of indication information indicating an ONU identifier and grant timeslot segment information that are associated. Specifically, an ONU identifier of the first ONU and grant timeslot segment information associated with the ONU identifier of the first ONU are indicated. The first ONU is any one of registered ONUs.

Before the broadcasting, by the OLT, a grant message to a registered first ONU, the method procedure further includes: generating, by the OLT, the grant message sent to the first ONU.

Using the EPON system as an example, the grant message may be an MPCP frame. A preamble of the MPCP frame may be used to indicate the ONU identifier of the first ONU, and a Discovery GATE message field of the MPCP frame may be used to indicate the grant timeslot segment information for sending an upstream optical signal by the first ONU.

Step 22: The first ONU receives the grant message sent by the OLT, and obtains the grant timeslot segment information in a Discovery GATE message field based on the ONU identifier of the first ONU.

Step 23: The first ONU sends an upstream optical signal to the OLT in a time range corresponding to the grant timeslot segment information.

Step 24: The OLT obtains, in a grant timeslot segment configured for the first ONU, a receive parameter associated with the ONU identifier of the first ONU, and receives, based on the receive parameter, the upstream optical signal sent by the first ONU.

Specifically, after all ONUs are registered, the OLT stores a correspondence between each receive parameter and an ONU identifier of a registered ONU in each ONU group. The OLT obtains, according to an association relationship between grant timeslot information corresponding to the current grant timeslot segment and the ONU identifier and an association relationship between the ONU identifier and the receive parameter, the receive parameter associated with the ONU identifier.

In the foregoing method procedure, the OLT may indicate, in one grant message, grant timeslot information for separately sending an upstream optical signal by a plurality of ONUs, provided that ONU identifiers are associated with corresponding indication information. This is similar to a registration process, and details are not described herein again.

Optionally, to avoid frequent switching of the OLT between receive parameters, the OLT may further configure together grant timeslot segments in which registered ONUs in each ONU group send upstream optical signals, so that the upstream optical signals sent by the registered ONUs in each ONU group can be concentrated in one time period.

Figure 13:
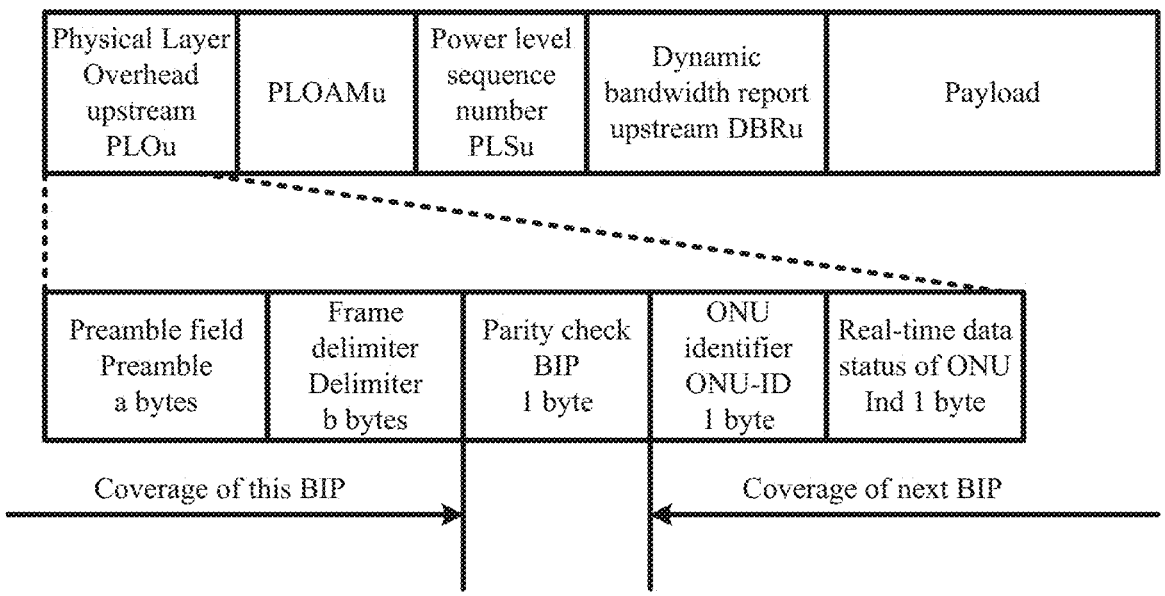
FIG. 13 is a schematic structural diagram of an upstream GTC frame format according to an embodiment of this application.
Figure 14:
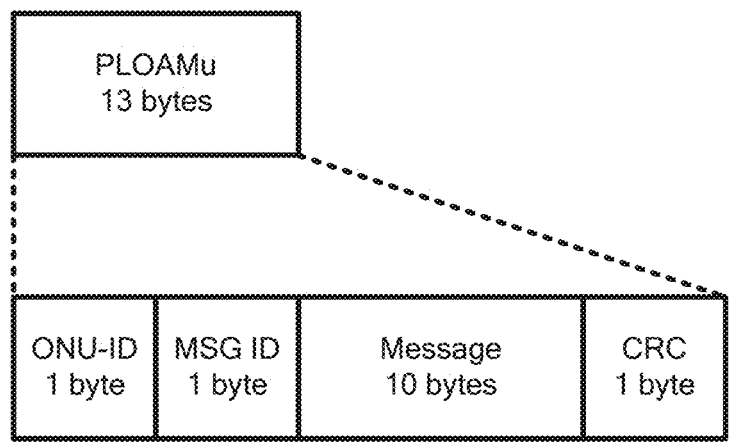
FIG. 14 is a schematic structural diagram of a PLOAMu field in an upstream GTC frame format according to an embodiment of this application.

For the GPON series, a registration process and a principle of sending upstream data are the same as those in the EPON system in the foregoing embodiment, where timeslot discovery grants are performed based on different power strengths of ONUs for registration. After the ONUs are registered, the ONUs are easy to mark and group based on receive powers of the ONUs. For an ONU whose power is high, a bias current of an SOA or a reverse bias voltage of an APD is set to be the smallest in a timeslot in which a signal reaches the OLT, and for an ONU whose power is relatively low, the bias current of the SOA or the bias voltage of the APD is set to be the largest. The only difference is that message structures are different. Specifically, for the GPON series, a registration notification message broadcast by the OLT is a downstream GTC frame (refer to Table 15, FIG. 5a, and FIG. 5b), the GTC frame includes a BWmap message field, the BWmap message field includes indication information of a first power range and a first time range associated with the first power range, an indication field of the first power range is included in an extended Alloc-ID field, and an indication field of the first time range associated with the first power range is included in an SStart field and an SStop field. For the grant message that is broadcast by the OLT and that indicates grant timeslot information for sending an upstream optical signal, a message structure of the grant message is also a downstream GTC frame, an ONU identifier and a second time range associated with the ONU identifier may also be included in a BWmap message field, the ONU identifier is included in an extended Alloc-ID field, and the second time range associated with the ONU identifier is included in an SStart field and an SStop field. In addition, when an ONU sends a registration signal, or sends an upstream optical signal, an upstream GTC frame is used. For a message structure of the upstream GTC frame, refer to Table 16, FIG. 13, and FIG. 14. Specific content is the same as that in the prior art, and details are not described herein.

In this embodiment of the present invention, windows are separately opened for registration for ONUs whose downstream receive power intensities are different, and the ONUs whose power strengths are different are marked and grouped. Different registration timeslots and different receive parameters such as a bias current of an amplifier, a reverse bias voltage of a photodetector, or light attenuation between the amplifier and the photodetector are set for different groups. Registration signals or upstream optical signals are received based on receive parameters of different groups. Therefore, a problem that a dynamic range of a receive power of an OLT receiver for a burst signal is limited is effectively resolved without additionally increasing costs of the receiver.

TABLE 8-1

(Discovery GATE discovery message field)

| Bit | Flag field | Value |
| --- | --- | --- |
| 0 | Reserved | Ignored on reception |
| 1 | OLT is 10G upstream capable | 0-OLT does not support 10 Gb/s reception<br>1-OLT supports 10 Gb/s reception |
| 2 | OLT is 25G upstream capable | 0-OLT does not support 25 Gb/s reception<br>1-OLT supports 25 Gb/s reception |

TABLE 8-1-continued (Discovery GATE discovery message field)

| Bit | Flag field | Value |
|---|---|---|
| 3-4 | Reserved | Ignored on reception |
| 5 | OLT is opening 10G discovery window | 0-OLT cannot receive 10 Gb/s data in this window<br>1-OLT can receive 10 Gb/s data in this window |
| 6 | OLT is opening 25G discovery window | 0-OLT cannot receive 25 Gb/s data in this window<br>1-OLT can receive 25 Gb/s data in this window |
| 7-9 | Indication of receive power intensity of | 000: Registration for ONUs at all power levels<br>001: ONU registration for ONU whose downstream ONU receiver receive power is less than PI<br>010: ONU registration for ONU whose downstream receiver receive power is greater than PI<br>100: ONU registration for ONU whose downstream receiver receive power is less than PO<br>101: ONU registration for ONU whose downstream receiver receive power is greater than PO and less than P1<br>110: ONU registration for ON whose downstream receiver receive power is greater than PI and less than P2<br>111: ONU registration for ONU whose downstream receiver receive power is greater than P2<br>(P0 < P1 < P2) |
| 10-15 | Reserved | Ignored on reception |

TABLE 8-2

(MPCP frame format)

| | | | |
|---|---|---|---|
| DA | 6 bytes | MAC-Control or address of receiving device | 0x0180c2000001 |
| SA | 6 bytes | Address of OLT or ONU | |
| L/T | 2 bytes | If L/T is less than 0x600, L/T is length of data field; if L/T is greater than or equal to 0x600, L/T is type of control frame | 0x8808 |
| Opcode | 2 bytes | Opcode is used to identify type of MPCP frame, and different values of opcode indicate different types of MPCP frames | |
| Content | 44 bytes | Parameter + pad part (filled with 0) | |

TABLE 9

(Grant frame GATE)

| | | | |
|---|---|---|---|
| DA | 6 bytes | | |
| SA | 6 bytes | | |
| UT | 2 bytes | | 0x8808 |
| Opcode | 2 bytes | | 0x2 |
| Timestamp | 4 bytes | Transmit moment of MPCP-PDU, namely, value of localTime when MPCP-PDU is sent, is ended only by MAC CONTROL, and is invisible to upper layer | Timestamp |
| Quantity of grants | 3 bits | Quantity of grants | 0-4, where 0 means that only timestamp is transmitted |
| Discovery | 1 bit | | 0_Normal GATE, where unicast LLID is used<br>1_Discovery GATE, where only one grant is sent and broadcast LLID is used |
| Force Report Grant 1 | 1 bit | Request ONU to send REPORT corresponding to grant sequence number | 0_No request<br>1_Send REPORT in time window indicated in Grant 1 |
| Force Report Grant 2 | 1 bit | | 0_No request<br>1_Send REPORT in time window indicated in Grant 2 |
| Force Report Grant 3 | 1 bit | | 0_No request<br>1_Send REPORT in time window indicated in Grant 3 |
| Force Report Grant 4 | 1 bit | | 0_No request<br>1_Send REPORT in time window indicated in Grant 4 |
| Grant 1 start time | 4 bytes | Grant set Optional, where existence or not depends on a value of quantity of grants Length includes laserOnTime, syncTime, and laserOffTime, in unit of time_qantum Start time of current grant should be later than start time of previous one | |
| Grant 1 length | 2 bytes | | |
| Grant 2 start time | 4 bytes | | |
| Grant 2 length | 4 bytes | | |
| Grant 3 start time | 4 bytes | | |
| Grant 3 length | 2 bytes | | |
| Grant 4 start time | 4 bytes | | |
| Grant 4 length | 2 bytes | | |
| Sync Time | 2 bytes | Time required by synchronization of OLT receiver (including PMD, PMA, and PCS), where ONU sends IDLE codeword pair during synchronization Valid only in discovery GATE, in unit of time_quantum | |
| Pad | 13-39 bytes | | 0 |

TABLE 10

(Report frame REPORT)

| | | | |
|---|---|---|---|
| DA | 6 bytes | | |
| SA | 6 bytes | | |
| UT | 2 bytes | | 0x8808 |
| Opcode | 2 bytes | | 0x3 |
| Timestamp | 4 bytes | Transmit moment of MPCP-PDU, namely, value of localTime when MPCP-PDU is sent, is ended only by MAC CONTROL, and is invisible to upper layer | |
| Quantity of queue sets | 1 byte | Quantity of sets including Report bitmap and a plurality of queues | 0-13 |

TABLE 10-continued (Report frame REPORT)

| | | | |
|---|---|---|---|
| Queue0 flag | 1 bit | Report bitmap | 0_There is no report for this queue<br>1_There is report for this queue |
| Queue1 flag | 1 bit | | 0_There is no report for this queue<br>1_There is report for this queue |
| Queue2 flag | 1 bit | | 0_There is no report for this queue<br>1_There is report for this queue |
| Queue3 flag | 1 bit | | 0_There is no report for this queue<br>1_There is report for this queue |
| Queue4 flag | 1 bit | | 0_There is no report for this queue<br>1_There is report for this queue |
| Queue5 flag | 1 bit | | 0_There is no report for this queue<br>1_There is report for this queue |
| Queue6 flag | 1 bit | | 0_There is no report for this queue<br>1_There is report for this queue |
| Queue7 flag | 1 bit | | 0_There is no report for this queue<br>1_There is report for this queue |
| Queue0 Report | 2 bytes | Length of Queue n may be adjusted based on frame range and FEC overheads, in unit of time_quantum Existence or not is determined by Report bitmap | |
| Queue1 Report | 2 bytes | | |
| Queue2 Report | 2 bytes | | |
| Queue3 Report | 2 bytes | | |
| Queue4 Report | 2 bytes | | |
| Queue5 Report | 2 bytes | | |
| Queue6 Report | 2 bytes | | |
| Queue7 Report | 2 bytes | | |
| Pad | 0-39 bytes | | 0 |

TABLE 11

(REGISTER_REQ)

| | | | |
|---|---|---|---|
| DA | 6 bytes | | |
| SA | 6 bytes | | |
| L/T | 2 bytes | | 0x8808 |
| Opcode | 2 bytes | | 0x4 |
| Timestamp | 4 bytes | Transmit moment of MPCP-PDU, namely, value of localTime when MPCP-PDU is sent, is ended only by MAC CONTROL, and is invisible to upper layer | Timestamp |
| Flags | 1 byte | | 1_Register: ONU registration attempt<br>3_Deregister: ONU requests re-registration, and OLT will unbind address from LLID |

TABLE 11-continued (REGISTER_REQ)

| | | | |
|---|---|---|---|
| Pending grants | 1 byte | Maximum quantity of pending grants that can be cached | |
| Pad | 38 bytes | | 0 |

TABLE 12

(REGISTER)

| | | | |
|---|---|---|---|
| DA | 6 bytes | | Unicast address of ONU |
| SA | 6 bytes | | |
| L/T | 2 bytes | | 0x8808 |
| Opcode | 2 bytes | | 0x5 |
| Timestamp | 4 bytes | Transmit moment of MPCP-PDU, namely, value of localTime when MPCP-PDU is sent, is ended only by MAC CONTROL, and is invisible to upper layer | Timestamp |
| Assigned port | 2 bytes | | LLID |
| Flags | 1 byte | | 1_Reregister: OLT requires ONU to re-register<br>2_Deregister: Request to release LLID and unbind bound address<br>4_Ack: Succeed in requesting registration<br>5_Nack: Upper layer rejects re-registration |
| Sync Time | 2 bytes | Time required by synchronization of OLT receiver (including PMD, PMA, and PCS), where ONU sends IDLE codeword pair during synchronization | |
| Echoed pending grants | 1 byte | | |
| Pad | 34 bytes | | |

TABLE 13

(REGISTER_ACK)

| | | | |
|---|---|---|---|
| DA | 6 bytes | | Unicast address of OLT |
| SA | 6 bytes | | |
| L/T | 2 bytes | | 0x8808 |
| Opcode | 2 bytes | | 0x6 |
| Timestamp | 4 bytes | Transmit moment of MPCP-PDU, namely, value of localTime when MPCP-PDU is sent, is ended only by MAC CONTROL, and is invisible to upper layer | Timestamp |
| Flags | 1 byte | | 1_Ack: Re-registration success acknowledgment<br>0_Nack: Upper layer rejects re-registration |
| Echoed assigned port | 2 bytes | | |
| Echoed Sync Time | 2 bytes | | |
| Pad | 35 bytes | | |

TABLE 14

(Indicator value of Alloc-ID)

| Alloc-ID | Designation | Comment |
|---|---|---|
| 0 . . . 1018 | Default | Default Alloc-ID, which is implicitly assigned with, and is equal to, ONU-ID |
| 1019 | Broadcast | ONU whose downstream receiver receive power is less than P0 |
| 1020 | Broadcast | ONU whose downstream receiver receive power is less than than P0 and less than P1 |
| 1021 | Broadcast | ONU whose downstream receiver receive power is less than than P1 and less than P2 |
| 1022 | Broadcast | ONU whose downstream receiver receive power is less than than P2 |
| 1023 | Broadcast | ONUs at all power levels |
| 1024 . . . 16383 | Assignable | If more than one single Alloc-ID is needed for ONU, OLT assigns additional Alloc-IDs to that ONU by selecting unique number from this range and communicating it to ONU using Assign_Alloc-ID PLOAM message |

TABLE 15

(Message structure of downstream CTC frame)

| | | |
|---|---|---|
| Psync | For frame delimitation | |
| Ident | | |
| PLOAMd | | PLOAM message |
| BIP | Carried bit interleaved parity information covers all transmission bytes after previous BIP Receive end should calculate bit interleaved parity values of all received bytes after previous BIP, and compare them with received BIP value, to measure quantity of errors on link | |
| Plend | | Plen: Value is N in unit of 8 bytes, indicating length of US BWmap CRC: Receive end decodes two Plend fields, and uses, based on an output result of CRC-8 detection procedure. Plend field of best quality. Quality levels are sorted from high to low as follows: no error, correctable single error, and uncorrectable error. When the two Plend fields each have uncorrectable error, or have correctable single errors with different values, this frame is discarded because there may be a plurality of errors that cannot be detected |
| US BWmap | | Alloc-ID: Globally unique 0 to 253 are used as first Alloc-ID assigned to ONU by default, are used to identify ONU, and may carry PLOAM, OMCI stream, and user data stream (optional) 254 is ONU activation ID used to discover unknown ONU by using request serial number 255 is used for downstream broadcast address and upstream address of ONU to which ONU ID is not assigned |

TABLE 15-continued (Message structure of downstream CTC frame)

| | | |
|---|---|---|
| Payload | Including a plurality of GEM frames of different lengths | 256 to 4095 are assigned to distribution unit in ONU Flags: Bit 0 to bit 6 are reserved Payload length is determined by PLI |

TABLE 16

(Message structure of upstream GTC frame

Figure 15:
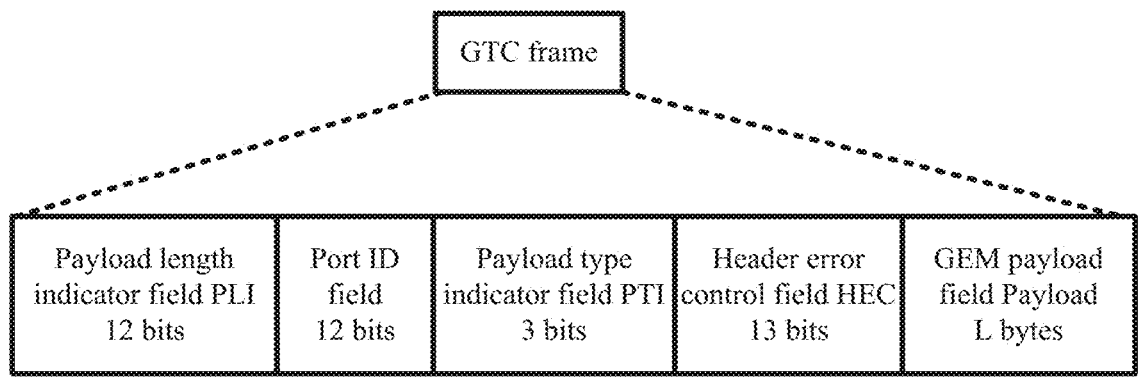
FIG. 15 is a schematic structural diagram of a GEM frame according to an embodiment of this application.

| PLOu Physical Layer Overhead upstream | Preamble, preamble Delimiter, delimiter | Format is set by OLT by delivering specific PLOAM message |
|---|---|---|
| | BIP | Carried bit interleaved parity information (exclusive OR) covers all bytes after BIP in previous burst of ONU. OLT receiver calculates current burst BIP and compares it with BIP received in next burst, to measure quantity of errors on link |
| | ONU-ID Ind | Bit 0 to bit 4 are reserved |
| PLOAMu | | PLOAM message |
| Payload | Including a plurality of GEM frames of different lengths. For structure of GEM frame, refer to FIG. 15 | Payload length is determined by PLI |

Figure 16:
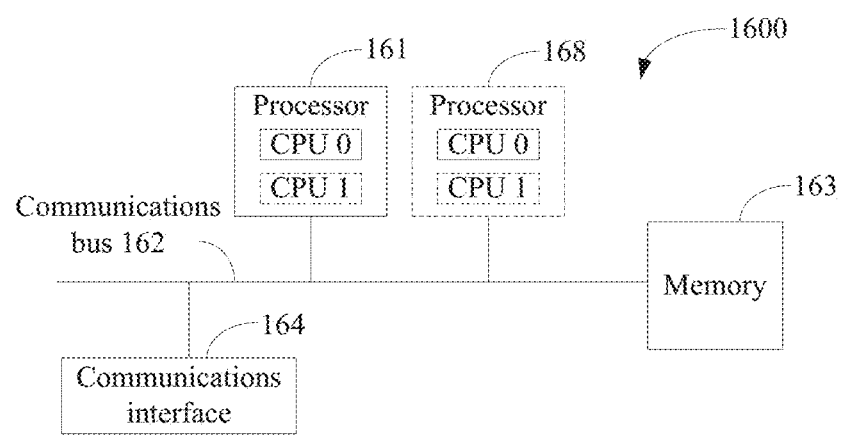
FIG. 16 is a schematic structural diagram of an apparatus according to an embodiment of this application.

Based on a same inventive concept, FIG. 16 shows an apparatus 1600 provided in an embodiment of this application, including at least one processor 161, a communications bus 162, a memory 163, and at least one communications interface 164. The apparatus 1600 may be the OLT in the embodiments of this application, or may be the ONU in the embodiments of this application. The apparatus 1600 may be configured to perform the information transmission method in a PON system that is provided in the embodiments of this application.

The processor 161 may be a general-purpose central processing unit (CPU), a microprocessor, an application-specific integrated circuit (application-specific integrated circuit, ASIC), or one or more integrated circuits configured to control program execution of the solutions of this application.

The communications bus 162 may include a channel, to transfer information between the foregoing components. The communications interface 164 may use any apparatus such as a transceiver to communicate with another device or a communications network such as the Ethernet, a radio access network (RAN), or a wireless local area network (wireless local area network, WLAN).

The memory 163 may be a read-only memory (read-only memory, ROM) or another type of static storage device capable of storing static information and an instruction, or a random access memory (random access memory. RAM) or another type of dynamic storage device capable of storing information and an instruction; or may be an electrically erasable programmable read-only memory (electrically erasable programmable read-only memory, EEPROM), a compact disc read-only memory (compact disc read-only memory, CD-ROM) or another compact disc storage, optical disc storage (including a compact disc, a laser disc, an optical disc, a digital versatile disc, a Blu-ray disc, and the like), a magnetic disk storage medium or another magnetic storage device, or any other medium that can carry or store expected program code in an instruction or data structure form and that can be accessed by using the apparatus; but is not limited thereto. The memory may exist independently, and is connected to the processor by using a bus. Alternatively, the memory may be integrated with the processor.

The memory 163 is configured to store application program code used to perform the solutions of this application, and the execution is controlled by using the processor 161. The processor 161 is configured to execute the application program code stored in the memory 163.

During specific implementation, in an embodiment, the processor 161 may include one or more CPUs, for example, a CPU 0 and a CPU 1 in FIG. 16.

During specific implementation, in an embodiment, the apparatus 1600 may include a plurality of processors, for example, the processor 161 and a processor 168 in FIG. 16. Each of these processors may be a single-CPU (single-CPU) processor, or may be a multi-CPU (multi-CPU) processor. The processor herein may be one or more devices, circuits, and/or processing cores that are used to process data (for example, a computer program instruction).

For example, the apparatus shown in FIG. 16 may be a component of the OLT, and one or more software modules are stored in the memory of the apparatus shown in FIG. 16. The apparatus shown in FIG. 16 may execute program code in the memory by using the processor, to implement the information transmission method in a PON system, performed by the OLT, in the embodiments of this application.

For example, the apparatus shown in FIG. 16 may be a component of the ONU, and one or more software modules are stored in the memory of the apparatus shown in FIG. 16. The apparatus shown in FIG. 16 may execute program code in the memory by using the processor, to implement the information transmission method in a PON system, performed by the ONU, in the embodiments of this application.

The apparatus may be divided into function modules according to the foregoing examples in the embodiments of this application. For example, function modules corresponding to the functions may be obtained through division, or two or more functions may be integrated into one processing module. The integrated module may be implemented in a form of hardware, or may be implemented in a form of a software function module. It should be noted that the division of the modules in the embodiments of this application is an example, and is merely logical function division, and there may be another division manner during actual implementation.

Figure 17:
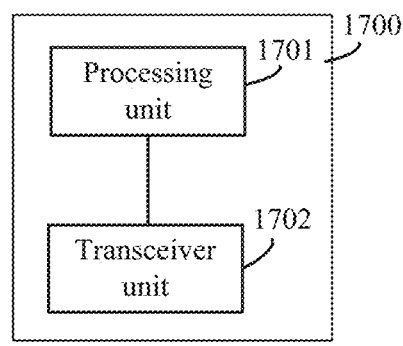
FIG. 17 is a schematic structural diagram of an apparatus according to an embodiment of this application.

For example, when the function modules corresponding to the functions are obtained through division, FIG. 17 is a possible schematic structural diagram of the apparatus in the foregoing embodiment. The apparatus 1700 includes a processing unit 1701 and a transceiver unit 1702. The transceiver unit 1702 is configured to send and receive signals by the processing unit 1701. The apparatus may be the OLT or the ONU in the foregoing embodiment.

In an embodiment, the apparatus 1700 may be the OLT or may be a chip or a system on chip in the OLT. The apparatus 1700 may be configured to perform actions of the OLT in the foregoing method embodiment. Details are as follows:

The transceiver unit 1702 is configured to send first information to an ONU, where the first information includes at least one piece of indication information, and one piece of indication information indicates a first power range and a first time range associated with the first power range; and the processing unit 1701 is configured to instruct the transceiver unit to receive, in the first time range, a registration message sent by the ONU, where a downstream receive power of the ONU falls within the first power range.

The apparatus 1700 sends one or more pairs of mutually associated time ranges and power ranges to the unregistered ONU. Different time ranges correspond to different power ranges. Therefore, when the downstream receive power of the unregistered ONU falls within one of the power ranges, the ONU registers in a time range corresponding to the power range. Based on different power ranges, ONUs whose downstream receive powers differ much may be classified into a plurality of ONU groups, and ONUs whose downstream receive powers fall within a same power range belong to a same ONU group. Registration signals of ONUs in a same ONU group are similar or differ little in signal strength when reaching the OLT, so that the apparatus 1700 can quickly respond to the registration signals of the ONUs in the same ONU group, and an overall response time of the apparatus 1700 for registration signals of ONUs in different ONU groups can be shortened.

In a possible design, the indication information includes power range information or includes identification information associated with the power range.

In a possible design, the first power range is further associated with a first receive parameter. Remaining pieces of indication information in the at least one piece of indication information indicate second power ranges. Receive parameters associated with the first power range and the second power ranges are different, and receive parameters associated with any two of the second power ranges are different. The processing unit 1701 is configured to instruct the transceiver unit to receive the registration message in the first time range by using the first receive parameter. Receive parameters are associated with power ranges, so that the apparatus 1700 classifies ONUs into groups based on the power ranges, and receives registration signals of different ONU groups by using different receive parameters. Through a dynamic adjustment to the receive parameter, a sensitivity of an OLT receiver and an overload power of the OLT receiver can be balanced, thereby expanding a dynamic range of a receive power of the receiver. For example, when a received signal is relatively weak, to enhance the sensitivity of the entire OLT receiver as much as possible, a bias current of an amplifier may be set to a relatively high level, to ensure that the amplifier provides a sufficiently high gain. However, when a signal input to the amplifier is strong, the amplifier does not need to provide a high gain, and the bias current of the amplifier may be reduced, so that a power of a signal output from the amplifier to a photodetector is not excessively large, thereby preventing overload of the receiver.

In a possible design, the transceiver unit 1702 is specifically configured to send an MPCP frame to the unregistered ONU, where the MPCP frame includes a Discovery GATE message field, and the Discovery GATE message field includes the indication information.

An indication field of a power range is added in the Discovery GATE message field of the MPCP frame to indicate the power range. Compared with an existing EPON system, the MPCP frame is modified less, which facilitates standard maintenance. More importantly, by modifying a message structure of the MPCP frame, different grant timeslots can be configured for registration for ONUs whose link insertion loss differences are different. Then a registration signal received by the apparatus 1700 in any grant timeslot is sent by an ONU whose insertion loss difference is small, which facilitates a decrease in a response time of the apparatus 1700 for the registration signal.

In a possible design, the transceiver unit 1702 is specifically configured to send a GTC frame to the unregistered ONU, where the GTC frame includes a BWmap message field, and the BWmap message field includes the indication information.

An indication field of a power range is added in the BWmap message field of the GTC frame to indicate the power range. Compared with an existing GPON system, a message structure of the GTC frame is modified less, which facilitates standard maintenance. More importantly, by modifying the message structure of the GTC frame, different grant timeslots can be configured for registration for ONUs whose link insertion loss differences are different. Then a registration signal received by the apparatus 1700 in any grant timeslot is sent by an ONU whose insertion loss difference is small, which facilitates a decrease in a response time of the apparatus 1700 for the registration signal.

In a possible design, the processing unit 1701 is further configured to assign an ONU identifier to the unregistered ONU, and establish an association relationship between the receive parameter associated with the first time range and the assigned ONU identifier.

The apparatus 1700 establishes and stores the association relationship between the receive parameter and the assigned ONU identifier, to obtain an association relationship between a receive parameter and a second time range based on an association relationship between an ONU identifier and the second time range and the association relationship between the ONU identifier and the receive parameter when the apparatus 1700 receives an upstream optical signal, so that the apparatus 1700 receives, in the second time range based on the association relationship between the receive parameter and the second time range, an upstream optical signal sent by a registered ONU, which facilitates a decrease in an overall response time of the apparatus 1700 for different upstream optical signals.

In a possible design, a receiver of the OLT includes an amplifier and a photodetector, and the first receive parameter is at least one of a bias current of the amplifier, a bias voltage of the photodetector, and light attenuation between the amplifier and the photodetector.

When ONUs are classified into groups based on power ranges, the apparatus 1700 sets the receive parameter to the bias current of the amplifier, the bias voltage of the photodetector, or the light attenuation between the amplifier and the photodetector. Compared with the prior art, no additional device is added, which facilitates expansion of the dynamic range of the receive power of the OLT receiver at low costs.

In a possible design, the first information includes N pieces of indication information, power ranges indicated in any two of the N pieces of indication information are different, first time ranges indicated in any two of the N pieces of indication information are different, and N is an integer greater than 1. Another implementation of sending the first information is provided, where an association relationship between a plurality of power ranges and a plurality of time ranges may be sent by using the first information. Compared with separate indications in a plurality of times, time overheads of a registration notification can be reduced.

In a possible design, the processing unit 1701 is further configured to instruct the transceiver unit 1702 to send second information to a registered ONU, where the second information includes at least one piece of indication information, and one piece of indication information in the second information indicates an ONU identifier, and a second time range associated with the ONU identifier; and the processing unit 1701 is further configured to instruct the transceiver unit 1702 to receive, in the second time range by using a receive parameter associated with the second time range, an upstream optical signal sent by the registered ONU, where the upstream optical signal includes information indicating an ONU identifier of the registered ONU, the second time range is associated with the ONU identifier indicated in the upstream optical signal, and the receive parameter associated with the second time range is specifically the receive parameter associated with the ONU identifier.

Compared with the prior art, the apparatus 1700 may receive, in the second time range based on the association relationship between the receive parameter and the second time range, the upstream optical signal sent by the registered ONU, which facilitates a decrease in an overall response time of the apparatus 1700 for different upstream optical signals.

In a possible design, when at least two of ONU identifiers indicated in the second information are associated with a same receive parameter, second time ranges associated with the at least two ONU identifiers are adjacent.

The apparatus 1700 may concentrate, in one time period, time for sending upstream optical signals by ONUs in a same ONU group. The apparatus 1700 receives, in this time period based on a same receive parameter, the upstream optical signals sent by the ONUs in the same ONU group, which facilitates a decrease in a response time of the apparatus 1700 for the upstream optical signals sent by the ONUs in the same ONU group.

In a possible design, the processing unit 1701 is further configured to: after the transceiver unit 1702 receives the upstream optical signal sent by the registered ONU, determine an optical power of the received upstream optical signal, and determine the power range within which the optical power of the upstream optical signal falls; and when a receive parameter associated with the determined power range does not match the receive parameter associated with the ONU identifier indicated in the upstream optical signal, change the receive parameter associated with the ONU identifier to the receive parameter associated with the determined power range.

In a special case, when a power at which the upstream optical signal sent by the ONU actually reaches the OLT does not match the power range corresponding to the ONU identifier, the foregoing method may be used to update, based on the power at which the upstream optical signal sent by the ONU actually reaches the OLT, the power range and the receive parameter that correspond to the ONU identifier, thereby avoiding problems such as power overload of the OLT receiver.

In a possible design, the indication information is specifically used to indicate an ONU whose downstream receive power falls within a power range corresponding to the power range information to register, or is specifically used to indicate an ONU whose downstream receive power falls within a power range corresponding to the identification information to register.

When the indication information includes the power range information or the identification information associated with the power range, a specific meaning of the indication information is allowing an ONU that meets a related power condition to register, for example, allowing the ONU whose downstream receive power falls within the power range corresponding to the power range information to register, or allowing the ONU whose downstream receive power falls within the power range corresponding to the identification information to register, ensuring that the ONU can identify a physical meaning of the identification information associated with the power range.

In another embodiment, the apparatus 1700 may be the ONU or may be a chip or a system on chip in the ONU. The apparatus 1700 may be configured to perform actions of the ONU in the foregoing method embodiment. Details are as follows:

The transceiver unit 1702 is configured to receive first information sent by an OLT, where the first information includes at least one piece of indication information, and one piece of indication information indicates a first power range and a first time range associated with the first power range; and the processing unit 1701 is configured to send a registration message to the OLT in the first time range based on the first information after determining that the ONU is unregistered and a downstream receive power falls within the first power range indicated in the indication information.

The OLT sends one or more pairs of mutually associated time ranges and power ranges to the unregistered ONU. Different time ranges correspond to different power ranges. Therefore, when the downstream receive power of the unregistered ONU falls within one of the power ranges, the ONU registers in a time range corresponding to the power range. Based on different power ranges, ONUs whose downstream receive powers differ much may be classified into a plurality of ONU groups, and ONUs whose downstream receive powers fall within a same power range belong to a same ONU group. Registration signals of ONUs in a same ONU group are similar or differ little in signal strength when reaching the OLT, so that the OLT can quickly respond to the registration signals of the ONUs in the same ONU group, and an overall response time of the OLT for registration signals of ONUs in different ONU groups can be shortened.

In a possible design, the indication information includes power range information or includes identification information associated with the power range.

In a possible design, the indication information is specifically used to indicate an ONU whose downstream receive power falls within a power range corresponding to the power range information to register, or is specifically used to indicate an ONU whose downstream receive power falls within a power range corresponding to the identification information to register.

In a possible design, the transceiver unit 1702 is configured to receive an MPCP frame sent by the OLT, where the MPCP frame includes a Discovery GATE message field, and the Discovery GATE message field includes the indication information.

In a possible design, the transceiver unit 1702 is configured to receive a GTC frame sent by the OLT, where the GTC frame includes a BWmap message field, and the BWmap message field includes the indication information.

In a possible design, the processing unit 1701 is configured to skip sending the registration message to the OLT when determining that the downstream receive power does not match any power range indicated in the first information. The ONU does not register when the ONU does not meet a power condition indicated by the OLT, thereby ensuring that ONU groups obtained through classification based on a registration process are accurate.

In a possible design, the first information includes N pieces of indication information, power ranges indicated in any two of the N pieces of indication information are different, first time ranges indicated in any two of the N pieces of indication information are different, and N is an integer greater than 1.

In an embodiment, the apparatus is presented in a form of obtaining, through division, the function modules corresponding to the functions, or the apparatus is presented in a form of obtaining the function modules through division in an integrated manner. The "module" herein may be an application-specific integrated circuit (application-specific integrated circuit. ASIC), a circuit, a processor and a memory that execute one or more software or firmware programs, an integrated logic circuit, and/or another device capable of providing the foregoing functions.

In a simple embodiment, a person skilled in the art may figure that the processing unit 1701 of the apparatus 1700 may be implemented by a processor, and the transceiver unit 1702 may be implemented by a transceiver. Specifically, the method performed by the processing unit 1701 may be performed by the processor by invoking application program code stored in a memory. No limitation is imposed thereto in this embodiment of this application.

An embodiment of this application further provides a communications apparatus. The communications apparatus includes a processor and a memory. The memory stores a computer program. When the processor reads and executes the computer program stored in the memory, the communications apparatus implements the method performed by an OLT in the procedures shown in FIG. 3, FIG. 7*a* and FIG. 7*b*, and FIG. 8.

An embodiment of this application further provides a chip. The chip is connected to a memory, the memory stores a computer program, and the chip is configured to read and execute the computer program stored in the memory, to implement the method performed by an OLT in the procedures shown in FIG. 3, FIG. 7*a* and FIG. 7*b*, and FIG. 8.

An embodiment of this application further provides a computer storage medium storing program code. The stored program code is executed by a processor to implement the method performed by an OLT in the procedures shown in FIG. 3, FIG. 7*a* and FIG. 7*b*, and FIG. 8 in this application.

An embodiment of this application further provides a computer program product. The computer program product includes a computer software instruction. The computer software instruction may be loaded by a processor to implement the method performed by an OLT in the procedures shown in FIG. 3, FIG. 7*a* and FIG. 7*b*, and FIG. 8 in this application.

An embodiment of this application further provides a communications apparatus. The communications apparatus includes a processor and a memory. The memory stores a computer program. When the processor reads and executes the computer program stored in the memory, the communications apparatus implements the method performed by an ONU in the procedures shown in FIG. 3, FIG. 7*a* and FIG. 7*b*, and FIG. 8.

An embodiment of this application further provides a chip. The chip is connected to a memory, the memory stores a computer program, and the chip is configured to read and execute the computer program stored in the memory, to implement the method performed by an ONU in the procedures shown in FIG. 3, FIG. 7*a* and FIG. 7*b*, and FIG. 8.

An embodiment of this application further provides a computer storage medium storing program code. The stored program code is executed by a processor to implement the method performed by an ONU in the procedures shown in FIG. 3, FIG. 7*a* and FIG. 7*b*, and FIG. 8 in this application.

An embodiment of this application further provides a computer program product. The computer program product includes a computer software instruction. The computer software instruction may be loaded by a processor to implement the method performed by an ONU in the procedures shown in FIG. 3, FIG. 7a and FIG. 7b, and FIG. 8 in this application.

Specific implementations of the foregoing apparatus embodiments correspond to the method embodiments. For the specific implementations and beneficial effects, refer to related descriptions in the method embodiments.

Figure 18:
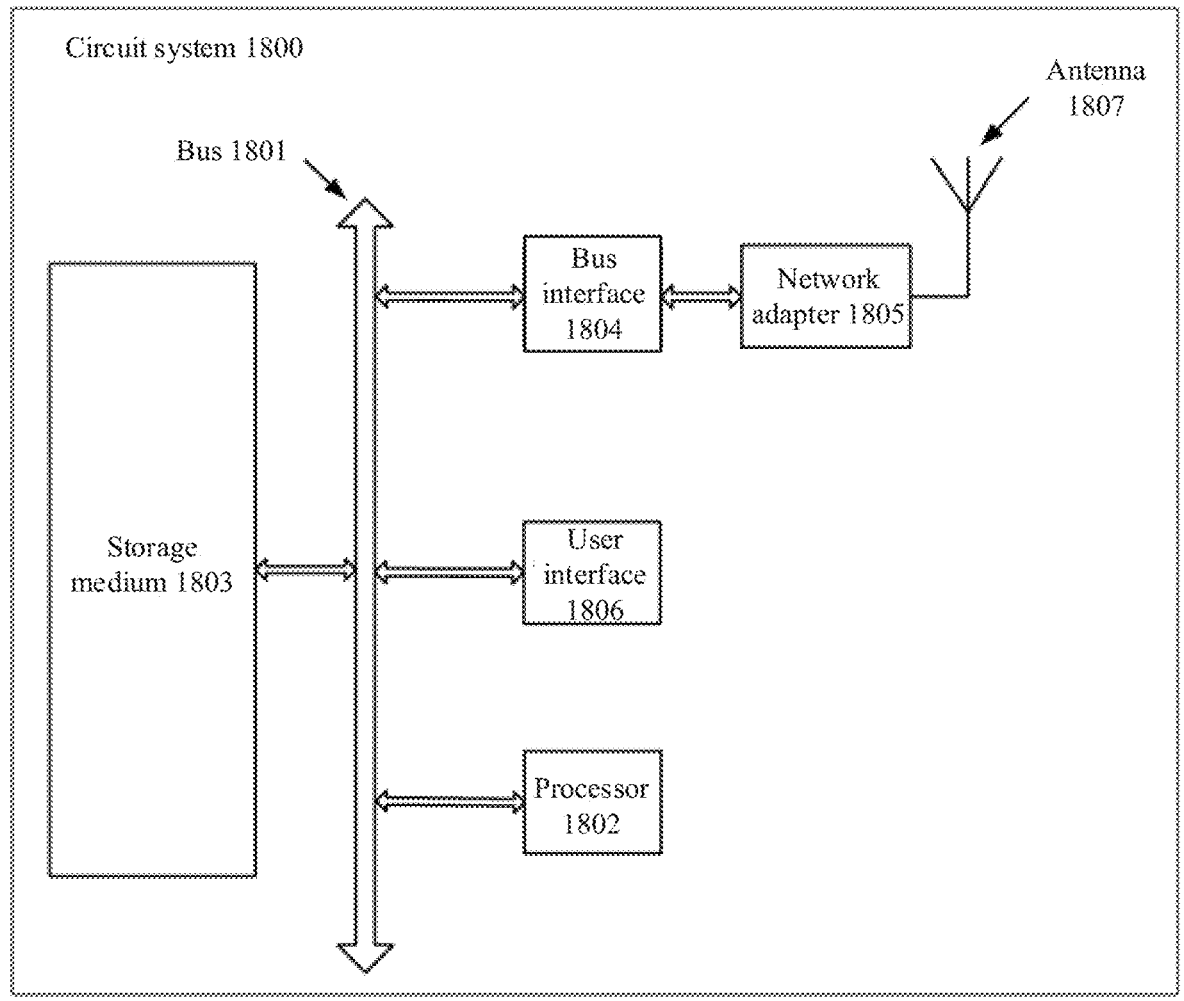
FIG. 18 is a schematic structural diagram of a circuit system according to an embodiment of this application.

Based on a same inventive concept, an embodiment of this application further provides a circuit system. FIG. 18 is a schematic structural diagram of a circuit system according to an implementation of this application As shown in FIG. 18, the circuit system 1800 may be implemented by using a bus 1801 as a general bus architecture. Based on a specific application and an overall design constraint of the circuit system 1800, the bus 1801 may include any quantity of interconnect buses and bridges. The bus 1801 connects various circuits together. These circuits include a processor 1802, a storage medium 1803, and a bus interface 1804. Optionally, the circuit system 1800 connects a network adapter 1805 and the like via the bus 1801 by using the bus interface 1804. The network adapter 1805 may be configured to implement a signal processing function of a physical layer in a wireless communications network, and send and receive radio frequency signals by using an antenna 1807. A user interface 1806 may be connected to a user terminal, such as a keyboard, a display, a mouse, or a joystick. The bus 1801 may be further connected to various other circuits, such as a timing source, a peripheral, a voltage regulator, or a power management circuit. These circuits are well known in the art, and therefore are not described in detail.

Alternatively, the circuit system 1800 may be configured as a chip or a system on chip. The chip or the system on chip includes: one or more microprocessors that provide a processor function, and an external memory that provides at least a part of the storage medium 1803, which are all connected to another support circuit together by using an external bus architecture.

Alternatively, the circuit system 1800 may be implemented by using the following: an ASIC (application-specific integrated circuit) having the processor 1802, the bus interface 1804, and the user interface 1806; and at least a part of the storage medium 1803 integrated in a single chip. Alternatively, the circuit system 1800 may be implemented by using the following: one or more FPGAs (field programmable gate arrays), a PLD (programmable logic device), a controller, a state machine, a logic gate, a discrete hardware component, any other proper circuit, or any combination of circuits capable of performing various functions described throughout the present invention.

The processor 1802 is responsible for managing the bus and performing general processing (including executing software stored in the storage medium 1803). The processor 1802 may be implemented by using one or more general-purpose processors and/or dedicated processors. For example, a processor includes a microprocessor, a microcontroller, a DSP processor, or another circuit that can execute software. Software should be interpreted broadly to indicate an instruction, data, or any combination thereof, regardless of whether it is referred to as software, firmware, middleware, microcode, hardware description language, or otherwise.

In FIG. 18, it is shown that the storage medium 1803 is separate from the processor 1802. However, a person skilled in the art may easily understand that the storage medium 1803 or any part of the storage medium 1803 may be located outside the circuit system 1800. For example, the storage medium 1803 may include a transmission line, a carrier waveform modulated with data, and/or a computer product separate from a wireless node. These media all can be accessed by the processor 1802 by using the bus interface 1804. Alternatively, the storage medium 1803 or any part of the storage medium 1803 may be integrated into the processor 1802, for example, may be a cache and/or a general-purpose register.

The processor 1802 may perform the information transmission method in a PON system in any of the foregoing embodiments of this application, and details are not described herein again.

Figure 19:
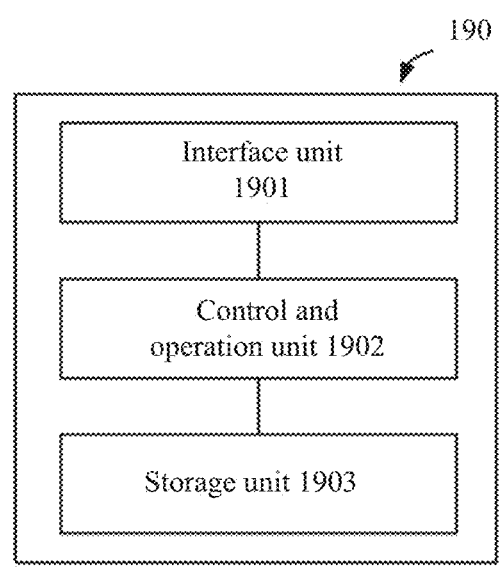
FIG. 19 is a schematic structural diagram of a circuit system according to an embodiment of this application.

For example, FIG. 19 is another schematic structural diagram of a circuit system according to an embodiment of the present invention. The circuit system may be a processor. The processor may be embodied as a chip or a system on chip (system on chip, SOC), and is disposed in a PON system, so that an OLT or an ONU implements the information transmission method in a PON system in the embodiments of the present invention.

As shown in FIG. 19, the circuit system 190 includes an interface unit 1901, a control and operation unit 1902, and a storage unit 1903. The interface unit 1901 is configured to communicate with another component of the OLT or the ONU. The storage unit 1903 is configured to store computer programs or instructions. The control and operation unit 1902 is configured to decode and execute these computer programs or instructions. It should be understood that these computer programs or instructions may include function programs of the foregoing OLT, and may also include function programs of the foregoing ONU. When the function programs of the OLT are decoded and executed by the control and operation unit 1902, the method performed by the OLT in the procedures shown in FIG. 3, FIG. 7a and FIG. 7b, and FIG. 8 in the embodiments of this application may be implemented. When the function programs of the ONU are decoded and executed by the control and operation unit 1902, the method performed by the ONU in the procedures shown in FIG. 3, FIG. 7a and FIG. 7b, and FIG. 8 in the embodiments of this application may be implemented.

In a possible design, these function programs of the OLT or function programs of the ONU are stored in a memory external to the circuit system 190. When the function programs of the OLT or the function programs of the ONU are decoded and executed by the control and operation unit 1902, the storage unit 1903 temporarily stores some or all content of the function programs of the OLT or temporarily stores some or all content of the function programs of the ONU.

In another optional implementation, these function programs of the OLT or function programs of the ONU are set to be stored in the storage unit 1903 in the circuit system 190. When the function programs of the OLT are stored in the storage unit 1903 in the circuit system 190, the circuit system 190 may be disposed in the OLT of the PON system in the embodiments of the present invention. When the function programs of the ONU are stored in the storage unit 1903 in the circuit system 190, the circuit system 190 may be disposed in the ONU of the PON system in the embodiments of the present invention.

In still another optional implementation, partial content of these function programs of the OLT or function programs of the ONU is stored in the memory external to the circuit system 190, and remaining content of these function programs of the OLT or function programs of the ONU is stored in the storage unit 1903 in the circuit system 190.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, the procedure or functions according to the embodiments of the present invention are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk Solid State Disk (SSD)), or the like.

It may be clearly understood by a person skilled in the art that description of the embodiments provided in the present invention may be cross-referenced. For convenient and brief description, for the functions of the apparatuses and the devices and the performed steps provided in the embodiments of the present invention, refer to related descriptions of the method embodiments of the present invention. Details are not described herein again.

Although this application is described with reference to the embodiments, in a process of implementing this application that claims protection, a person skilled in the art may understand and implement another variation of the disclosed embodiments by viewing the accompanying drawings, disclosed content, and the accompanying claims. In the claims, "comprising" (comprising) does not exclude another component or step, and "a/an" or "one" does not exclude "a plurality of". A single processor or another unit may implement several functions enumerated in the claims. Some measures are recorded in dependent claims that are different from each other, but this does not mean that these measures cannot be combined to produce a better effect.

A person skilled in the art should understand that the embodiments of this application may be provided as a method, an apparatus (device), or a computer program product. Therefore, this application may use a form of hardware only embodiments, software only embodiments, or embodiments with a combination of software and hardware. They are collectively referred to as "modules" or "systems". In addition, this application may use a form of a computer program product that is implemented on one or more computer-usable storage media (including but not limited to a disk memory, a CD-ROM, an optical memory, and the like) that include computer usable program code. The computer program is stored/distributed in a proper medium and is provided as or used as a part of the hardware together with other hardware, or may also use another distribution form, for example, by using the Internet or another wired or wireless telecommunications system.

A person skilled in the art may further understand that various illustrative logical blocks (illustrative logical block) and steps (step) that are listed in the embodiments of this application may be implemented by using electronic hardware, computer software, or a combination thereof. In order to clearly display the interchangeability (interchangeability) between the hardware and the software, functions of the foregoing various illustrative components (illustrative components) and steps have been generally described. Whether the functions are implemented by using hardware or software depends on particular applications and a design requirement of the entire system. A person skilled in the art may use various methods to implement the described functions for each particular application, but it should not be considered that the implementation goes beyond the protection scope of the embodiments of the present invention.

The various illustrative logical blocks, modules, and circuits described in the embodiments of this application may implement or operate the described functions by using a general-purpose processing unit, a digital signal processing unit, an application-specific integrated circuit (ASIC), a field programmable gate array (FPGA) or another programmable logical apparatus, a discrete gate or transistor logic, a discrete hardware component, or a design of any combination thereof. The general-purpose processing unit may be a microprocessing unit. Optionally, the general-purpose processing unit may be any conventional processing unit, controller, microcontroller, or state machine. The processing unit may be implemented by a combination of computing apparatuses, such as a digital signal processing unit and a microprocessing unit, a plurality of microprocessing units, one or more microprocessing units with a digital signal processing unit core, or any other similar configuration.

In one or more examples of designs, the functions described in the embodiments of the present invention may be implemented by using hardware, software, firmware, or any combination thereof. If the present invention is implemented by software, these functions may be stored in a computer-readable medium or are transmitted to the computer-readable medium in a form of one or more instructions or code. The computer-readable medium is either a computer storage medium or a communications medium that enables a computer program to move from one place to another. The storage medium may be an available medium that may be accessed by any general or special computer. For example, such a computer-readable medium may include but is not limited to a RAM, a ROM, an EEPROM, a CD-ROM, or another optical disc storage, a disk storage or another magnetic storage apparatus, or any other medium that may be configured to carry or store program code, where the program code is in a form of an instruction or a data structure or in a form that can be read by a general or special computer or a general or special processing unit. In addition, any connection may be appropriately defined as a computer-readable medium. For example, if software is transmitted from a website, a server, or another remote resource by using a coaxial cable, an optical fiber computer, a twisted pair, a digital subscriber line (DSL) or in a wireless manner, such as infrared, radio, or microwave, the software is included in a defined computer-readable medium. The disc (disc) and the disk (disk) include a compressed disk, a laser disk, an optical disc, a DVD, a floppy disk, and a Blu-ray disc. The disk generally copies data by a magnetic means, and the disc generally copies data optically by a laser means. The foregoing combination may also be included in the computer-readable medium.

Based on the foregoing description of the specification in the present invention, technologies in the art may use or implement the content of the present invention. Any modification based on the disclosed content shall be considered obvious in the art. The basic principles described in the present invention may be applied to other variations without departing from the essence and scope of the present invention. Therefore, the content disclosed in the present invention is not limited to the described embodiments and designs but may also be extended to a maximum scope that is consistent with the principles and disclosed new features of the present invention.

What is claimed is:

1. An information transmission method, comprising:
   sending, by an optical line terminal (OLT), a first power range and a first time range to an optical network unit (ONU), wherein the first power range and the first time range are used to indicate the ONU to send a registration message in the first time range in case a downlink receive power of the ONU falls within the first power range; and
   receiving, by the OLT, the registration message.

2. The method according to claim 1, wherein the first power range is transmitted in a power range information or an identification information associated with the power range information.

3. The method according to claim 1, wherein the first time range indicates a start time and a timeslot length.

4. The method according to claim 1, wherein the first power range and the first time range are sent, by the OLT, in a multi-point control protocol (MPCP) frame.

5. The method according to claim 1, further comprising:
   sending, by the OLT, a first bit to the ONU, wherein the first bit indicates whether the OLT supports 10 Gb/s reception; and
   sending, by the OLT, a second bit to the ONU, wherein the second bit indicates whether the OLT supports 25 Gb/s reception.

6. The method according to claim 2, wherein the power range information indicates an ONU whose downstream receive power falls within a power range corresponding to the power range information to register in the first time range, or the identification information indicates an ONU whose downstream receive power falls within a power range corresponding to the identification information to register in the first time range.

7. An information transmission method, comprising:
   receiving, by an unregistered optical network unit (ONU), a first power range and a first time range sent by an optical line terminal (OLT), wherein the first power range and the first time range indicate to the ONU to send a registration message in the first time range in case a downlink receive power of the ONU falls within the first power range; and
   sending, by the ONU, the registration message to the OLT in the first time range in response to the downstream receive power of the ONU falling within the first power range.

8. The method according to claim 7, wherein the first power range is received in a power range information or an identification information associated with the power range information.

9. The method according to claim 7, wherein the first time range indicates a start time and a timeslot length.

10. The method according to claim 8, wherein the power range information indicates an ONU whose downstream receive power falls within a power range corresponding to the power range information to register in the first time range, or the identification information indicates an ONU whose downstream receive power falls within a power range corresponding to the identification information to register in the first time range.

11. The method according to claim 7, wherein the first power range and the first time range are received, by an ONU,
    in a multi-point control protocol (MPCP) frame sent by the OLT.

12. The method according to claim 7, wherein the first power range and the first time range are
    received, by the ONU, in a GTC frame sent by the OLT.

13. The method according to claim 7, wherein the ONU further receives a first bit indicating whether the OLT supports 10 Gb/s reception; and
    wherein the ONU further receives a second bit indicating whether the OLT supports 25 Gb/s reception.

14. An optical line terminal (OLT), comprising:
    a transceiver, the transceiver configured to send a first power range and a first time range to an optical network unit (ONU), wherein the first power range and the first time range are used to indicate the ONU to send a registration message in the first time range in case a downlink receive power of the ONU falls within the first power range; and
    at least one processor, the at least one processor configured to instruct the transceiver to receive the registration message.

15. The OLT according to claim 14, wherein the first power range is transmitted in a power range information or an identification information associated with the power range information.

16. The OLT according to claim 14, wherein the first time range indicates a start time and a timeslot length.

17. The OLT according to claim 15, wherein the power range information indicates an ONU whose downstream receive power falls within a power range corresponding to the power range information to register in the first time range, or the identification information indicates an ONU whose downstream receive power falls within a power range corresponding to the identification information to register in the first time range.

18. An optical network unit (ONU), comprising:
    a transceiver, the transceiver configured to receive a first power range and a first time range sent by an optical line terminal (OLT); and
    at least one processor, the at least one processor configured to determine whether a downstream receive power of the ONU falls within the first power range;
    wherein the transceiver is further configured to send a registration message to the OLT in the first time range a downstream receive power of the ONU falls within the first power range.

19. The ONU according to claim 18, wherein the first power range is received in a power range information or an identification information associated with the power range information.

20. The ONU according to claim 18, wherein the first time range indicates a start time and a timeslot length.

21. The ONU according to claim 19, wherein the power range information indicates an ONU whose downstream receive power falls within a power range corresponding to the power range information to register in the first time range, or the identification information indicates an ONU whose downstream receive power falls within a power range corresponding to the identification information to register in the first time range.

* * * * *

UNITED STATES PATENT AND TRADEMARK OFFICE
CERTIFICATE OF CORRECTION

| | |
|---|---|
| PATENT NO. | : 11,368,223 B2 |
| APPLICATION NO. | : 16/936212 |
| DATED | : June 21, 2022 |
| INVENTOR(S) | : Dekun Liu, Wei Ling and Zhicheng Ye |

It is certified that error appears in the above-identified patent and that said Letters Patent is hereby corrected as shown below:

On the Title Page

Column 1, Item (54), Title/Line 1 - Delete "MESSAGE" and insert -- INFORMATION --.

In the Specification

Column 1/Line 1 - Delete "MESSAGE" and insert -- INFORMATION --.

Signed and Sealed this
Twenty-fifth Day of October, 2022

Katherine Kelly Vidal
*Director of the United States Patent and Trademark Office*